United States Patent
O'Shea et al.

(10) Patent No.: US 10,572,410 B2
(45) Date of Patent: Feb. 25, 2020

(54) FUNCTION-SPECIFIC COMMUNICATION ON A MULTI-DROP BUS FOR COEXISTENCE MANAGEMENT

(71) Applicant: QUALCOMM Incorporated, San Diego, CA (US)

(72) Inventors: Helena Deirdre O'Shea, San Diego, CA (US); Lalan Jee Mishra, San Diego, CA (US); Richard Dominic Wietfeldt, San Diego, CA (US); Mohit Kishore Prasad, San Diego, CA (US); Amit Gil, Zichron Yaakov (IL); Gary Chang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/193,853

(22) Filed: Nov. 16, 2018

(65) Prior Publication Data
US 2019/0227962 A1    Jul. 25, 2019

Related U.S. Application Data

(60) Provisional application No. 62/620,991, filed on Jan. 23, 2018.

(51) Int. Cl.
*G06F 13/42* (2006.01)
*G06F 13/20* (2006.01)

(52) U.S. Cl.
CPC .......... *G06F 13/20* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 8,606,184 B1* | 12/2013 | Luthra | ................. | H04B 17/318 370/229 |
| 9,037,089 B2* | 5/2015 | Sang | ................. | H04W 72/1215 455/114.2 |
| 2007/0275746 A1* | 11/2007 | Bitran | .................. | H04W 16/14 455/509 |
| 2008/0102885 A1* | 5/2008 | Tu | ........................ | H04B 1/3805 455/553.1 |
| 2011/0268024 A1* | 11/2011 | Jamp | ..................... | H04W 16/14 370/328 |
| 2014/0337610 A1* | 11/2014 | Kawano | .................. | G06F 9/441 713/2 |
| 2014/0359001 A1* | 12/2014 | Dupoteau | ............... | H04L 67/02 709/203 |

* cited by examiner

*Primary Examiner* — Elias Mamo
(74) *Attorney, Agent, or Firm* — Loza & Loza LLP

(57) ABSTRACT

Systems, methods, and apparatus are described that provide for communicating coexistence messages over a multi-drop serial bus. A data communication method includes configuring a common memory map at each of a plurality of devices coupled to a serial bus, receiving at a first device coupled to the serial bus, first coexistence information directed to a second device coupled to the serial bus, generating at the first device, a coexistence message that includes the first coexistence information, and transmitting the coexistence message to the second device over the serial bus. The first coexistence information in the coexistence message may be addressed to a location in the common memory map calculated based on a destination address associated with the first coexistence information and a unique identifier of the first device.

27 Claims, 32 Drawing Sheets

FIG. 27

Option 1

| | | |
|---|---|---|
| WCI-2 payload, type information in the byte | | |
| BB WR | Type 1 | 1 Byte |
| BB WR | Type 0 | 1 BB Source |
| Full payload, no type information in the byte | | 16 BB Sources |
| BB WR | Type 2 | 1x BB Source x 8 Bytes |
| BB WR | Type 3 | 8 Bytes |
| BB WR | Type 4 | 16 BB Sources |
| BB WR | Type 5 | 16 BB Sources |
| BB WR | Type 6 | 16 BB Sources |
| BB WR | Type 7 | 16 BB Sources |
| | | 16 BB Sources |

Option 2

| | | |
|---|---|---|
| WCI-2 payload, type information in the byte | | |
| Type_1_PRI | 1 BB Source | 16 Bytes |
| Type_1_SEC | 1 BB Source | 16 Bytes |
| Type_0_PRI | 16 BB Sources | 16 Bytes |
| Type_0_SEC | 16 BB Sources | 16 Bytes |
| Full payload, no type information in the byte | | |
| Type_2_PRI | 16 BB Sources x 8 bytes | 128 Bytes |
| Type_2_SEC | 16 BB Sources x 8 bytes | 128 Bytes |
| WCI-2 payload, type information in the byte | | |
| Type_N | 16 BB Sources x 10 bytes | 16 Bytes |

*FIG. 28*

FUNCTION-SPECIFIC COMMUNICATION ON A MULTI-DROP BUS FOR COEXISTENCE MANAGEMENT

PRIORITY CLAIM

This application claims priority to and the benefit of U.S. Provisional Patent Application Ser. No. 62/620,991 filed in the U.S. Patent Office on Jan. 23, 2018, the entire content of this application being incorporated herein by reference as if fully set forth below in its entirety and for all applicable purposes.

TECHNICAL FIELD

The present disclosure relates generally to serial communication and input/output pin configuration and, more particularly, to optimizing an architecture that can consolidate low-latency, low-volume data received from multiple sources onto a multi-drop serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bus or a parallel bus. General-purpose serial interfaces known in the industry, including the Inter-Integrated Circuit (I2C or $I^2C$) serial bus and its derivatives and alternatives, such as interfaces defined by the Mobile Industry Processor Interface (MIPI) Alliance, including the I3C interface, the system power management interface (SPMI), and the Radio Frequency Front-End (RFFE) interface.

In one example, the I2C serial bus is a serial single-ended computer bus that was intended for use in connecting low-speed peripherals to a processor. Some interfaces provide multi-master buses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single integrated circuit (IC) device, or provided in multiple IC devices. In a mobile communications device, multiple antennas and radio transceivers may support multiple concurrent RF links.

In an SOC there can be systems in different chipsets that need to communicate with each other in real-time. One system may provide the other systems awareness of its state using coexistence messages. Coexistence messages are transmitted a multisystem platform to prevent or reduce instances of systems impinging on each other. In many instances, coexistence messages are transmitted over dedicated point-to-point links. These point-to-point links consume precious general-purpose input/output (GPIO) pins within the mobile communication devices and it would be desirable to reduce the number of physical pins needed to carry coexistence information and other low-level signal information or messages.

SUMMARY

Certain aspects of the disclosure relate to systems, apparatus, methods and techniques that can provide optimized low-latency communications between different devices and to carry coexistence information and messages in datagrams transmitted over multi-drop communication links.

In various aspects of the disclosure, a data communication method includes configuring a common memory map at each of a plurality of devices coupled to a serial bus, receiving at a first device coupled to the serial bus, first coexistence information directed to a second device coupled to the serial bus, generating at the first device, a coexistence message that includes the first coexistence information, and transmitting the coexistence message to the second device over the serial bus. The first coexistence information in the coexistence message may be addressed to a location in the common memory map calculated based on a destination address associated with the first coexistence information and a unique identifier of the first device.

In certain aspects, configuring the common memory includes configuring a segment of the common memory map for each of the plurality of devices. The destination address and the unique identifier may be combined to provide a tag for the coexistence message to be used by the second device for processing the coexistence message. Generating the coexistence message may include providing a type indicator associated with the first coexistence information in the coexistence message. Generating the coexistence message may include providing an identification of a radio access technology associated with the first coexistence information in the coexistence message. The unique identifier, an identification of a radio access technology associated with the first coexistence information and a message type indicator may be combined in one or more bytes of the coexistence message.

In some aspects, second coexistence information directed to the second device may be received. The first coexistence information and the second coexistence information may relate to different sources of coexistence information. The method may include transmitting the first coexistence information and the second coexistence information in the coexistence message in response to a ping message.

In various aspects of the disclosure, a data communication apparatus has a bus interface circuit coupled to a serial bus, a radio frequency component that generates an interfering signal when active, and a processing circuit. The processing circuit may be configured to maintain a memory map that matches a corresponding memory map in a victim device coupled to the serial bus, receive first coexistence information from the radio frequency component, the first coexistence information being directed to the victim device, generate a coexistence message that includes the first coexistence information, and transmit the coexistence message to the victim device through the bus interface circuit. The first coexistence information in the coexistence message may be addressed to a location in the common memory map calculated based on a destination address associated with the first coexistence information and a unique identifier of the apparatus.

In various aspects of the disclosure, a processor-readable storage medium has instructions stored thereon which, when executed by at least one processor or state machine of a processing circuit, cause the processing circuit to configure a common memory map at each of a plurality of devices coupled to a serial bus, receive first coexistence information directed to a first device coupled to the serial bus, generate a coexistence message that includes the first coexistence information, and transmit the coexistence message to the first device over the serial bus. The first coexistence information in the coexistence message may be addressed to a location in the common memory map calculated based on a destination address associated with the first coexistence information and a unique identifier of the apparatus.

In various aspects of the disclosure, a data communication apparatus includes means for configuring a common memory map at each of a plurality of devices coupled to a serial bus, means for receiving coexistence information, including first coexistence information addressed to a first device coupled to the serial bus, means for generating a coexistence message representative of the first coexistence information, and means for transmitting the coexistence message to the first device over the serial bus. The first coexistence information in the coexistence message may be addressed to a location in the common memory map calculated based on a destination address associated with the first coexistence information and a unique identifier of the apparatus.

BRIEF DESCRIPTION OF THE DRAWINGS

FIG. 27 illustrates transmissions that may be used to write coexistence information to proximately located information elements in devices that maintain a common memory map according to certain aspects disclosed herein.

FIG. 28 illustrates options for mapping coexistence messages to SPMI datagrams in accordance with certain aspects disclosed herein.

DETAILED DESCRIPTION

Figure 1:
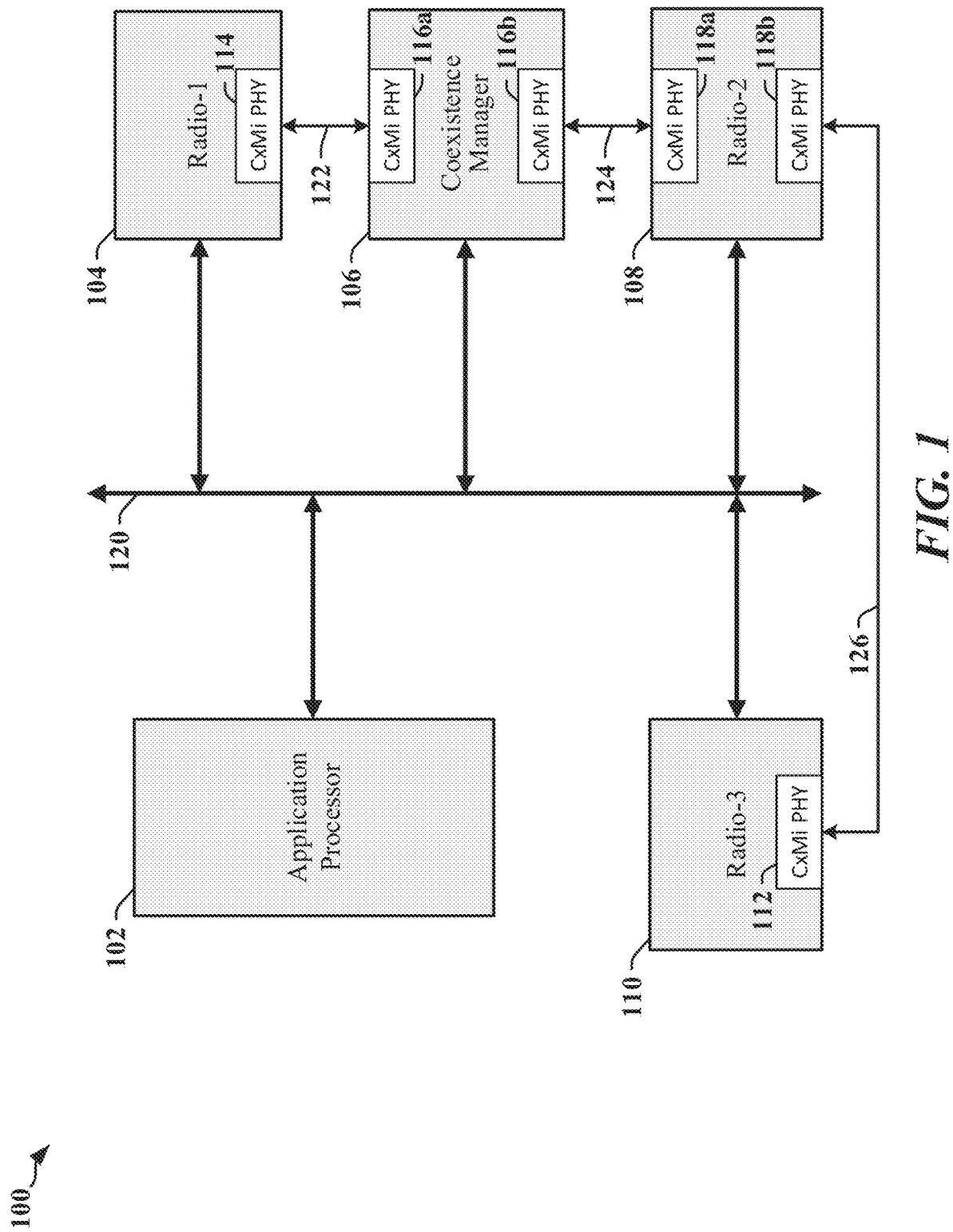
FIG. 1 illustrates certain aspects of a system adapted to support coexistence management functions.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple system-on-chip (SoC) or other IC devices often employ a shared communication interface that may include a serial bus or another data communication link to connect processors with modems and other peripherals. The serial bus or other data communication link may be operated in accordance with multiple standards or protocols defined. In one example, a serial bus may be operated in accordance with I2C, I3C, SPMI and/or RFFE protocols.

Coexistence messages are conventionally sent over point-to-point data links that support low-volume, low-latency transport of byte-sized messages. According to certain aspects disclosed herein, a number of physical GPIO pins consumed by the point-to-point data links can be eliminated by transferring coexistence information over shared serial buses. In various aspects of the disclosure, a method performed at a device coupled to a serial bus includes configuring a common memory map at each of a plurality of devices coupled to a serial bus, receiving at a first device coupled to the serial bus, coexistence information addressed to a second device coupled to the serial bus, generating at the first device, a coexistence message representative of the coexistence information, and transmitting the coexistence message to the second device over the serial bus. The coexistence message may be addressed to a location in the common memory map calculated based on a destination address provided in the message and unique identifier of the first device.

A number of different transmission schemes may be used for communicating messaging and data over communication links Existing protocols have well-defined and immutable structures in the sense that their structures cannot be changed. In some examples, a serial communication bus that is operated in accordance with I2C, I3C, RFFE, SPMI, or other standards or protocols may be used to tunnel different protocols with different register and data format requirements, different data transmission volumes and/or different transmission schedules.

According to certain aspects of this disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

Examples of CxMi Communication

FIG. 1 illustrates certain aspects of a system 100 adapted to support coexistence management functions. An application processor 102 may manage or control multiple radios 104, 108, 110, each of which may include one or more modems, transceivers, antennas, etc. In some instances, the multiple radios 104, 108, 110 may share certain circuits, antennas and other resources. The system 100 may provide or employ a coexistence manager 106 that may be a stand-alone device and/or employ functions and circuits in one or more devices 102, 104, 106, 108, 110. In one example, the coexistence manager 106 may communicate with radios 104, 108 through point-to-point CxMi links 122, 124, respectively. In another example, coexistence management functions in two radios 108, 110 may interact through a point-to-point CxMi link 126. CxMi physical interface circuits 112, 114, 116a, 116b, 118a, 118b provided in the radios 104, 108, 110 and/or coexistence manager 106 may be based on a UART. Each CxMi link 122, 124, 126 consumes at least two pins on each device for full-duplex operation.

An example mobile device may include various radios to provide a variety of functions for the user. For purposes of this example, a cellular telephone may include a third generation (3G), fourth generation (4G) and/or fifth generation (5G) radio for voice and data, an IEEE 802.11 (WiFi) radio, a Global Positioning System (GPS) radio, and/or a Bluetooth radio, where two or more radios may operate simultaneously.

The coexistence manager 106 and/or coexistence functions and circuits can manage operation of respective radios 104, 108, 110 in order to avoid interference and/or other performance degradation associated with collisions between respective radios 104, 108, 110. Coexistence management functions typically require deterministic communication of commands, configuration and other information. A point-to-point UART-based link can provide sufficiently low latency to support coexistence management functions. Conventional shared communication links and communication protocols may be unable to meet the latency requirements needed to support coexistence management functions.

Certain aspects disclosed herein provide systems, apparatus and techniques by which CxMi communication links can be virtualized such that CxMi information can be timely transported as virtual general-purpose input/output (VGPIO or VGI) over a serial bus configured to operate as a multi-point VGI (MP-VGI) bus.

Figure 2:
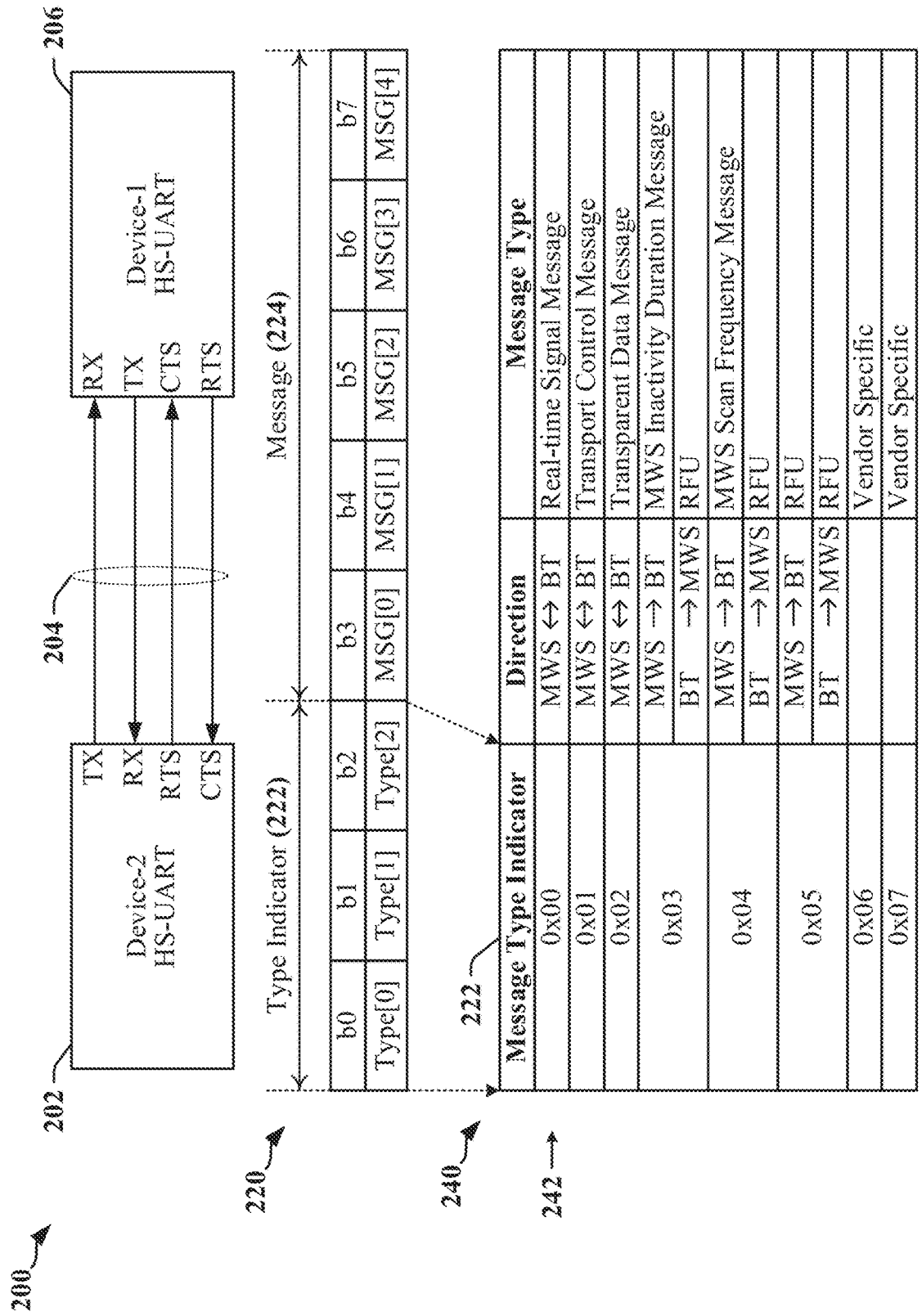
FIG. 2 illustrates an example of a conventional coexistence management interface (CxMi) implementation.

FIG. 2 illustrates an example of a conventional CxMi implementation 200 that includes a point-to-point UART-based link that may be operated at 4 Mbps. In the example, a first modem 202 is configured for operation using a mobile wireless service (MWS) radio access technology and a second modem 206 is configured for Bluetooth (BT) communications. The modems 202, 206 exchange CxMi messages, commands and/or control information over a two-wire UART-based point-to-point CxMi link 204. In one example, data is clocked on the CxMi link 204 at 4 megabits per second (Mbps), and each 8-bit byte of data transferred through the CxMi link 204 is preceded by a start bit and followed by a stop bit such that transmission is accomplished in 10 clock cycles, or 2.5 μs.

FIG. 2 includes an example of a datagram 220 for a wireless coexistence interface (WCI). In some implementations, the datagram 220 may comply or be compatible with a datagram provided in accordance with the WCI-2 protocol defined for communication using a UART-based interface. The datagram includes a type indicator field 222 and a message field 224. The type indicator field 222 includes three bits encoded to identify the content of the message field 224. Eight possible message types are defined in the table 240 in FIG. 2. The Type-0 message 242 has a value of 0x00 and carry VGI-like event messages with strict latency targets. When the CxMi link 204 is operated at 4-Mbps, transmissions including a Type-0 message 242 include 1 Start bit, 8 data-bits and one Stop-bit for a total of 10 bits. Transmission time is 2.5 µs and Type-0 messages 242 are subjected to hard real-time, deterministic constraints, where transmissions are expected to be completed in less than 3 µs, for example.

Figure 3:
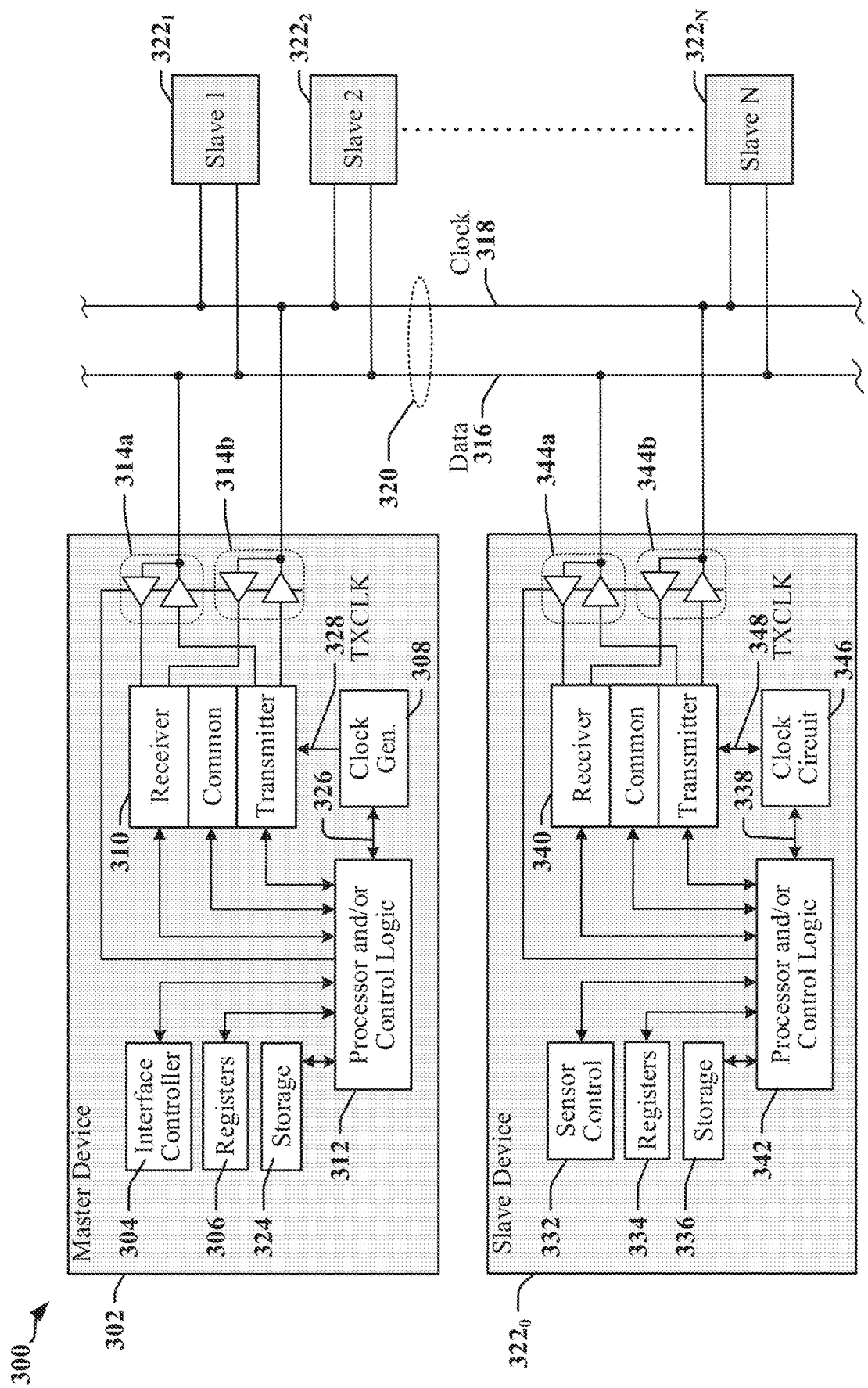
FIG. 3 illustrates a system architecture for an apparatus employing a data link between IC devices.

FIG. 3 illustrates certain aspects of an apparatus 300 that includes multiple devices 302, and $322_0$-$322_N$ coupled to a serial bus 320. The devices 302 and $322_0$-$322_N$ may be implemented in one or more semiconductor IC devices, such as an applications processor, SoC or ASIC. In various implementations the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communications between devices 302 and $322_0$-$322_N$ over the serial bus 320 is controlled by a bus master device 302. Certain types of bus can support multiple bus master devices 302.

In one example, a bus master device 302 may include an interface controller 304 that may manage access to the serial bus, configure dynamic addresses for slave devices $322_0$-$322_N$ and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a slave device $322_0$ configured to operate as a slave device may provide a control function, module or circuit 332 that includes circuits and modules to support a display, an image sensor, and/or circuits and modules that control and communicate with one or more sensors that measure environmental conditions. The slave device $322_0$ may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. The clock signal 348 may be derived from a signal received from the clock line 318. Other timing clocks 338 may be used by the control logic 342 and other functions, circuits or modules.

The serial bus 320 may be operated in accordance with RFFE, I2C, I3C, SPMI, or other protocols. At least one device 302, $322_0$-$322_N$ may be configured to operate as a master device and a slave device on the serial bus 320. Two or more devices 302, $322_0$-$322_N$ may be configured to operate as a master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

Figure 4:
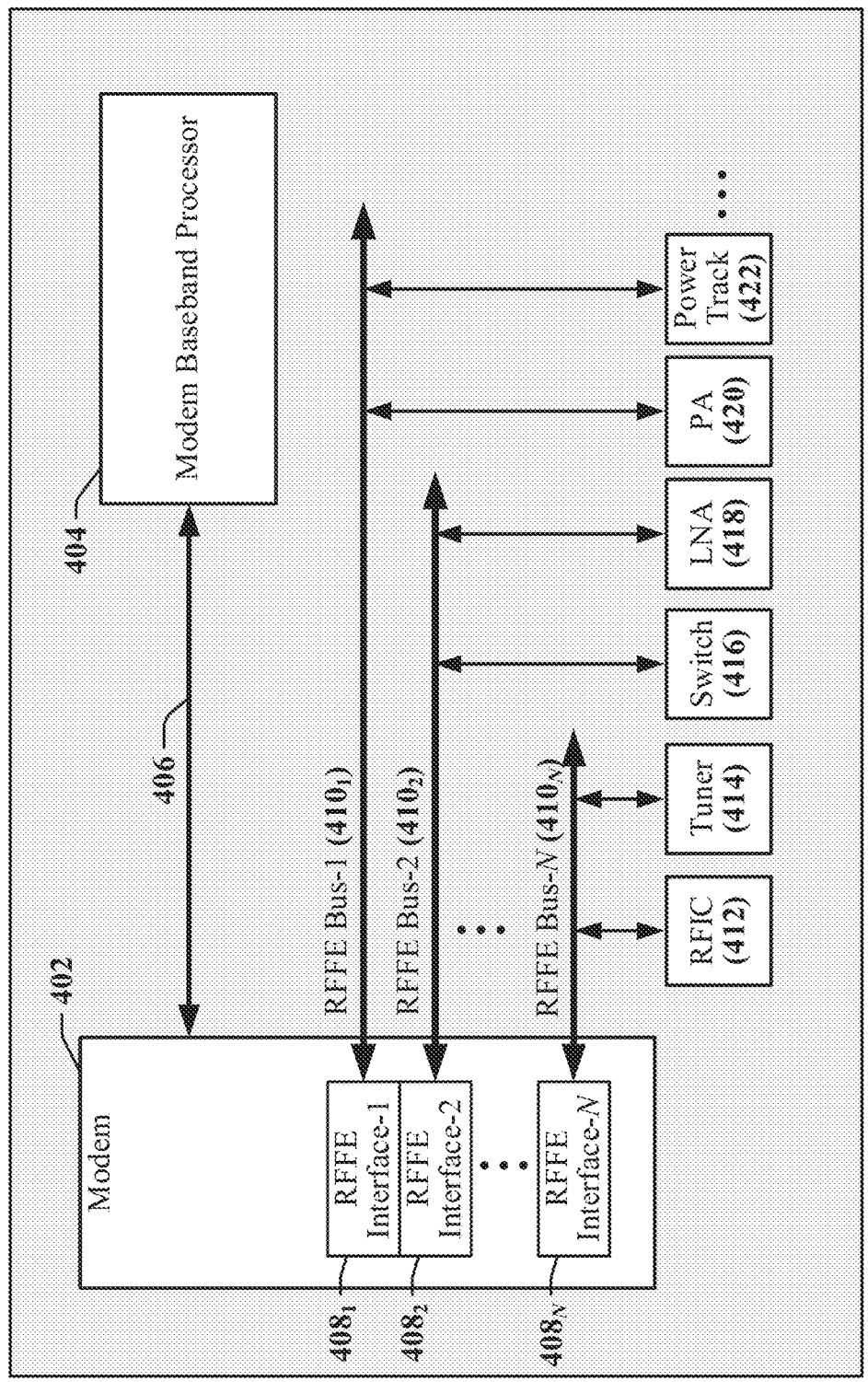
FIG. 4 illustrates a first example of a device configuration for coupling various radio frequency front-end devices using multiple RFFE buses.

FIG. 4 is a block diagram illustrating a first example of an apparatus 400 that includes chipsets or devices coupled by multiple communication links In the example, the apparatus 400 employs multiple RFFE buses $410_1$-$410_N$ to couple various front-end devices 412, 414, 416, 418, 420, 422. A modem 402 may include one or more RFFE interfaces $408_1$-$408_N$, each of which couples the modem 402 to a corresponding RFFE bus $410_1$-$410_N$. The modem 402 communicates with a baseband processor 404 through a separate communication link 406. The illustrated apparatus 400 may be embodied in one or more of a mobile communication device, a mobile telephone, a mobile computing system, a mobile telephone, a notebook computer, a tablet computing device, a media player, a gaming device, a wearable computing and/or communications device, an appliance, or the like. In various examples, the apparatus 400 may include one or more baseband processors 404, modems 402, multiple communications links, multiple RFFE buses $410_1$-$410_N$ and/or other types of buses. The apparatus 400 may include other processors, circuits, modules and may be configured for various operations and/or different functionalities. In the apparatus 400 illustrated in FIG. 4, one RFFE bus $410_N$ is coupled to an RF integrated circuit (RFIC 412) and an RF tuner 414. The RFIC 412 may include one or more controllers, state machines and/or processors that configure and control certain aspects of the RF front-end. Another RFFE bus $410_2$ may couple the modem 402 to a switch 416 and a low noise amplifier (LNA 418). Another RFFE bus $410_1$ may couple the modem 402 to a power amplifier (PA 420) and a power tracking module 422. Other types of devices may be coupled by one or more of the RFFE buses $410_1$-$410_N$, and other assignments and allocations of devices 412, 414, 416, 418, 420, 422 to RFFE buses $410_1$-$410_N$ may be configured according to application needs.

Figure 5:
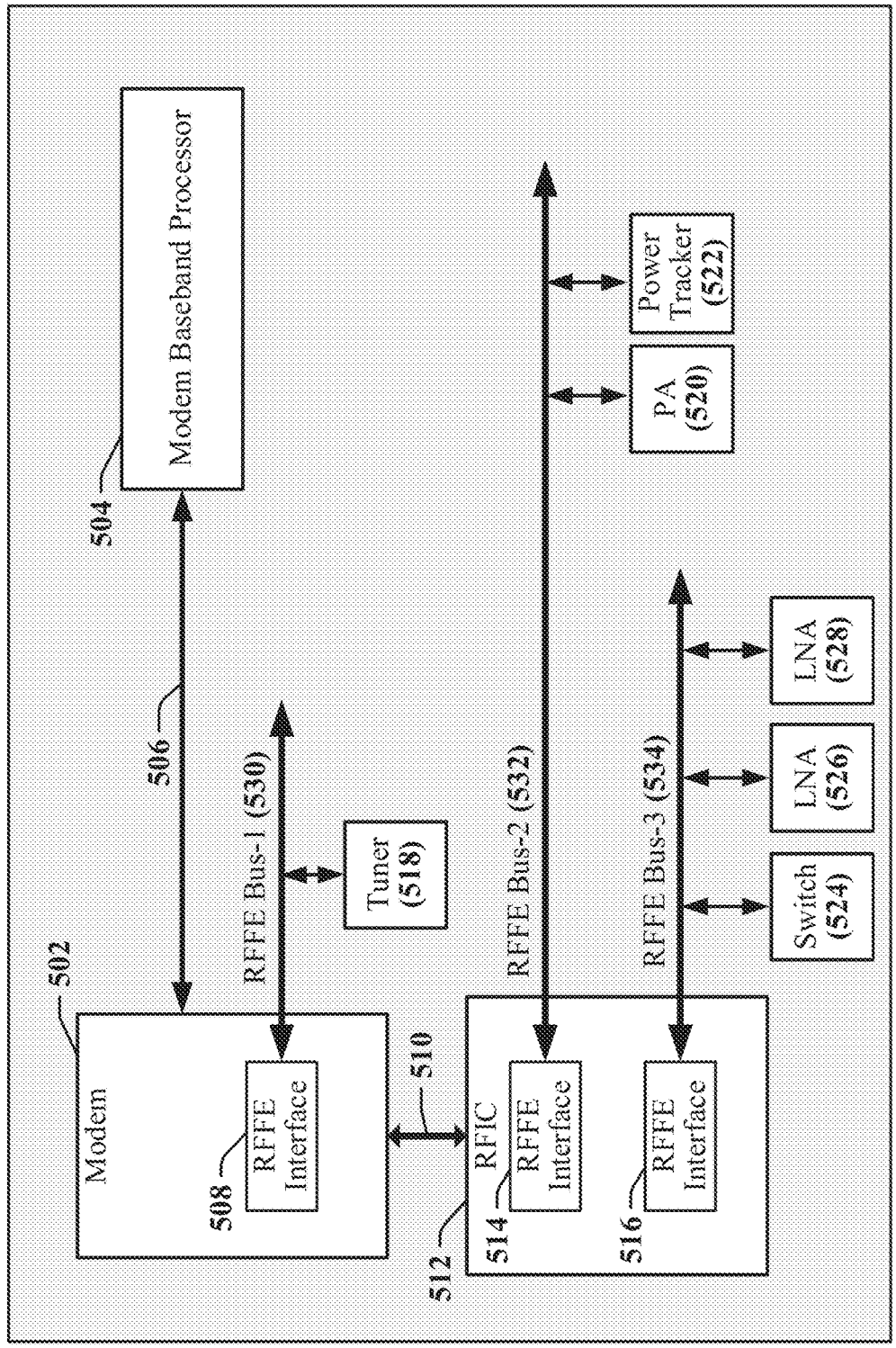
FIG. 5 illustrates a second example of a device configuration for coupling various radio frequency front-end devices using multiple RFFE buses.

FIG. 5 is a block diagram illustrating a second example of an apparatus 500 that includes chipsets or devices, in which various RF front-end devices 518, 520, 522, 524, 526 528 are coupled by multiple RFFE buses 530, 532, 534. In this example, a modem 502 includes an RFFE interface 508 that couples the modem 502 to a first RFFE bus 530. The modem 502 may communicate with a baseband processor 504 and an RFIC 512 through one or more communication links 506, 510. The illustrated apparatus 500 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the apparatus 500 may be implemented with one or more baseband processors 504, modems 502, RFICs 512, multiple communications links 506, 510, multiple RFFE buses 530, 532, 534 and/or other types of buses. The apparatus 500 may include other processors, circuits, modules and may be configured for various operations and/or different functionalities. In the apparatus 500 illustrated in FIG. 5, the Modem 502 is coupled to an RF tuner 518 through its RFFE interface 508 and the first RFFE bus 530. The RFIC 512 may include one or more RFFE interfaces 514, 516, controllers, state machines and/or processors that configure and control certain aspects of the RF front-end. The RFIC 512 may communicate with a PA 520 and a power tracking module 522 through a first RFFE, interface 514 and the second RFFE bus 532. The RFIC 512 may communicate with a switch 524 and one or more LNAs 526, 528 through a second RFFE interface 516 and the third RFFE bus 534.

Figure 6:
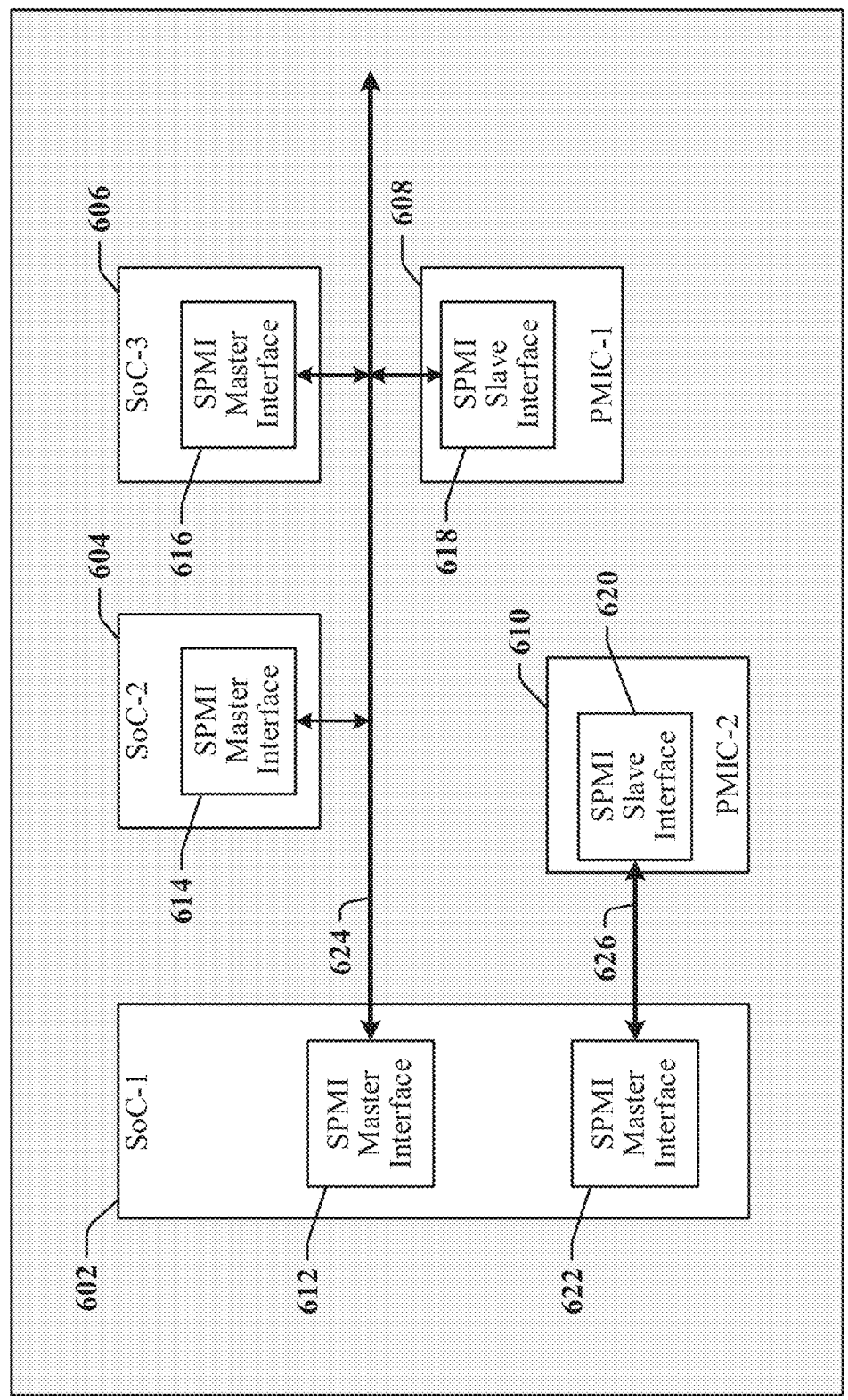
FIG. 6 illustrates a device that employs an SPMI bus to couple various front-end devices in accordance with certain aspects disclosed herein.

FIG. 6 illustrates an example of a system 600 that employs one or more serial buses 624, 626 operated in accordance with SPMI protocols. In various examples, SPMI protocols may be used to provide a power management control bus that can communicate commands to cause circuits and/or functional components to reset, sleep, shutdown, wakeup, and so on. In some implementations, SPMI protocols may be used to implement a general-purpose communication link A two-wire serial bus 624, 626 may connect one or more master devices 602, 604, 606 to multiple slave devices (PMICs 608, 610). In one implementation, between one and four master devices may be coupled to the serial bus 624, 626 and up to 16 slave devices may be supported. The serial bus 624, 626 includes a first wire (SCLK) that carries a clock signal and a second wire that carries a data signal (SDATA). SPMI protocols support bus contention arbitration, request arbitration and group addressing to permit the PMICs 608, 610 to be written concurrently or simultaneously by a master device (SoCs 602, 604, 606). In some implementations, SPMI supports a low-speed mode that operates with a clock frequency of between 32 kHz and 15 MHz, and a high-speed mode that operates with a clock frequency of between 32 kHz and 26 MHz. SPMI devices may be required to acknowledge certain commands.

In the illustrated example, the system 600 includes three SoCs 602, 604, 606 and two power management integrated circuits (PMICs 608, 610). Other types of peripheral devices may be coupled to a serial bus 624, 626 operated in accordance with SPMI protocols. In the illustrated system 600, a first serial bus 624 couples a bus master 612, 614, 616 on each SoC 602, 604, 606 and a bus slave 618 on a first PMIC 608, with a second serial bus 626 couples a bus slave 620 in a second PMIC 610 to an additional bus master 622 provided in one SoC 602.

Data Transfers Over an I3C Serial Bus

Figure 7:
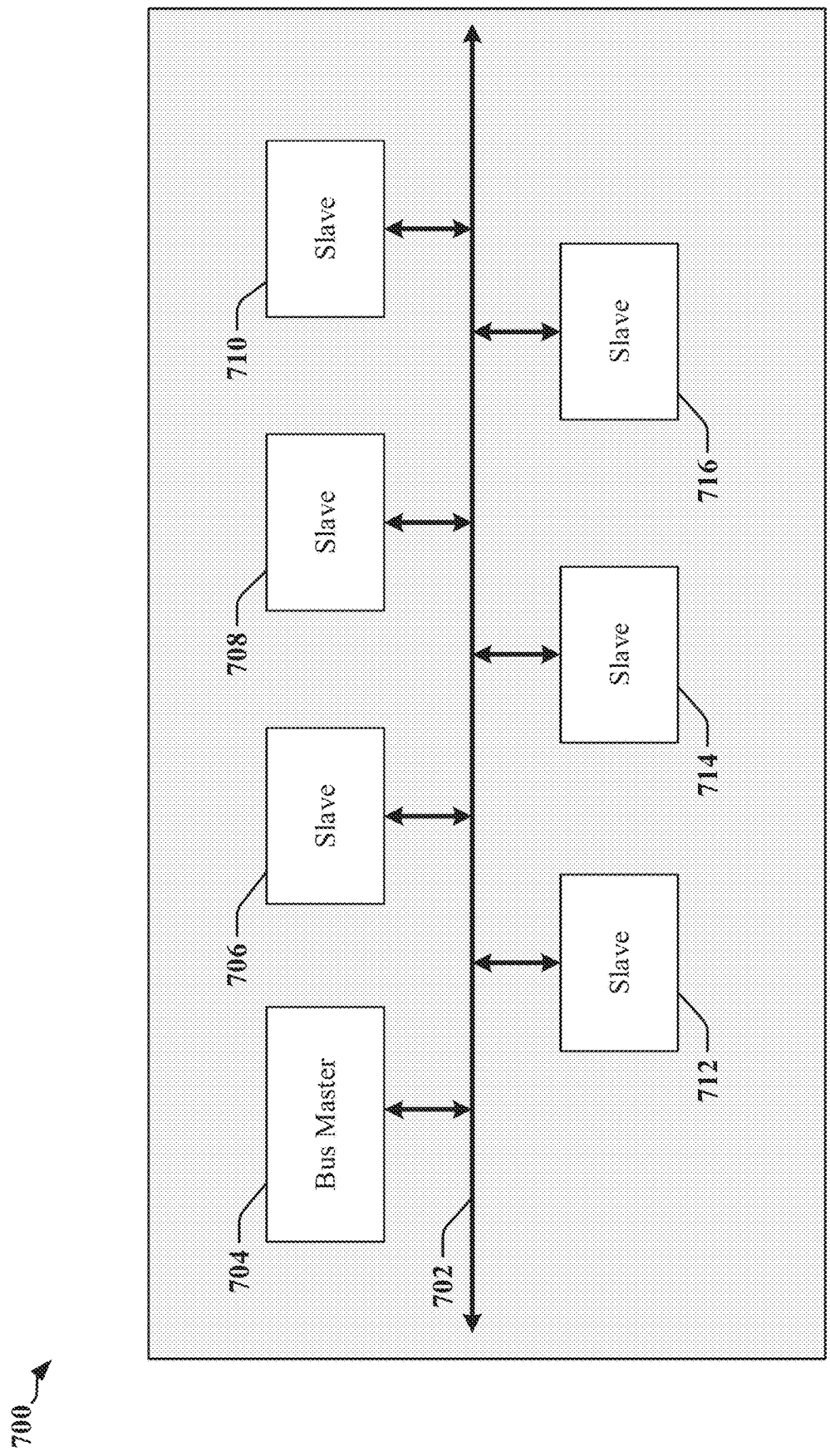
FIG. 7 illustrates a communication interface in which a plurality of devices is connected using a serial bus operated in accordance with an I2C or I3C protocol.

FIG. 7 illustrates a system 700 in which multiple devices 704, 706, 708, 710, 712, 714 and 716 are connected using a serial bus 702 that may be operated in accordance with I2C and/or I3c protocols. In one example, the devices 704, 706, 708, 710, 712, 714 and 716 may be adapted or configured to communicate over the serial bus 702 in accordance with an I3C protocol. In some instances, one or more of the devices 704, 706, 708, 710, 712, 714 and 716 may alternatively or additionally communicate using other protocols, including an I2C protocol, for example.

Communication over the serial bus 702 may be controlled by a master device 704. In one mode of operation, the master device 704 may be configured to provide a clock signal that controls timing of transmission of data encoded in a data signal. In another mode of operation, two or more of the devices 704, 706, 708, 710, 712, 714 and 716 may be configured to exchange data encoded in symbols, where timing information is embedded in the signaling state of both wires in each symbol transmission interval.

Figure 8:
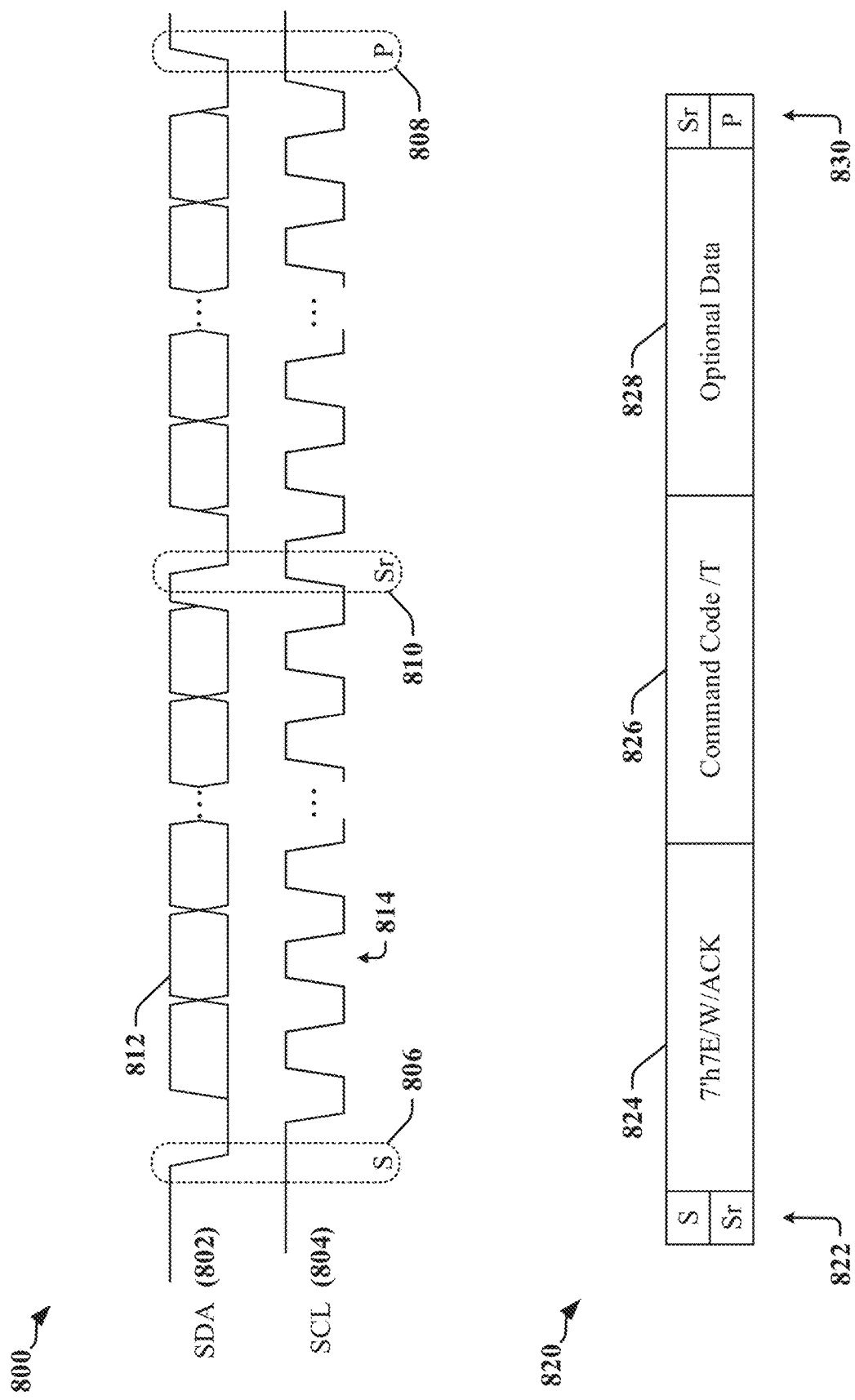
FIG. 8 includes a timing diagram that illustrates signaling on a serial bus when the serial bus is operated in a single data rate (SDR) mode of operation defined by I3C specifications.

FIG. 8 includes a timing diagram 800 that illustrates signaling on a serial bus when the serial bus is operated in a single data rate (SDR) mode of operation defined by I3C specifications. Data transmitted on a first wire (SDATA 802) of the serial bus may be captured using a clock signal transmitted on a second wire (SCLK 804) of the serial bus. During data transmission, the signaling state 812 of SDATA 802 is expected to remain constant for the duration of the pulses 814 when SCLK 804 is at a high voltage level. Transitions on SDATA 802 when SCLK 804 is at the high voltage level indicate a START condition 806, a STOP condition 808 or a repeated START 810.

On an I3C serial bus, a START condition 806 is defined to permit the current bus master to signal that data is to be transmitted. The START condition 806 occurs when SDATA 802 transitions from high to low while SCLK 804 is high. The bus master may signal completion and/or termination of a transmission using a STOP condition 808. The STOP condition 808 is indicated when SDATA 802 transitions from low to high while SCLK 804 is high. A repeated START 810 may be transmitted by a bus master that wishes to initiate a second transmission upon completion of a first transmission. The repeated START 810 is transmitted instead of a STOP condition 808 and has the significance of the STOP condition 808 followed immediately by a START condition 806. The repeated START 810 occurs when SDATA 802 transitions from high to low while SCLK 804 is high.

The bus master may transmit an initiator 822 that may be a START condition 806 or a repeated START 810 prior to transmitting an address of a slave, a command, and/or data. FIG. 8 illustrates a command code transmission 820 by the bus master. The initiator 822 may be followed in transmission by a predefined command 824 indicating that a command code 826 is to follow. The command code 826 may, for example, cause the serial bus to transition to a desired mode of operation. In some instances, data 828 may be transmitted. The command code transmission 820 may be followed by a terminator 830 that may be a STOP condition 808 or a repeated START 810.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal.

Virtual General-Purpose Input/Output

Figure 9:
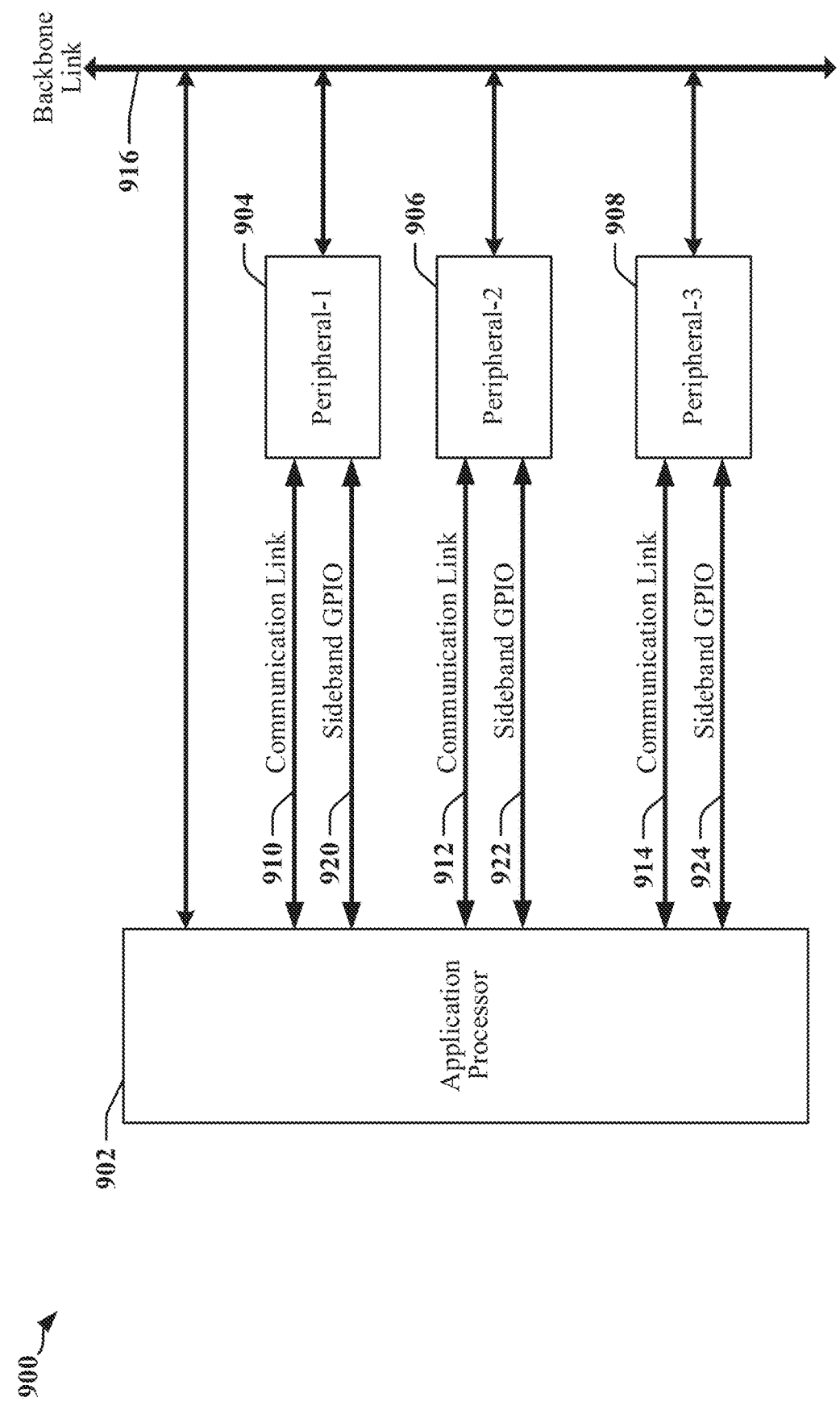
FIG. 9 illustrates an apparatus that includes an Application Processor and multiple peripheral devices that may be adapted according to certain aspects disclosed herein.

Mobile communication devices, and other devices that are related or connected to mobile communication devices, increasingly provide greater capabilities, performance and functionalities. In many instances, a mobile communication device incorporates multiple IC devices that are connected using a variety of communications links FIG. 9 illustrates an apparatus 900 that includes an Application Processor 902 and multiple peripheral devices 904, 906, 908. In the example, each peripheral device 904, 906, 908 communicates with the Application Processor 902 over a backbone link 916 and a respective communication link 910, 912, 914, which may be operated in accordance with one or more protocols, that may be different from one another. Communication between the Application Processor 902 and each peripheral device 904, 906, 908 may involve additional wires that carry control or command signals between the Application Processor 902 and the peripheral devices 904, 906, 908. These additional wires may be referred to as sideband general purpose input/output (sideband GPIO 920, 922, 924), and in some instances the number of connections needed for sideband GPIO 920, 922, 924 can exceed the number of connections used for data wires in a communication link 910, 912, 914.

GPIO provides or includes generic pins/connections that may be customized for particular applications. For example, a GPIO pin may be programmable to function as an output pin, input pin or a bidirectional pin, in accordance with application needs. In one example, the Application Processor 902 may assign and/or configure a number of GPIO pins to conduct handshake signaling or inter-processor communication (IPC) with a peripheral device 904, 906, 908 such as a modem. When handshake signaling is used, sideband signaling may be symmetric, where signaling is transmitted and received by the Application Processor 902 and/or one or more of the peripheral devices 904, 906, 908. With increased device complexity, an associated increase in the number of GPIO pins used for IPC communication may significantly escalate manufacturing costs and limit GPIO availability for other system-level peripheral interfaces.

According to certain aspects, the state of GPIO, including GPIO associated with a communication link, may be captured, serialized and transmitted over a data communication link In one example, captured GPIO may be transmitted in packets over a serial bus operated in accordance with an I2C, I3C, RFFE, SPMI and/or another protocol. In the example of a serial bus operated in accordance with I3C protocols, common command codes may be used to indicate packet payload and/or destination. The communication links 910, 912, 914 may be used to inform the peripherals of changes to priority of different messages. The backbone link 916 may be used to provide high level coordination messaging and general control messaging between the peripheral devices 904, 906, 908 and the Application Processor 902.

Figure 10:
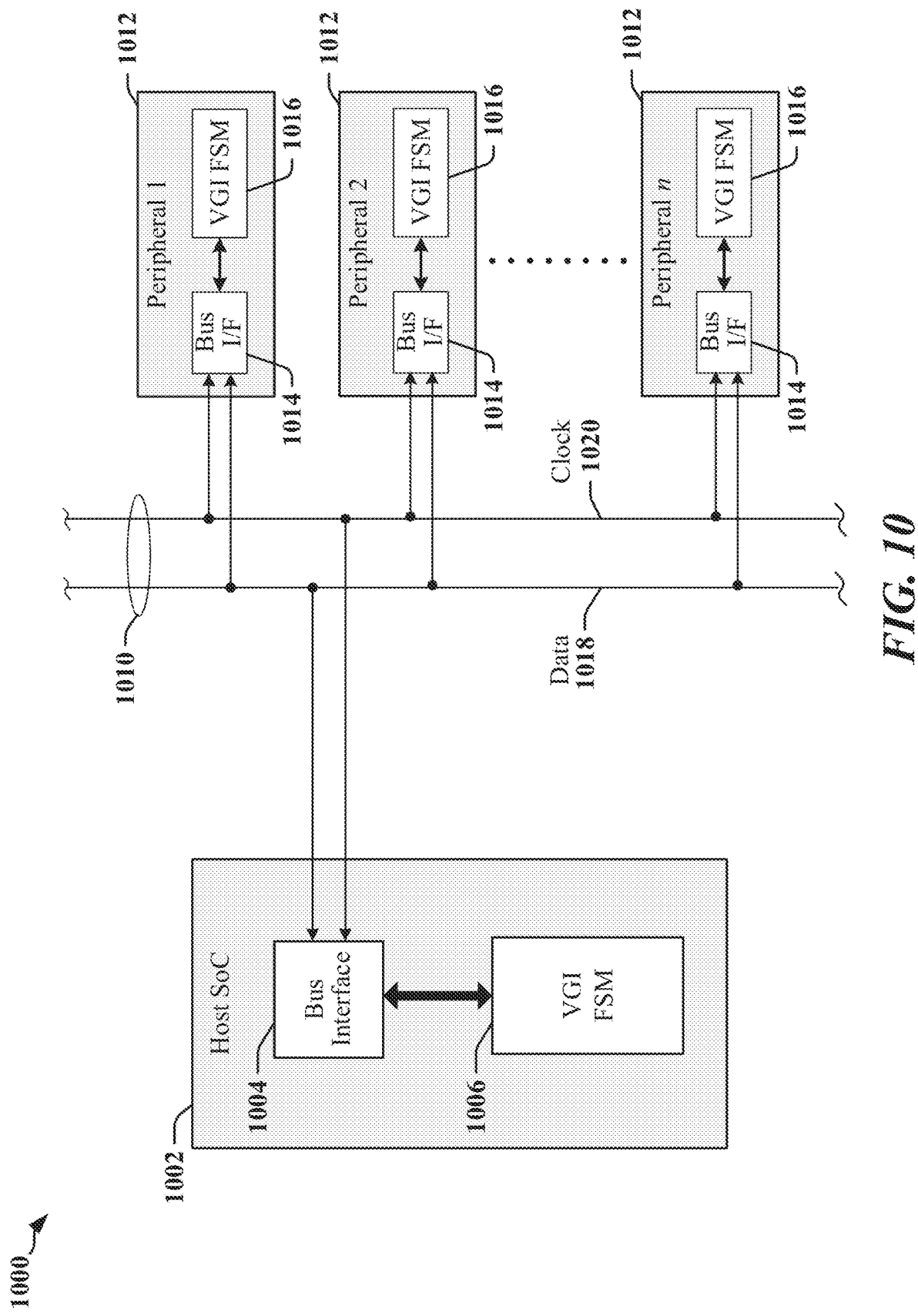
FIG. 10 illustrates a device that employs a serial bus to couple various front-end devices in accordance with certain aspects disclosed herein.

FIG. 10 illustrates an example of an apparatus 1000 that uses a multi-drop serial bus 1010 to couple various devices including a host SoC 1002 and one or more peripheral devices 1012. The host SoC 1002 may include a virtual GPIO finite state machine (VGI FSM 1006) and a bus interface 1004, where the bus interface 1004 cooperates with corresponding bus interfaces 1014 in the peripheral devices 1012 to operate on a communication link deployed between the host SoC 1002 and the peripheral devices 1012. In the example, each peripheral device 1012 includes a VGI FSM 1016 that can manage translations between GPIO state and messages carrying virtualized GPIO. In the illustrated example, virtualized GPIO messages may be serialized and exchanged by the SoC 1002 and one or more peripheral devices 1012 over the multi-drop serial bus 1010 in accordance with an I3C protocol or another protocol. The host SoC 1002 may include one or more bus interfaces, including interfaces that support I2C, I3C, SPMI and/or RFFE, protocols. In some examples, the host SoC 1002 may include a configurable interface that may be employed to communicate using I2C, I3C, SPMI, RFFE and/or another suitable protocol. In some examples, the multi-drop serial bus 1010 may transmit data in a signal carried on a data wire 1018 and timing information in a clock signal carried on a clock wire 1020.

Figure 11:
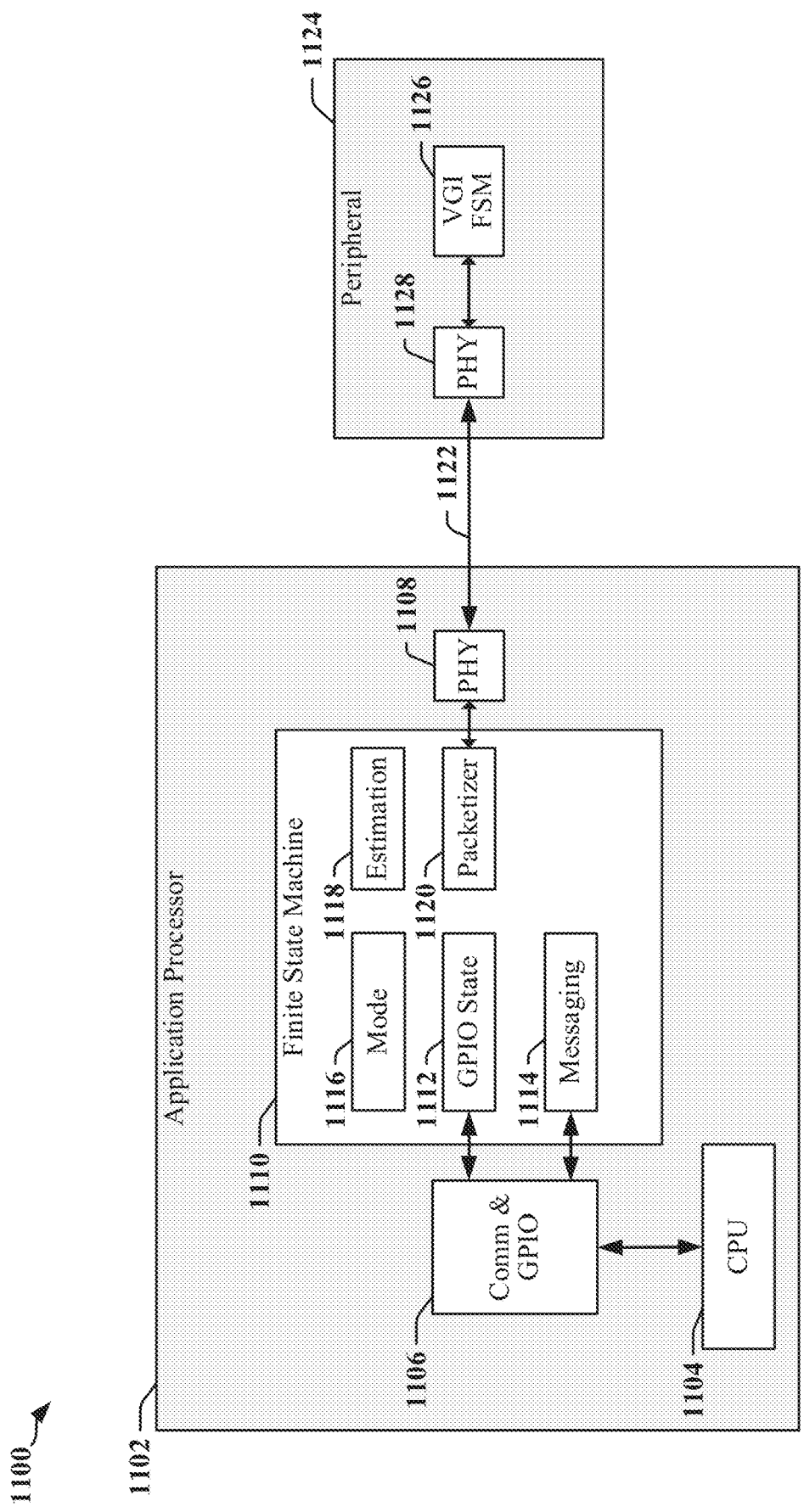
FIG. 11 illustrates an apparatus that has been adapted to support Virtual GPIO in accordance with certain aspects disclosed herein.

FIG. 11 illustrates an apparatus 1100 that is adapted to support Virtual GPIO (VGI or VGMI) in accordance with certain aspects disclosed herein. VGI-capable circuits and techniques can reduce the number of physical pins and connections used to connect an Application Processor 1102 with a peripheral device 1124. VGI enables GPIO state from a plurality sources to be serialized into VGI messages that can be transmitted over a communication link 1122. In one example, VGI messages may be encoded in packets that are transmitted over a communication link 1122 that includes a multi-drop serial bus. A receiving peripheral device 1124 may deserialize received packets and may extract VGI messages and other types of message from a received transmission. In one example, a VGI FSM 1126 in the peripheral device 1124 may convert the VGI messages to physical GPIO signals that can be presented at an internal GPIO interface.

In another example, the communication link 1122 may be accessed through a radio frequency transceiver that supports RF communication using, for example, a Bluetooth protocol, a WLAN protocol, a cellular wide area network protocol, and/or another RF communication protocol. When the communication link 1122 includes an RF connection, VGI messages may be encoded with other types of messages in packets, frames, subframes, or other structures that can be transmitted over the communication link 1122. The receiving peripheral device 1124 may extract, deserialize and otherwise process received transmissions to extract the VGI messages and other messages. Upon receipt of VGI messages and/or other types of messages, the VGI FSM 1126 or another component of the receiving device may interrupt its host processor to indicate receipt of messages and/or any changes in GPIO signals.

In an example in which the communication link 1122 is provided as a serial bus, VGI messages and/or other types of messages may be transmitted in packets configured for an I2C, I3C, SPMI, RFFE or another standardized serial interface. In the illustrated example, VGI techniques are employed to accommodate I/O bridging between an Application Processor 1102 and a peripheral device 1124. The Application Processor 1102 may be provided in an ASIC, SoC, or in some combination of devices. The Application Processor 1102 includes a processor (central processing unit or CPU 1104) that generates messages to carry GPIO state associated with one or more communication channels 1106. VGI messages and/or other types of messages generated by the communication channels 1106 may be monitored by respective monitoring circuits 1112, 1114 in a VGI FSM 1126. In some examples, a GPIO monitoring circuit 1112 may be adapted to produce VGI messages representative of the state of physical GPIO and/or changes in the state of the physical GPIO. In some examples, other circuits are provided to produce the VGI messages representative of the state of physical GPIO and/or changes in the state of the physical GPIO.

An estimation circuit 1118 may be configured to estimate latency information that may be used to determine latency associated with the transmission of VGI messages using different communication links 1122 and/or protocols. The estimation circuit 1118 may select a protocol, and/or a mode of communication for the communication link 1122 that optimizes the latency for encoding and transmitting the GPIO signals and messages. In some implementations or instances, the estimation circuit 1118 may select a fixed table or programmable table that can be used to sort the traffic dynamically or configuration rate of notifications etc. The estimation circuit 1118 may maintain protocol and mode information 1116 that characterizes certain aspects of the communication link 1122 to be considered when selecting the protocol, and/or a mode of communication. The estimation circuit 1118 may be further configured to select a packet type for encoding and transmitting the GPIO state in VGI messages. The estimation circuit 1118 may provide configuration information used by a packetizer 1120 to encode the GPIO signals and messages. In one example, the configuration information is provided as a command that may be encapsulated in a packet such that the type of packet can be determined at a receiver. The configuration information, which may be a command, may also be provided to physical layer circuits (PHY 1108). The PHY 1108 may use the configuration information to select a protocol and/or mode of communication for transmitting the associated packet. The PHY 1108 may then generate the appropriate signaling to transmit the packet.

The peripheral device 1124 may include a VGI FSM 1126 that may be configured to process data packets received from the communication link 1122. The VGI FSM 1126 at the peripheral device 1124 may extract messages and may map bit positions in VGI messages onto physical GPIO pins in the peripheral device 1124. In certain embodiments, the communication link 1122 is bidirectional, and both the Application Processor 1102 and a peripheral device 1124 may operate as both transmitter and receiver.

The PHY 1108 in the Application Processor 1102 and a corresponding PHY 1128 in the peripheral device 1124 may be configured to establish and operate the communication link 1122. The PHY 1108 and 1128 may be coupled to, or include a transceiver that supports RF communications. In some examples, the PHY 1108 and 1128 may support a two-wire interface such an I2C, I3C, RFFE, SPMI, SMBus, or other interfaces in the Application Processor 1102 and in the peripheral device 1124, and VGI messages and/or other types of messages may be encapsulated in a packet transmitted over the communication link 1122, which may be a multi-drop serial or parallel bus, for example.

Certain aspects disclosed herein may be referred to as VGI tunneling. VGI tunneling can be implemented using existing or available protocols configured for operating the communication link 1122, and without the full complement of physical GPIO pins. VGI FSMs 1110, 1126 may exchange GPIO state information without the intervention of a CPU 1104 in the Application Processor 1102 and/or in the peripheral device 1124. The use of VGI messages can reduce pin count, power consumption, and latency associated with the communication link 1122.

At the receiving device, VGI messages are converted into physical GPIO state information. Certain characteristics of the physical GPIO pins may be configured using the VGI messages. For example, slew rate, polarity, drive strength, and other related parameters and attributes of the physical GPIO pins may be configured using the VGI messages. Configuration parameters used to configure the physical GPIO pins may be stored in configuration registers associated with corresponding GPIO pins. These configuration parameters can be addressed using a proprietary or conventional protocol such as I2C, I3C, SPMI or RFFE. In one example, configuration parameters may be maintained in addressable registers. Certain aspects disclosed herein relate to reducing latencies associated with the transmission of configuration parameters and corresponding addresses (e.g., addresses of registers used to store configuration parameters).

A VGI interface may enable transmission of VGI messages and/or other types of messages to be sent in a serial data stream over a communication link 1122. In one example, a serial data stream may include data encapsulated in packets, and the serial data stream may include a sequence of transactions conducted over a serial bus operated in accordance with an I2C, I3C, SPMI or RFFE protocol. The presence of VGI messages in a frame transmitted over the serial bus may be signaled using a special command code to identify the frame as a VGPIO frame. VGPIO frames may be transmitted as broadcast frames or addressed frames. In some implementations, a serial data stream may be transmitted in a form that resembles a universal asynchronous receiver/transmitter (UART) signaling protocol, in what may be referred to as VGI_UART mode of operation.

Consolidating WCI-2 Messages Over a Multi-Drop Bus

Figure 12:
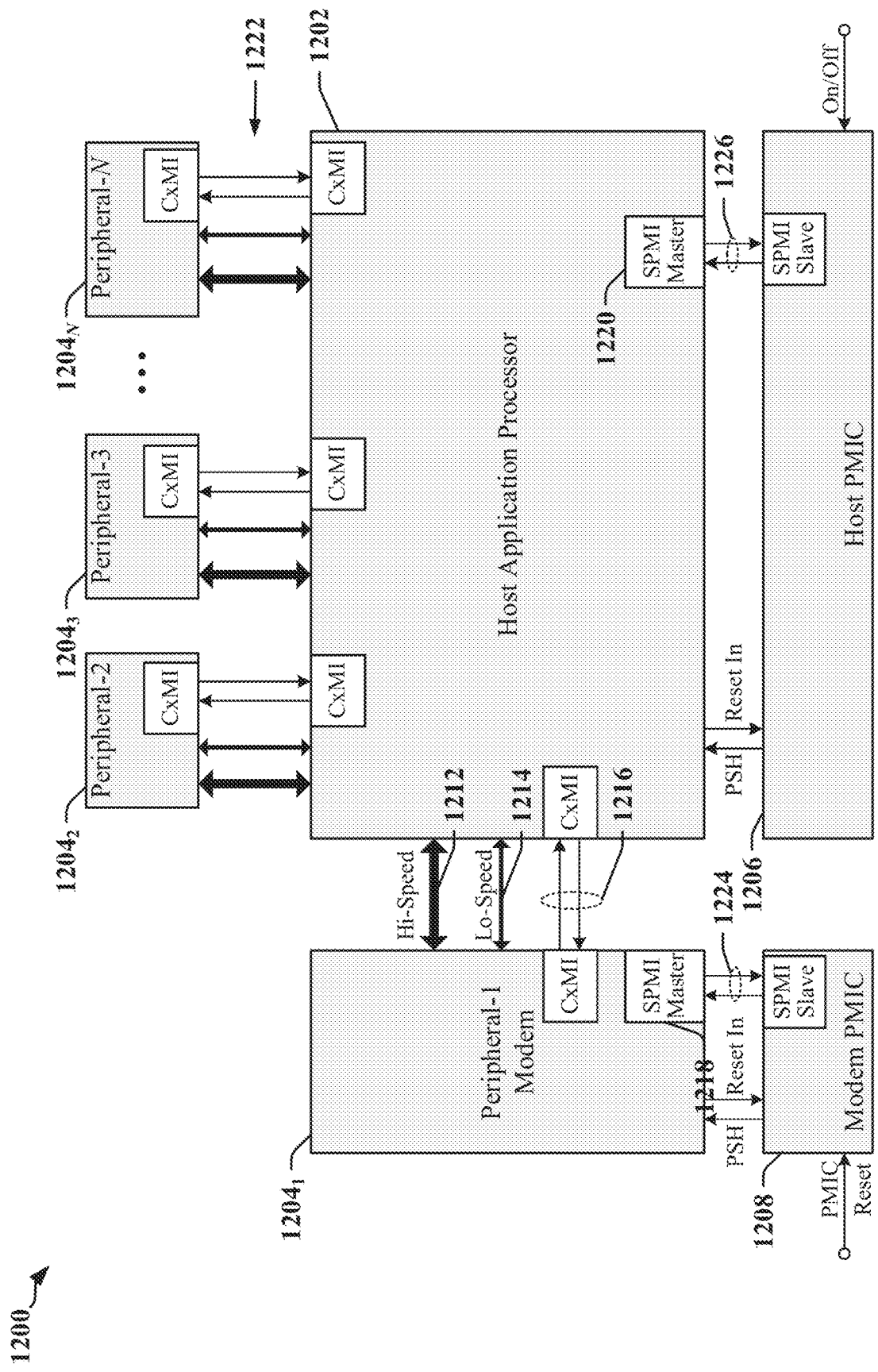
FIG. 12 illustrates an example of a system which includes one or more communication links configured to exchange coexistence management messages.

FIG. 12 illustrates an example of a system 1200 that includes multiple CxMi links In some examples, it may be desirable to communicate WCI-2 messages over a single serial bus. In certain examples provided herein, an SPMI link 1224, 1226 may be adapted to carry WCI-2 messages, although the concepts described herein may be applied to a serial operated in accordance with an I2C, I3C, RFFE or other protocol. The system 1200 may include an application processor 1202 that may serve as a host device on various communication links, multiple peripherals $1204_1$-$1204_N$, and one or more power management integrated circuits (PMICs 1206, 1208). In the illustrated system 1200, at least a first peripheral $1204_1$ may include or operate as a modem. The application processor 1202 and the first peripheral $1204_1$ may be coupled to respective PMICs 1206, 1208 using GPIO that provides a combination of reset and other signals, and one or more SPMI link s1224, 1226 that may be controlled by an SPMI master 1218, 1220. The SPMI link 1224, 1226 operates as a serial interface defined by the MIPI Alliance, and is optimized for the real-time control of devices including PMICs 1206, 1208. The SPMI link 1224, 1226 may be configured as a shared bus that provides high-speed, low-latency connection for multiple devices, where data transmissions may be managed according to priorities assigned to different traffic classes.

The application processor 1202 may be coupled to each of the peripherals $1204_1$-$1204_N$ using multiple communication links 1212, 1214, 1216, 1222, 1226 and GPIO. For example, the application processor 1202 may be coupled to the first peripheral $1204_1$ using a high-speed bus 1212, a low-speed bus 1214 and a two-wire CxMi link 1216. As disclosed herein, WCI-2 messages that are conventionally transmitted using UARTs coupled to a CxMi link may be transferred through certain serial interfaces, including the SPMI masters 1218, 1220, an I2C or I3C interface, and/or an RFFE interface.

Figure 13:
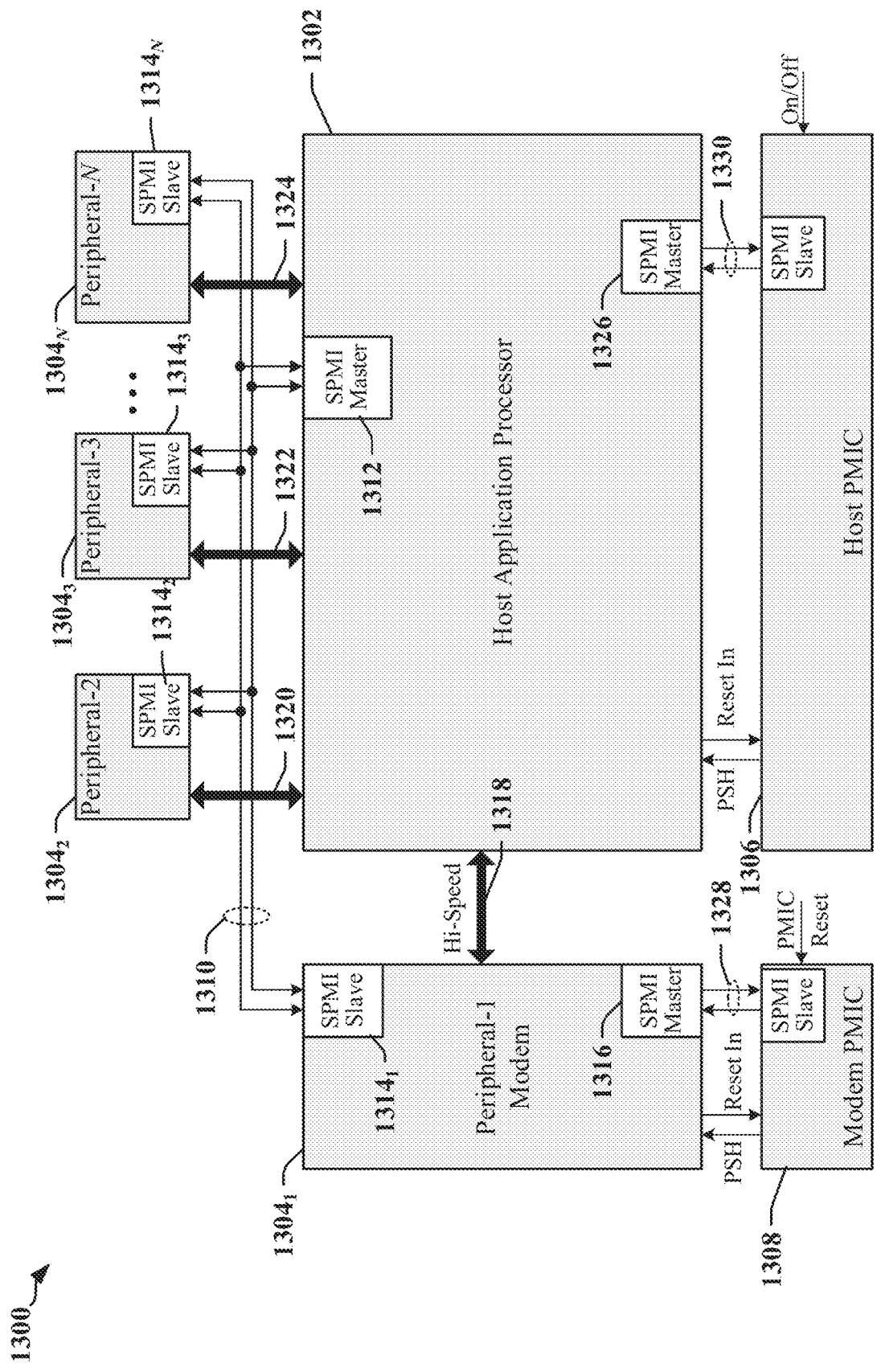
FIG. 13 illustrates an example of a system which virtualizes and consolidates communication of GPIO state associated with multiple devices and/or communication links using a single serial communication link in accordance with certain aspects disclosed herein.

FIG. 13 illustrates an example of a system 1300 which can consolidate and communicate WCI-2 messages between multiple combinations of devices using one or more serial bus. In the illustrated example, a multi-drop serial bus 1310 operated in accordance with SPMI protocols may be used to WCI-2 messages between multiple devices, including for example a host application processor 1302 and peripherals 1304$_k$-1304$_N$. The WCI-2 protocol can be adjusted and generalized when tunneled over the multi-drop serial bus 1310. For example, the WCI-2 messages can be extended or expanded to form new messages.

The multi-drop serial bus 1310 may carry other traffic, including application data, virtualized state information for sideband GPIO associated with each high-speed serial link 1318, 1320, 1322, 1324, and other VGPIO associated with the host application processor 1302 and/or one or more of the peripherals 1304$_1$-1304$_N$, which may be transmitted in VGI messages over the multi-drop serial bus 1310. In one example, the host application processor 1302 may include an SPMI master 1312 and each of the peripherals 1304$_1$-1304$_N$ may include SPMI slaves 1304$_1$-1304$_N$.

The system 1300 may include a host application processor 1302 that may serve as a host device on various communication links, including the multi-drop serial bus 1310. One or more power management integrated circuits (PMICs 1306, 1308) may be included in the system 1300 and may be coupled to the host application processor 1302 or peripheral devices 1304$_1$-1304$_N$ through SPMI links 1328, 1330. The host application processor 1302 or peripheral devices 1304$_1$-1304$_N$ may include an interface circuit 1316, 1326 that serves as a bus master on the corresponding SPMI link 1328, 1330. In the illustrated system 1300, at least a first peripheral 1304$_1$ includes a modem.

The multi-drop serial bus 1310 may be operated in accordance with SPMI protocols. Other protocols may be used for transferring WCI-2 messages at high speed, and with low latency. In one example, an RFFE bus may be employed for communicating WCI-2 messages. In another example, an I3C bus may be employed for communicating WCI-2 messages. As disclosed herein, GPIO signals may be virtualized and transferred over the multi-drop serial bus 1310. The transfer of the WCI-2 messages and/or virtualized GPIO signals may be accomplished without modifying the protocols used on the multi-drop serial bus 1310. In some examples, a finite state machine may be used to control the operation of the multi-drop serial bus 1310, including prioritizing messages.

A backbone link (e.g., the backbone link 916 of FIG. 9) may be provided and used to configure different information exchanges. A backbone link, which may exhibit longer latency, can be used to define how priority between different GPIOs or between different message sources is managed. The use of a backbone link permits the multi-drop serial bus 1310 to be reserved for the exchange of core coexistence information and higher-level messages can be exchanged through the backbone link In one example, the backbone link may be used to coordinate the host application processor 1302 and the peripherals 1304$_1$-1304$_N$, and may be used to configure formats and protocols for sending different types of messages. This allows the multi-drop serial bus 1310 to guarantee a better variation in latency response as more clients are added to the system.

Configurable WCI-2 Messaging

Figure 14:
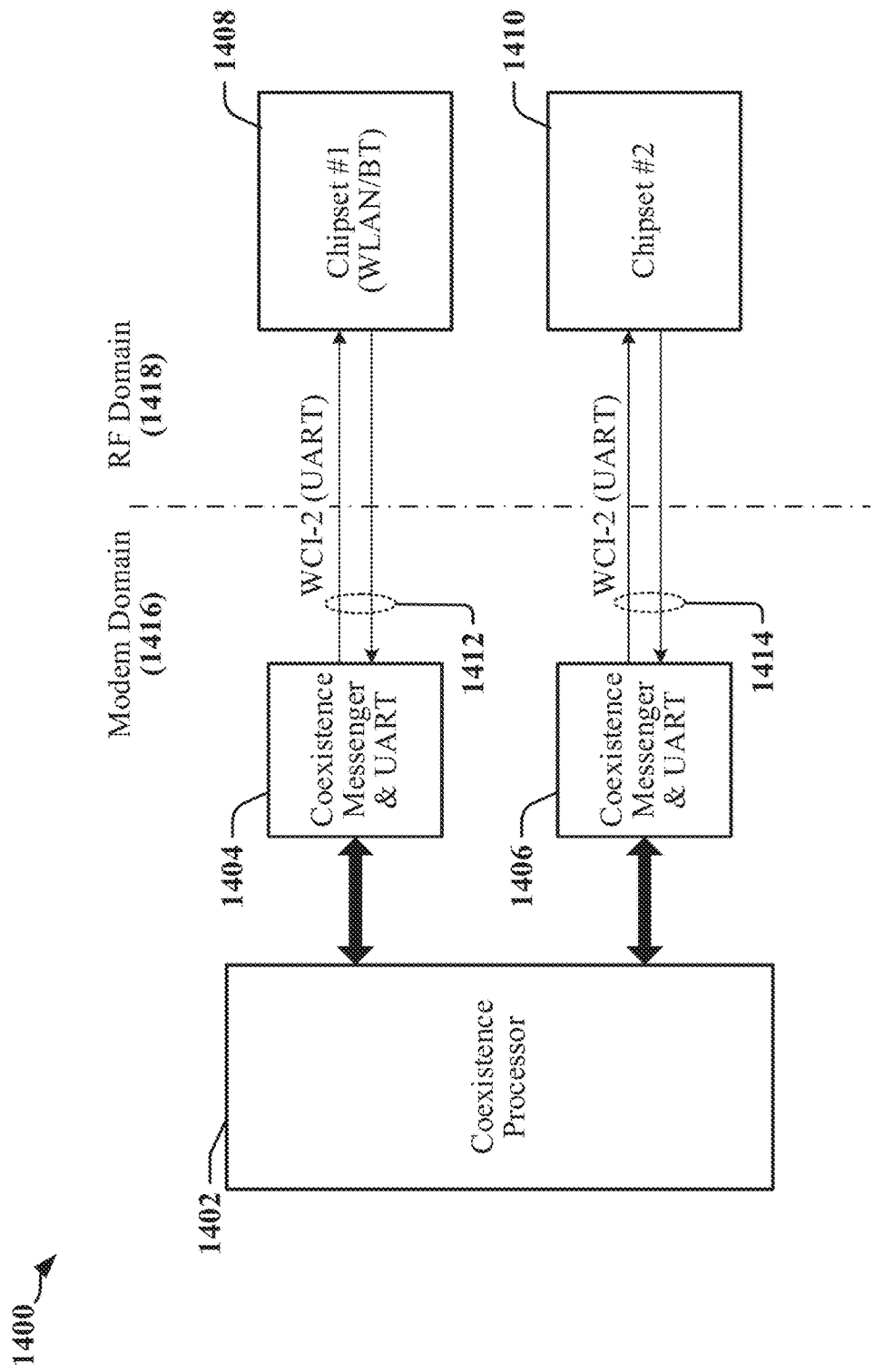
FIG. 14 illustrates an example of a co-existence management architecture that may be adapted in accordance with certain aspects disclosed herein.

FIG. 14 illustrates an example of a conventional RF Co-Existence management architecture 1400 that may be implemented in a mobile device. The conventional RF Co-Existence management architecture 1400 may include multiple instances of low bandwidth point-to-point interfaces, typically implemented using a UART that exchanges low volume, low-latency coexistence information between devices. In one example, the coexistence information is transmitted as a single byte between a modem domain 1416 and an RF domain 1418. The RF domain 1418 may include one or more RF devices, which may include a WLAN/Bluetooth chipset 1408 and one or more other RF chipsets 1410. In the illustrated example, each RF chipset 1408, 1410 communicates with a corresponding coexistence messenger 1404, 1406 over a 2-wire (or 4-wire) point-to-point link 1412, 1414 implemented using UARTs provided in the RF chipsets 1408, 1410 and coexistence messengers 1404, 1406. The coexistence messengers 1404, 1406 may be managed and/or controlled by a coexistence processor 1402 or other controller, state machine, processor and/or algorithms that executes coexistence management software.

The use of point-to-point links 1412, 1414 consumes a large number of physical pins and interconnects. Package cost and printed circuit board complexity can be increased significantly in devices that support multiple RF interfaces. Package cost and printed circuit board complexity can be significantly reduced when coexistence messages are communicated over one or more high-speed multi-drop bus interfaces, including multi-drop serial buses that are used for other inter-device communication purposes.

Figure 15:
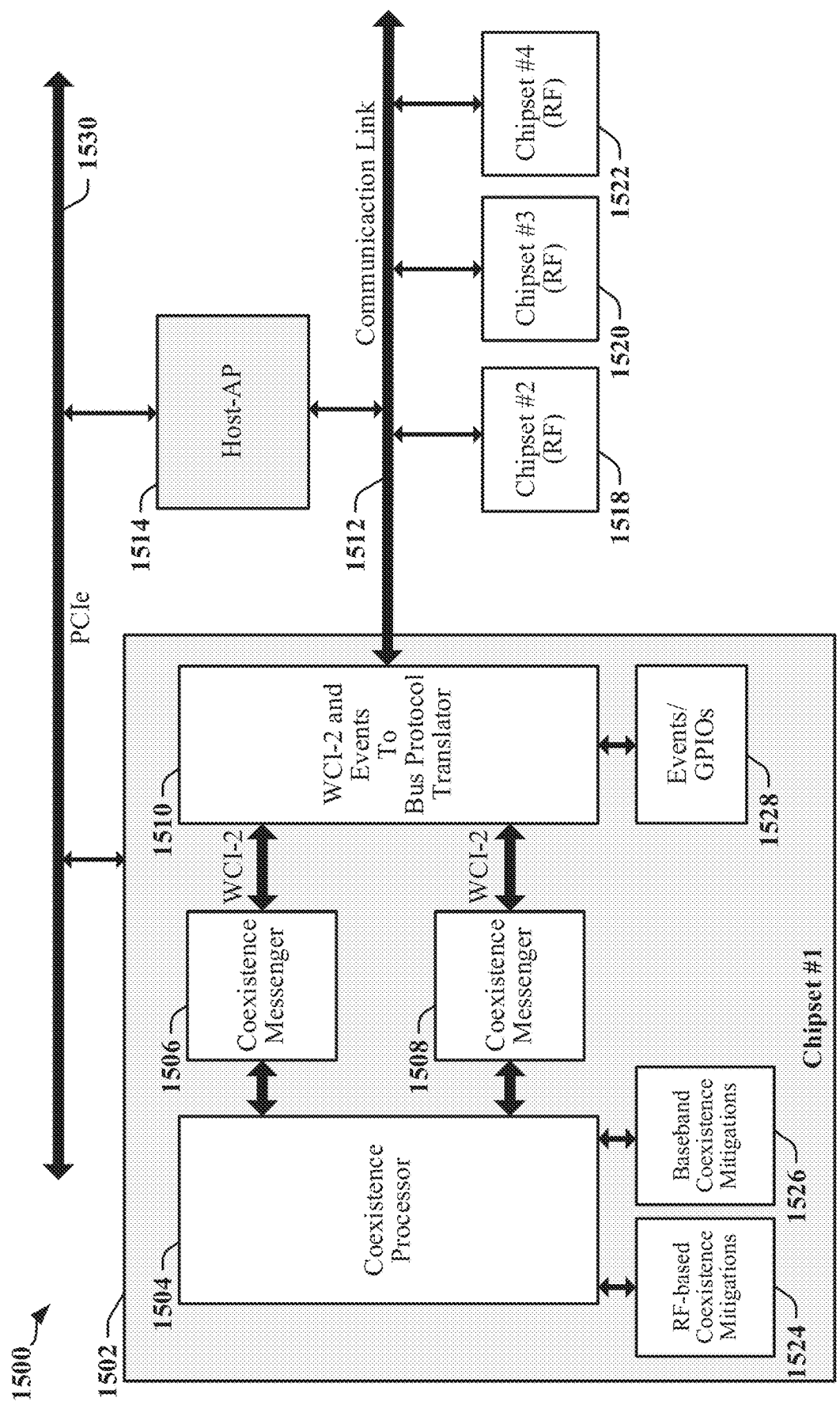
FIG. 15 illustrates a first example of a coexistence management architecture that may be implemented using a multi-drop serial bus in accordance with certain aspects disclosed herein.

FIG. 15 illustrates a first example of a Co-Existence management architecture 1500 that may be implemented using a communication link 1512 deployed in a mobile device. The communication link 1512 may include one or more multi-drop serial buses operated in accordance with a protocol such as an RFFE, SPMI, I3C and/or other suitable protocol. In the example, a first chipset 1502, which may be operated as a modem for example, includes a coexistence processor 1504 configured receive and process RF-based coexistence mitigation information 1524 and baseband coexistence mitigation information 1526. In some instances, the coexistence processor 1504 generates coexistence messages and manages one or more coexistence messengers 1506, 1508. The coexistence messengers 1506, 1508 may be configured to handle messaging between the first chipset 1502 and at least one device and/or one or more RF chipsets 1518, 1520, 1522. In some implementations, the coexistence processor 1504 may include some combination of a controller, state machine, and/or processor with software modules that may include algorithms and instructions that cause the coexistence processor 1504 to perform coexistence management functions, such as adjusting RF transmission power, inhibiting transmissions for some period of time, accepting reduced signal quality for a period of time, etc. The RF chipsets 1518, 1520, 1522 or another device involved in coexistence management may also include a coexistence processor and/or coexistence messenger.

The coexistence messengers 1506, 1508 may generate WCI-2 messages for transmission to one or more RF chipsets 1518, 1520, 1522. The WCI-2 messages are provided to a translator 1510 that generates datagrams that can carry the coexistence messages over the communication link 1512. The datagrams may be configured in accordance with a protocol used to manage and control transmissions on a multi-drop serial bus of the communication link 1512. The coexistence messengers 1506, 1508 may receive WCI-2 messages from the translator 1510, where the received WCI-2 messages originate at one or more RF chipsets 1518, 1520, 1522. The coexistence messengers 1506, 1508 may decode received WCI-2 messages and forward the decoded messages as interrupts, requests and commands to the coexistence processor 1504. In some instances, the coexistence processor 1504 may exchange WCI-2 messages with a host application processor 1514. The host application processor 1514 may also include a coexistence processor and/or coexistence messenger. The host application processor 1514, RF chipsets 1518, 1520, 1522 or another device involved in coexistence management may also include a translator. In some implementations, the translator 1510 may receive event and GPIO information 1528 for transmission over the communication link 1512. For example, the event and GPIO information 1528 may include virtualized GPIO state information that the translator 1510 transforms or encapsulates in datagrams that can be transmitted over a multi-drop serial bus of the communication link 1512.

The communication link 1512 may include a multi-drop serial bus that is operated in accordance with protocols compliant or compatible with one or more standards-defined interfaces. In various examples, the multi-drop serial bus may be operated in accordance with an RFFE, SPMI, I3C or another protocol. In the illustrated Co-Existence management architecture 1500, the communication link 1512 is provided as a multi-drop serial bus operated in accordance with SPMI protocols. SPMI may be used when the multi-drop serial bus is used for other functions in an apparatus and has sufficient capability to support the exchange of coexistence messages. In some instances, the host application processor and the first chipset 1502 may be coupled to a system bus 1530. On or more of the chipsets 1518, 1520, 1522 may also be coupled to the system bus 1530.

The illustrated Co-Existence management architecture 1500 can reduce physical pin-count and printed circuit board complexity. In some instances, legacy devices included in an apparatus may not support the Co-Existence management architecture 1500. For example, it may be impractical to adapt certain legacy devices to transfer co-existence messages over the communication link 1512, or a legacy device may not have a serial bus that can provide the latency limitations imposed by transfer co-existence messages or latency may drive another bus.

Figure 16:
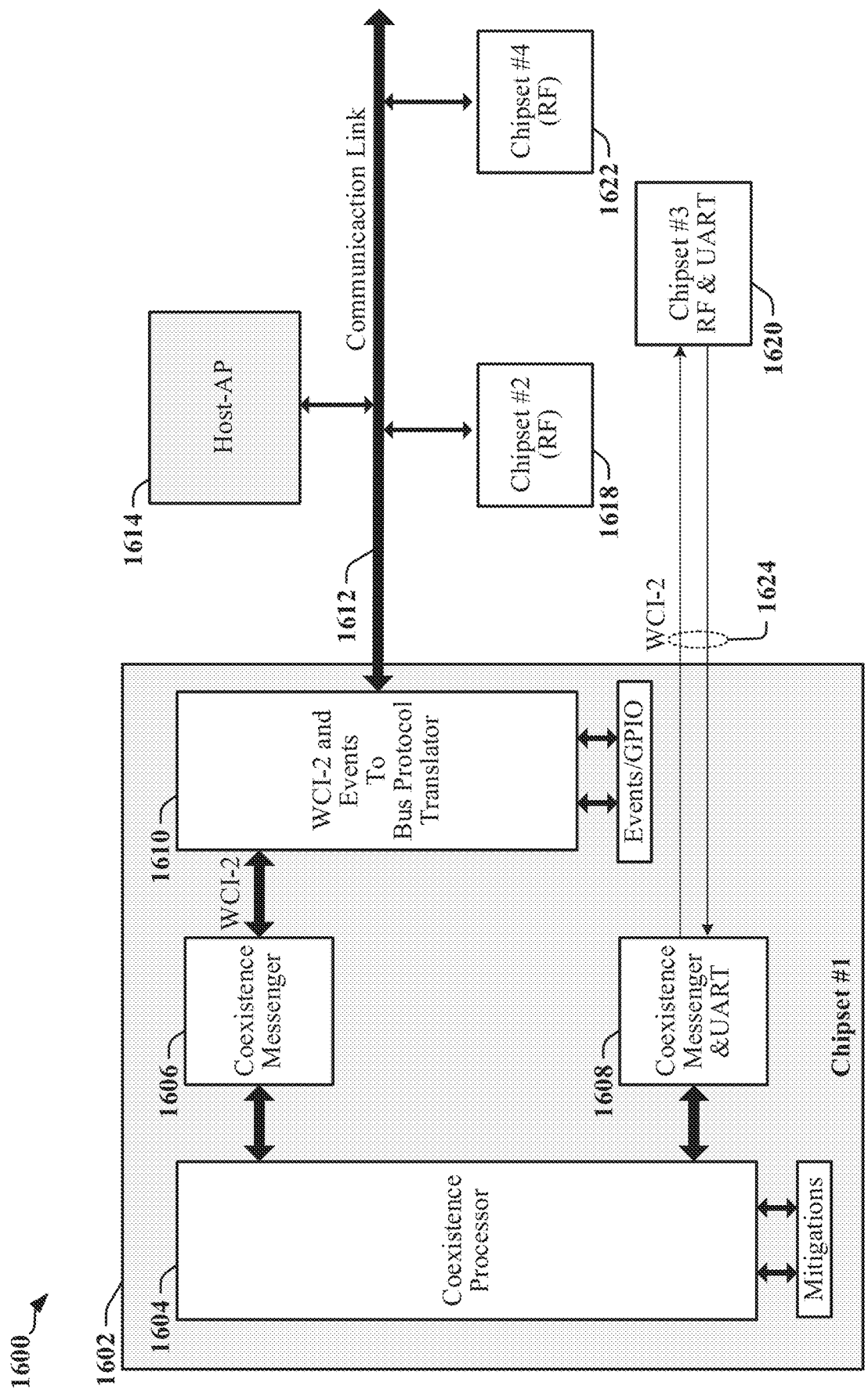
FIG. 16 illustrates a second example of a coexistence management architecture that may be implemented using a multi-drop serial bus in accordance with certain aspects disclosed herein.

FIG. 16 illustrates a second example of a Co-Existence management architecture 1600 in which backward compatibility with legacy devices is provided in an apparatus adapted according to certain aspects disclosed herein. In the second example, the Co-Existence management architecture 1600 provides one or more point-to-point links 1624 and a communication link 1612 that may be used to exchange co-existence messages. The communication link 1612 may include one or more multi-drop serial buses operated in accordance with a protocol such as an RFFE, SPMI, I3C and/or other suitable protocol. A modem 1602 includes a coexistence processor 1604 configured to manage one or more coexistence messengers 1606, 1608. In some implementations, the coexistence processor 1604 may include some combination of a controller, state machine, processor with software modules that may include algorithms and instructions that cause the coexistence processor 1604 to perform coexistence management functions.

One or more coexistence messengers 1606, 1608 may generate WCI-2 messages for transmission to one or more RF chipsets 1618, 1620, 1622. In one example, a coexistence messenger 1606 generates WCI-2 messages addressed to one or more chipsets 1618, 1622, where these WCI-2 messages are provided to a translator 1610 that generates datagrams to carry the coexistence messages over the communication link 1612. The latter coexistence messenger 1606 may receive WCI-2 messages from the translator 1610, where the received WCI-2 messages originate at one or more RF chipsets 1618, 1622. In another example, a coexistence messenger 1608 includes a UART and transmits WCI-2 messages over a point-to-point link 1624 to a legacy chipset 1620. WCI-2 messages may be received from the point-to-point link 1624. The coexistence messengers 1606, 1608 may decode received WCI-2 messages and forward the decoded messages as interrupts, requests and commands to the coexistence processor 1604.

The Co-Existence management architecture 1600 of FIG. 16 facilitates migration to a co-existence management implementation based on a multi-drop serial bus while providing option to include legacy devices that require UART-based point-to-point links for co-existence management.

Figure 17:
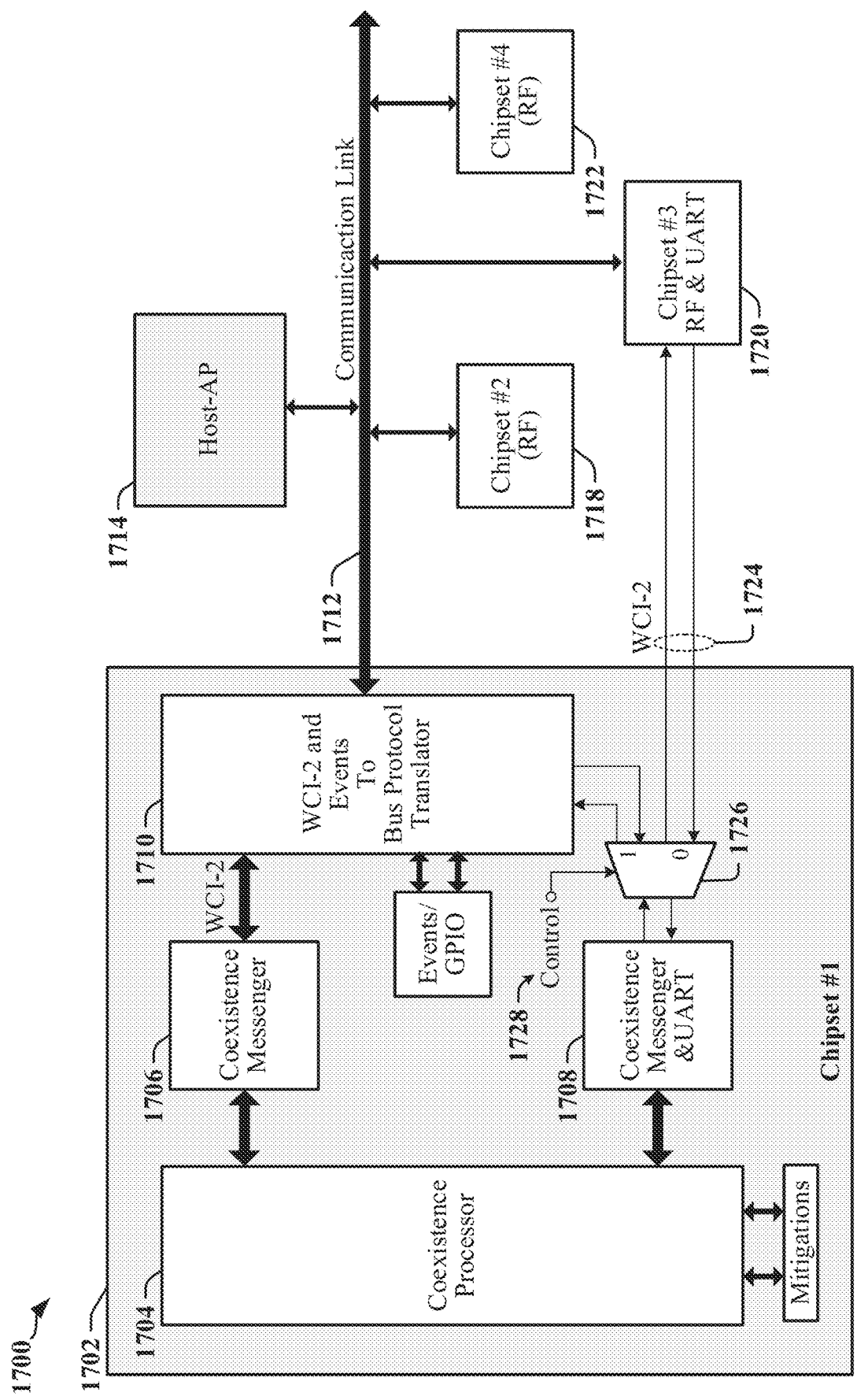
FIG. 17 illustrates a third example of a coexistence management architecture that may be implemented using a multi-drop serial bus in accordance with certain aspects disclosed herein.

FIG. 17 illustrates a third example of a Co-Existence management architecture 1700 in which backward compatibility with legacy devices is selectable in an apparatus adapted according to certain aspects disclosed herein. In the third example, the Co-Existence management architecture 1700 provides GPIO to support one or more point-to-point links 1724 and a communication link 1712 that may be used to exchange co-existence messages. The communication link 1712 may include one or more multi-drop serial buses operated in accordance with a protocol such as an RFFE, SPMI, I3C and/or other suitable protocol. A modem 1702 includes a coexistence processor 1704 configured to manage one or more coexistence messengers 1706, 1708. In some implementations, the coexistence processor 1704 may include some combination of a controller, state machine, processor with software modules that may include algorithms and instructions that cause the coexistence processor 1704 to perform coexistence management functions.

One or more coexistence messengers 1706, 1708 may generate WCI-2 messages for transmission to one or more RF chipsets 1718, 1720, 1722. In one example, a coexistence messenger 1706 generates WCI-2 messages addressed to one or more chipsets 1718, 1720, 1722, where these WCI-2 messages are provided to a translator 1710 that generates datagrams to carry the coexistence messages over a multi-drop serial bus of the communication link 1712. In another example, a coexistence messenger 1708 includes a UART and may transmit WCI-2 messages over a point-to-point link 1724 to a legacy chipset 1720, and the coexistence messenger 1708 may provide the WCI-2 messages to the translator 1710 for transmission over the communication link 1712. A multiplexer 1726, switch or other selection logic may cooperate with the coexistence messenger 1708 to select between the point-to-point link 1724 and a multi-drop serial bus of the communication link 1712. Selection between the point-to-point link 1724 and the communication link 1712, which may be implemented as a multi-drop serial bus, and which may be controlled by a signal 1728 provided by some combination of the co-existence processor 1704, a controller, state machine or other processor, the translator 1710, and a configuration register.

The coexistence messengers 1706, 1708 may decode received WCI-2 messages and forward the decoded messages as interrupts, requests and commands to the coexistence processor 1704. The coexistence messengers 1706, 1708 may receive WCI-2 messages from the translator 1710, where the received WCI-2 messages originate at one or more RF chipsets 1718, 1720, 1722. When the point-to-point link 1724 path is selected, WCI-2 messages may be received from the point-to-point link 1724 and the coexistence messenger 1708 may decode received WCI-2 messages and forward the decoded messages as interrupts, requests and commands to the coexistence processor 1704.

The Co-Existence management architecture 1700 of FIG. 17 facilitates migration to a co-existence management implementation based on a multi-drop serial bus while providing flexibility to include legacy devices that require UART-based point-to-point links for co-existence management. The Co-Existence management architecture 1700 of FIG. 17 enables an apparatus to select a path for co-existence messages based on characteristics of available links 1712, 1724, including latency, utilization and other characteristics.

Figure 18:
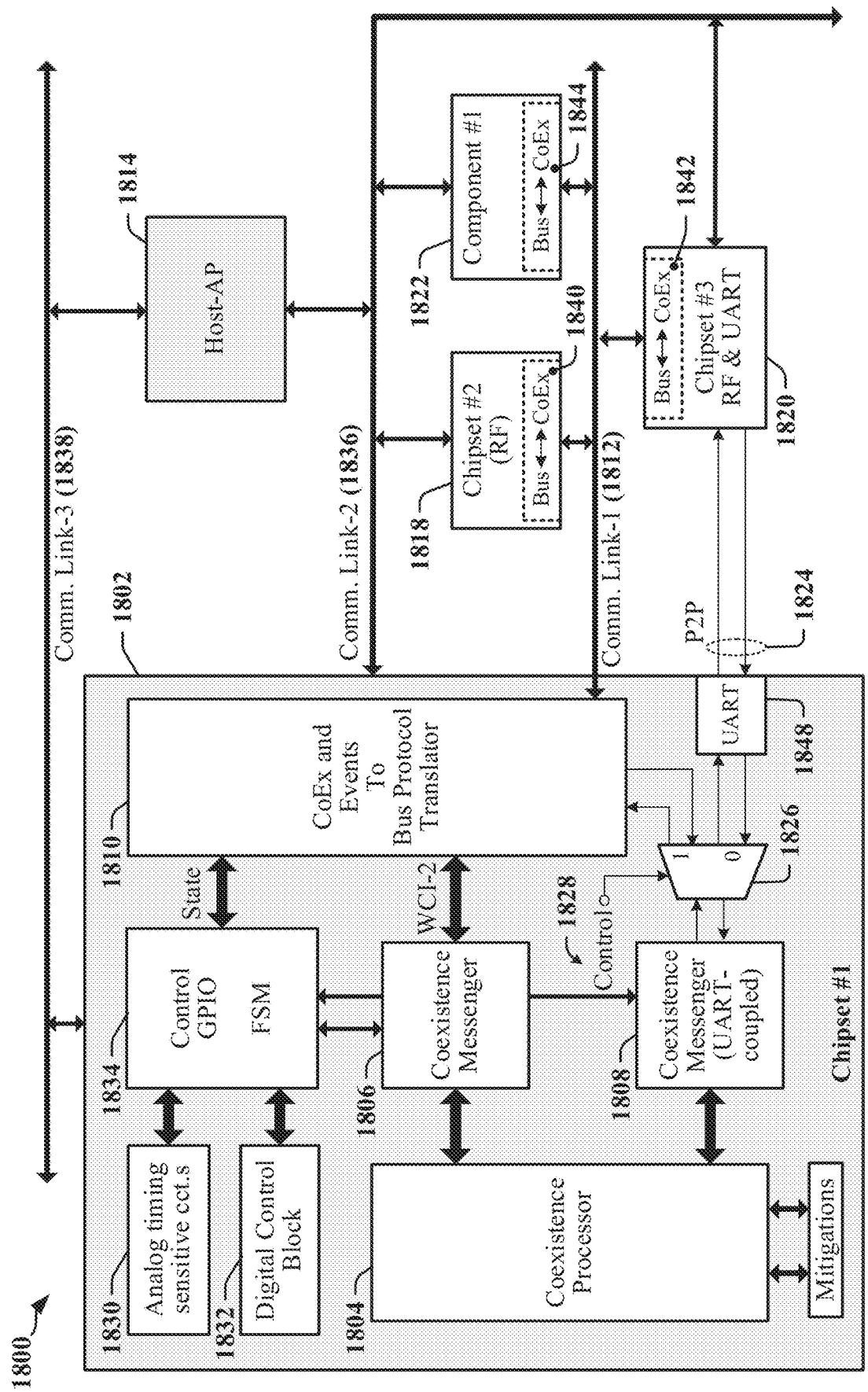
FIG. 18 illustrates a fourth example of a coexistence management architecture that may be implemented using a multi-drop serial bus in accordance with certain aspects disclosed herein.

FIG. 18 illustrates a fourth example of a Co-Existence management architecture 1800 in which multiple sources of coexistence information are supported and a path for co-existence messages may be selected based on application needs, devices configurations and/or types of chipsets and devices to be supported by an apparatus that implements the Co-Existence management architecture 1800. The Co-Existence management architecture 1800 can also provide backward compatibility with legacy devices.

In the fourth example, the Co-Existence management architecture 1800 provides physical GPIO to support one or more multi-drop communication links 1812, 1836, 1838 that may be used to exchange co-existence messages with one or more chipsets 1818, 1820 and/or RF components 1822. An RF component 1822 may function as an LNA, Switch Power Amplifier, etc. and may be configured to be coupled to at least one communication link 1812, 1824, 1836, 1838. In the illustrated example, a point-to-point communication link 1824 supports direct, low-volume UART-based data transmissions between a first chipset 1802 and another chipset 1820. A first multi-drop communication link 1812, which may couple multiple chipsets 1802, 1818, 1820 and/or one or more RF components 1822, may be used for the exchange of coexistence messages. The first multi-drop communication link 1812 includes at least one serial bus operated in accordance with a standards-defined or proprietary communication protocol, such as the SPMI, RFFE and/or I3C protocols. In some instances, coexistence, command and control traffic may be apportioned among two or more multi-drop serial buses included in the first multi-drop communication link 1812.

A second multi-drop communication link 1836 may be provided to couple two or more chipsets 1802, 1818, 1820 and/or one or more RF components 1822 with other types of device, including an application processor 1814, for example. The second multi-drop communication link 1836 may also be used to exchange coexistence messages and to configure the chipsets 1802, 1818, 1820 and/or RF components 1822. The second multi-drop communication link 1836 may include at least one serial bus operated in accordance with a standards-defined or proprietary communication protocol, such as the SPMI, RFFE and/or I3C protocols. One or more of the chipsets 1802, 1818, 1820 and the application processor 1814 may be coupled to a third multi-drop communication link 1838. The third multi-drop communication link 1838 may be operated as a system bus.

The first chipset 1802 may be representative of one or more other chipsets 1818, 1820. In various examples, the first chipset may be a modem or RF transceiver. The first chipset 1802 may include circuits or modules 1840, 1842, 1844 that translate between bus protocols and coexistence messages and between coexistence messages and bus protocols. In some instances, the coexistence messages may be initially formatted according to WCI-2 protocols. The point-to-point communication links 1824 and multi-drop communication links 1812, 1836 may offer a selection of latency, command structure, datagram structure, overhead and other characteristics that can influence selection of a pathway for co-existence messages. For example, an I3C bus may provide advantages when larger data payloads are transferred while an RFFE bus or SPMI bus may be better suited for transporting small datagrams in some implementations. In another example, one or more of the chipsets 1802, 1818, 1820 and/or RF components 1822 may support a multi-drop serial protocol that is not supported by the other chipsets 1802, 1818, 1820 and/or RF components 1822 and a combination of multi-drop serial buses and/or point-to-point communication links 1824 may be configured for transporting coexistence messages.

In FIG. 18, the first chipset 1802 includes a coexistence processor 1804 configured to manage one or more coexistence messengers 1806, 1808. In some implementations, the coexistence processor 1804 may include some combination of a controller, state machine, processor with software modules that may include algorithms and instructions that cause the coexistence processor 1804 to perform coexistence management functions.

One or more coexistence messengers 1806, 1808 may generate coexistence messages for transmission to one or more chipsets 1818, 1820 and/or RF components 1822. In one example, a coexistence messenger 1806 generates WCI-2 messages addressed to one or more of the other chipsets 1818, 1820 and/or an RF component 1822. The messages generated by the coexistence messengers 1806, 1808 may be provided to a translator 1810 that generates datagrams to carry the coexistence messages over one or more multi-drop communication links 1812, 1836, 1838 in accordance with a corresponding bus protocol. In another example, a coexistence messenger 1808 may include a UART or be coupled to a UART 1848. In one mode of operation, the coexistence messenger 1808 may transmit WCI-2 messages through the UART 1848 over a point-to-point communication link 1824 to a chipset 1820. In another mode of operation, the coexistence messenger 1808 may provide the WCI-2 messages to the translator 1810 for transmission over one or more multi-drop communication links 1812, 1836, 1838. A multiplexer 1826, switch or other selection logic may cooperate with the coexistence messenger 1808 to dynamically or statically select between the point-to-point communication link 1824 and the multi-drop communication link 1812, for example. Static configuration of the multiplexer 1826 may be employed to support a legacy device or chipset 1820 that does not support an appropriate or suitable multi-drop serial bus protocol, or in an application that anticipates that use of a point-to-point communication link 1824 as a necessity. Selection between the point-to-point communication link 1824 and one of the multi-drop communication links 1812, 1836, 1838 for communicating WCI-2 messages may be controlled by a signal 1828 provided by some combination of the co-existence processor 1804, a controller, state machine (VGI FSM 1834) or other processor, the translator 1810, and a configuration register.

The coexistence messengers 1806, 1808 may decode received WCI-2 messages and forward the decoded messages as interrupts, requests and commands to the coexistence processor 1804. The coexistence messengers 1806, 1808 may receive WCI-2 messages from the translator 1810, where the received WCI-2 messages originate at one or more chipsets 1818, 1820 and/or RF components 1822. When the point-to-point communication link 1824 path is selected, WCI-2 messages may be received from the point-to-point communication link 1824 and the coexistence messenger 1808 may decode received WCI-2 messages and forward the decoded messages as interrupts, requests and commands to the coexistence processor 1804 and/or a VGI FSM 1834.

The VGI FSM 1834 may be provided to manage virtualization of physical GPIO state to obtain Virtual GPIO state (VGPIO) and conversion of received VGPIO to physical GPIO state. Virtual GPIO state (VGPIO) may be transmitted in datagrams over one or more of the multi-drop communication links 1812, 1836, 1838. The VGI FSM 1834, coexistence processor 1804 and/or coexistence messengers 1806, 1808 may cooperate to determine allocation of multi-drop communication links 1812, 1836. For example, an I3C bus may be reserved for transmitting datagrams containing VGPIO. In another example, latency characteristics may be used to allocate multi-drop serial communication links 1812, 1836 and/or point-to-point communication links 1824 among different types of traffic.

In some instances, the VGI FSM 1834 may receive GPIO state information and/or priority messages or signals from a variety of sources. In one example, the VGI FSM 1834 may manage processing of timing-sensitive analog state 1830. In another example, the VGI FSM 1834 may manage processing of digital sources 1832 of state, including alerts, interrupts, events and other software or processor-generated signals. The VGI FSM 1834 may receive VGI messages directed to analog and digital consumers of virtualized GPIO state and control signals.

In some implementations, the translator 1810 may include a programmable core that permits simultaneous support of multiple types of multi-drop communication links 1812, 1836. The programmable core may configure multi-drop communication links 1812, 1836 to operate in accordance with different types of protocols. In some instances, two or more multi-drop serial buses may be configured to operate independently in accordance with the same type of protocol.

The translator 1810 may be configured to monitor bus interfaces and UARTs that engage in exchange of coexistence management information. In one example, the translator 1810 may determine and/or select a multi-drop communication link 1812, 1836 to be used for communicating coexistence management information. The translator 1810 may, in some instances, cause a coexistence messenger 1808 to direct coexistence information over the point-to-point communication link 1824. In another example, the translator 1810 may be configured to identify when the bus interfaces and UARTs are in power-down mode. In some instances, the translator 1810 may power-down, at least partially and may cause one or more coexistence messengers 1806, 1808 to power down.

The Co-Existence management architecture 1800 of FIG. 18 provides a versatile and dynamically reconfigurable environment that supports co-existence management and virtualization of GPIO. Some implementations can overlap functionality whereby, for example, a UART-based point-to-point communication link 1824 may be virtualized and WCI-2 messages may be effectively communicated using VGPIO. The Co-Existence management architecture 1800 of FIG. 18 enables an apparatus latitude to select a path for co-existence messages from a variety of physical and virtual links and/or protocols to meet application-specific latency, capacity, throughput and other characteristics.

Figure 19:
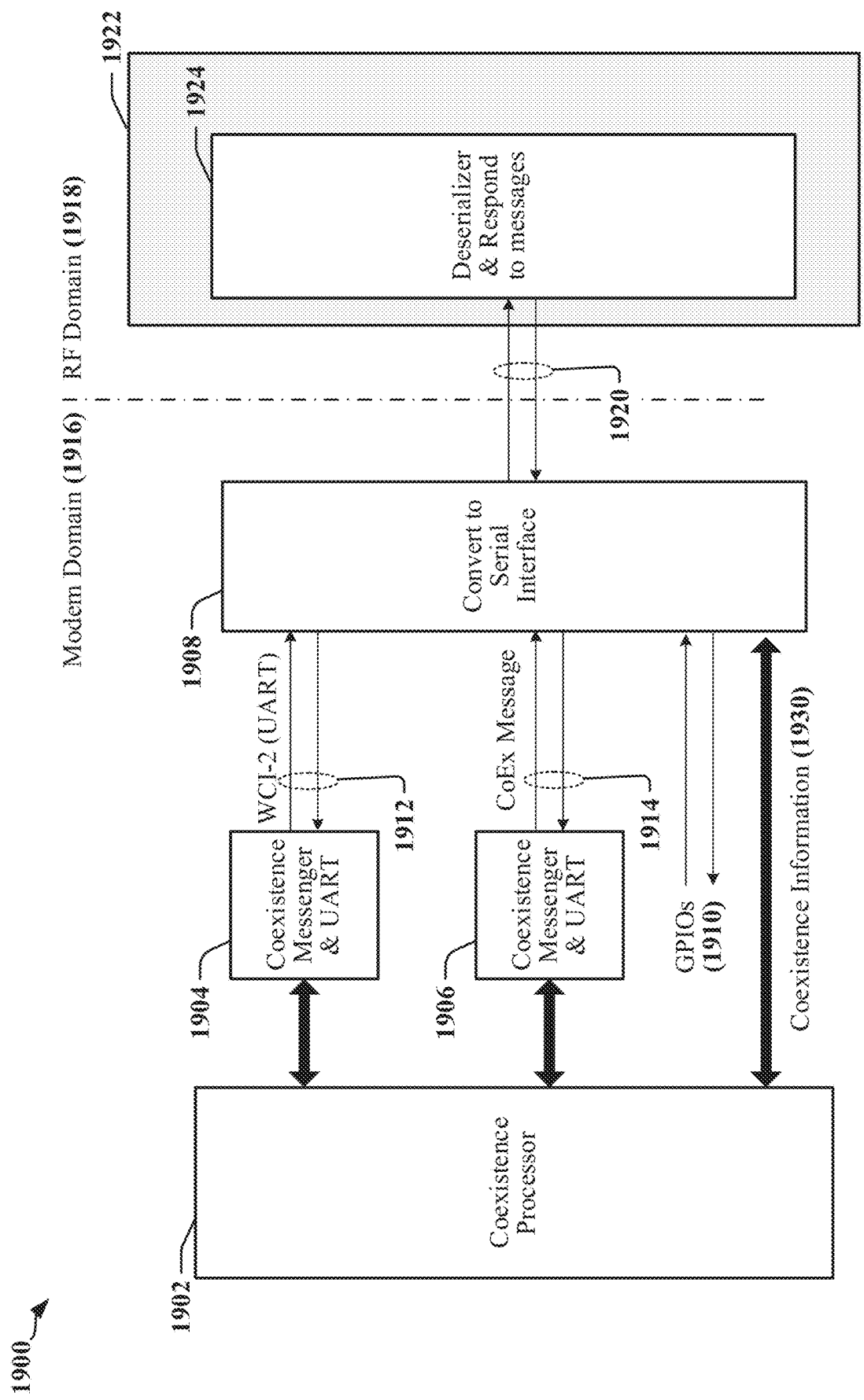
FIG. 19 illustrates certain operational aspects of a coexistence management architecture provided in accordance with certain aspects disclosed herein.

FIG. 19 illustrates certain operational aspects of a Co-Existence management architecture 1900 provided in accordance with certain aspects disclosed herein. In a modem domain 1916, a coexistence processor 1902 may generate coexistence information. The coexistence processor 1902 may provide certain coexistence information to one or more coexistence messengers 1904, 1906. A first coexistence messenger 1904 may provide coexistence messages to a converter 1908 that transmits the coexistence messages in datagrams that can be transmitted over a multi-drop serial bus 1920. Some coexistence messengers 1906 may provide coexistence messages to the converter 1908 in accordance with the WCI-2 protocol, or a modified form of the WCI-2 protocol. WCI-2 coexistence messages can be transmitted over a point-to-point bus 1912, 1914 using a UART. In some instances, WCI-2 coexistence messages may be provided in datagrams that can be transmitted over the multi-drop serial bus 1920. In some implementations, the coexistence processor 1902 may provide coexistence information 1930 directly to the converter 1908, and the converter 1908 may translate the coexistence information to one or more coexistence messages that can be transmitted over the multi-drop serial bus 1920. Coexistence information can be obtained from physical GPIO state information. The converter 1908 may receive GPIO state 1910 and, in one mode, the converter 1908 may generate one or more coexistence messages from the GPIO state 1910 that can be transmitted over the multi-drop serial bus 1920. In a second mode, the GPIO state 1910 may be virtualized and transmitted over the multi-drop serial bus 1920 in VGI packets.

At the receiver, which may be deployed in an RF domain 1918, a deserializer 1924 may receive serialized messages from the multi-drop serial bus 1920. The deserializer 1924 may determine appropriate or desired response to received coexistence state information. In some instances, the deserializer 1924 may communicate a response back through the multi-drop serial bus 1920. In some instances, the deserializer 1924 may initiate mitigation in response to received coexistence information. Mitigation may be initiated by manipulating physical GPIO state, configuring one or more RF components and/or modifying a mode of operation of one or more RF components.

Figure 20:
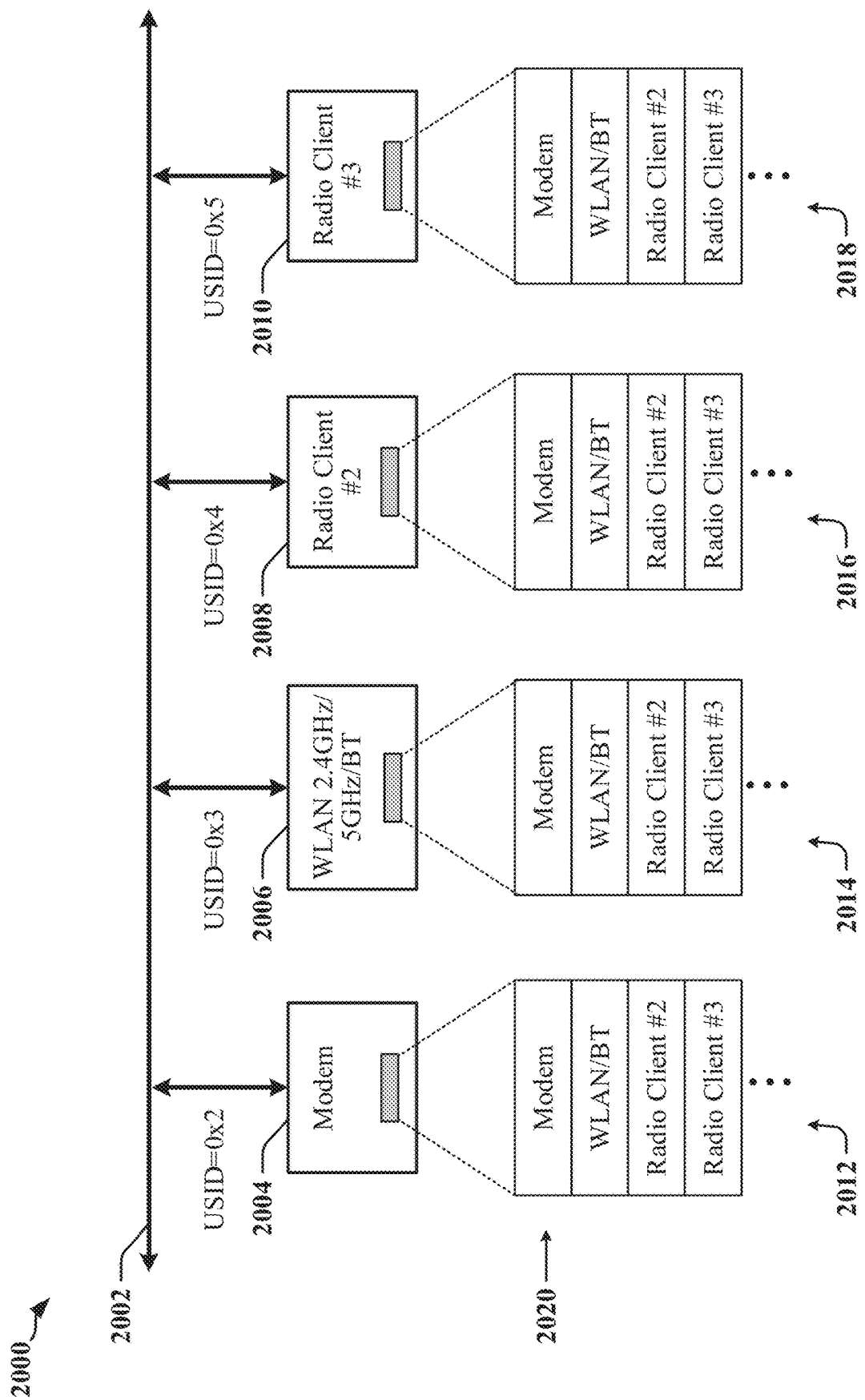
FIG. 20 illustrates an example of a memory configuration that may be employed in certain coexistence management architectures provided in accordance with certain aspects disclosed herein.

FIG. 20 illustrates an example of a memory configuration 2000 that may be employed in certain Co-Existence management architectures 1500, 1600, 1700, 1800. In the example, each device 2004, 2006, 2008, 2010 is coupled to a serial bus 2002 and is capable of sending a common limited set of messages. In one example, each device 2004, 2006, 2008, 2010 can exchange coexistence management messages over the serial bus 2002.

According to certain aspects disclosed herein, each device 2004, 2006, 2008, 2010 may be configured with a common memory map 2012, 2014, 2016, 2018, and each device 2004, 2006, 2008, 2010 is adapted to address its memory using the address field transmitted when receiving a datagram. In one example, each device 2004, 2006, 2008, 2010 may be configured with a common memory map 2012, 2014, 2016, 2018 that reserves and/or associates a block of registers or memory locations for each of the devices 2004, 2006, 2008, 2010 that may participate in coexistence management. Any of the devices 2004, 2006, 2008, 2010 may write, read or update coexistence management information in another device 2004, 2006, 2008, 2010. In one example, a modem 2004 may write to the modem block 2020 of a first radio client 2006 and a second radio client 2008 where, for example, the first radio client 2006 supports WLAN and/or Bluetooth communication and the second radio client 2008 includes or supports a near-field communication device. In another example, the modem 2004 may write to the modem block 2020 in each of the other devices 2006, 2008, 2010. Each device 2006, 2008, 2010 written by the modem 2004 may then process the received data in accordance with internal protocols and/or configurations.

Any of the devices 2004, 2006, 2008, 2010 may use a broadcast command to write to its corresponding block in the common memory map 2012, 2014, 2016, 2018, provided the originating device 2004, 2006, 2008, 2010 can identify itself to each of the other devices 2004, 2006, 2008, 2010. Certain aspects disclosed herein provide addressing techniques that enable the originating device 2004, 2006, 2008, 2010 to identify itself in a datagram transmitted over the serial bus 2002 to a block in the common memory map 2012, 2014, 2016, 2018. Certain aspects disclosed herein provide addressing techniques that enable the originating device 2004, 2006, 2008, 2010 to identify an action or multiple actions to be taken after the originating device 2004, 2006, 2008, 2010 written data to a block in the common memory map 2012, 2014, 2016, 2018. Actions may determine whether a receiving device 2004, 2006, 2008, 2010 should process or ignore the data written to the block in the common memory map 2012, 2014, 2016, 2018. Actions may determine whether a receiving device 2004, 2006, 2008, 2010 should write received data addressed to a block in the common memory map 2012, 2014, 2016, 2018. In the context of coexistence management messages, the actions may include mitigation performed by a receiving device 2004, 2006, 2008, 2010.

Figure 21:
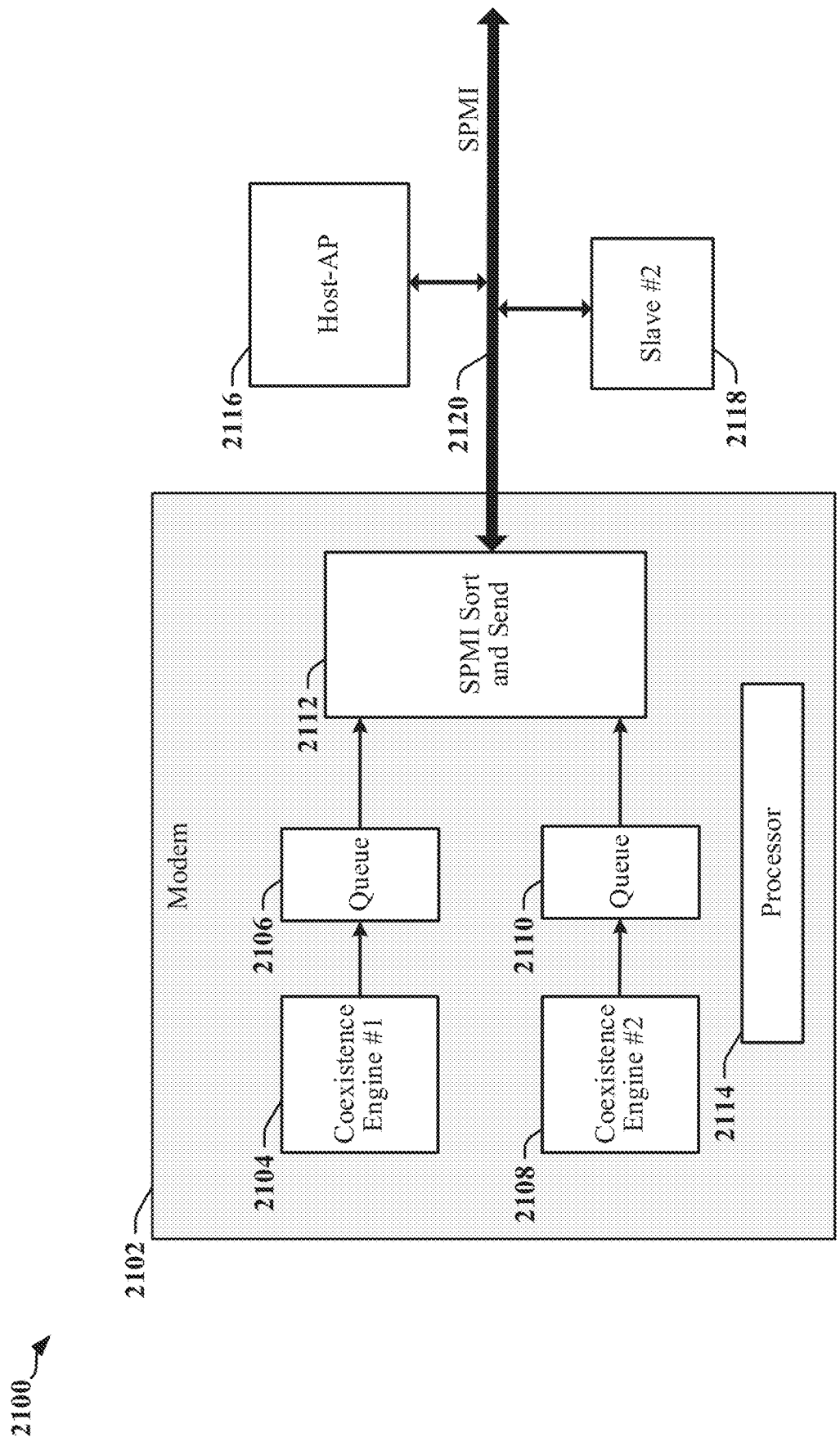
FIG. 21 illustrates an example of sort/priority processing in accordance with certain aspects disclosed herein.

FIG. 21 illustrates an example 2100 of sort/priority processing. A scheduling circuit 2112 configured to perform sort and priority processing may employ a sorting table based on a priority action dictated by the processor 2114 of a peripheral 2102 (e.g., a modem) when contention exists between multiple coexistence engines 2104, 2108 that concurrently produce high-priority messages to be transmitted over a multi-drop serial bus 2120. In some instances, coexistence messages are provided to and/or maintained in queues 2106, 2110. In one example, the multi-drop serial bus 2120 may be operated in accordance with an SPMI protocol. In other examples, the multi-drop serial bus 2120 may be operated in accordance with an I2C, I3c, RFFE, CxMi, or another protocol. Peripherals 2102, 2118 may communicate information related to sorting and/or prioritizing transmissions through a backbone communication link to the processor 2114 of the modem 2102. Information related to sorting and/or prioritizing transmissions may include or relate to the priority tables. In some instances, the baseband processor 2116 can continue slow background communication of new or upcoming events such that a real-time response can be configured between peripherals 2102, 2118. The peripherals 2102, 2118 and a baseband processor 2116 can respond to received messages in the manner defined by configuration.

Figure 22:
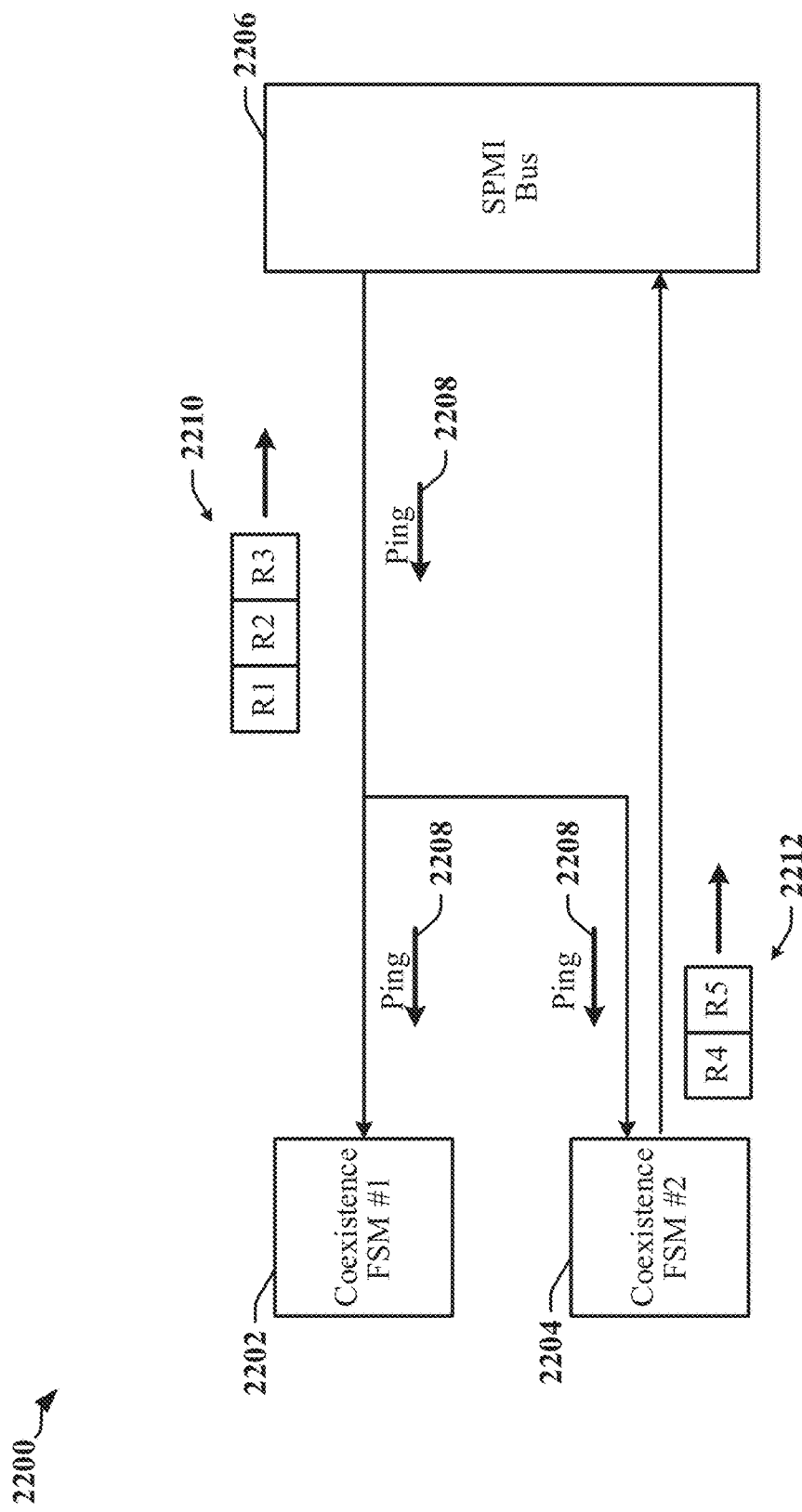
FIG. 22 illustrates an example of concurrent messaging when multiple active sources of coexistence problems are present in accordance with certain aspects disclosed herein.

FIG. 22 illustrates an example 2200 in which multiple active sources are processed by finite state machines (FSMs 2202, 2204). The FSMs 2202, 2204 may generate coexistence messages that indicate state of RF components, events and/or existence of detected coexistence problems in a client device. Sorting may be performed on the different messages generated by the FSMs 2202, 2204, based on the nature of the active coexistence sources, system configuration, and/or certain types message that may be pending and awaiting access to the SPMI bus 2206, which is used for communicating coexistence information. The most critical pending messages may be prioritized for transmission over the SPMI bus 2206 to manage the real-time response required for coexistence activities. In one example, a response to a received ping message 2208 may be sent as a message 2210, 2212 returned over the SPMI bus 2206 to inform the status of all the active technologies available on the client. Returned ping messages 2210, 2212 may be combined in a manner that increase transmission efficiency and/or reduces latency.

In some instances, a client coupled to the SPMI bus 2206 that is preparing to enter a sleep state may transmit messages to notify other clients coupled to the SPMI bus 2206 of the entry to sleep state. The notification of entry to sleep state may reduce or eliminate NACK messages on the SPMI bus 2206 and attempts by an application processor to retry transmissions when the client is in an inactive state. When the inactive client wakes up or otherwise becomes active on the SPMI bus 2206, it may transmit out messages to notify messages to notify other clients coupled to the SPMI bus 2206 of its availability on the SPMI bus 2206.

Memory Mapping for Function-Specific Communication

Referring again to FIG. 7, in a system that employs a serial bus 702, it is necessary for interconnected devices 704, 706, 708, 710, 712, 714, 716 to be able to communicate with each other in a consistent manner such that a message from a first device 704, 706, 708, 710, 712, 714 or 716 can be sent to one or more client devices 704, 706, 708, 710, 712, 714 and/or 716 concurrently such that the receiving client devices 704, 706, 708, 710, 712, 714 and/or 716 can determine the originator of received messages. The devices 704, 706, 708, 710, 712, 714, 716 coupled to the serial bus 702 typically use a common limited alphabet to exchange messages. In some examples, identification (ID) bits embedded in datagrams to identify the originator can be expensive in terms of power and latency. Certain aspects disclosed herein provide additional techniques for conveying identity of a message originator.

In various conventional bus architectures, certain serial bus protocols (e.g., SPMI, RFFE) provide no information that conveys the identity of the originating device during message transmission of a datagram. Destination ID is provided in the transmitted datagram. The transmitting device may win an arbitration process before transmitting. In accordance with certain bus protocols, the bus master device 704 and other slave devices 706, 708, 710, 712, 714, 716 do not capture the ID of the winning device. When the winning device starts transmitting, one or more receiving devices may be unable to determine which device is sending the datagram. Such blindness regarding the originating device identity can create serious challenges during processing of the received message. A common technique for interpreting or identifying source, destination and/or payload of a datagram transmitted to multiple receivers is disclosed herein.

Figure 23:
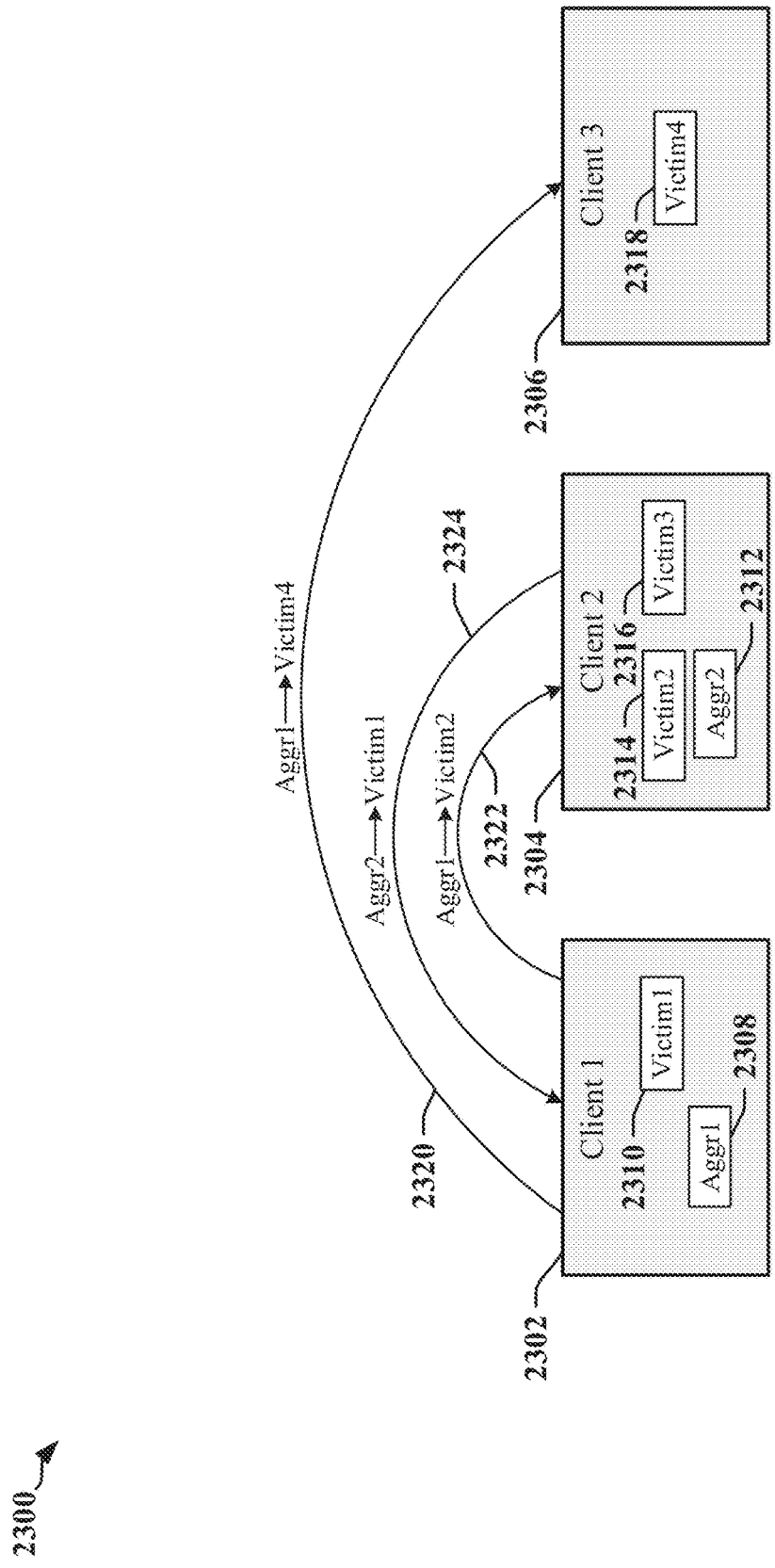
FIG. 23 illustrates certain coexistence issues that may cause a device to take mitigating action in response to a coexistence management message.

FIG. 23 is an example 2300 that illustrates certain coexistence issues that may cause a device 2302, 2304, 2306 to take mitigating action in response to a coexistence management message. Each device 2302, 2304, 2306 includes one or more aggressors 2308, 2312 and/or one or more victims 2310, 2314, 2316, 2318. An aggressor 2308, 2312 may be an antenna or other source of radiative energy that may interfere with, or affect the operation of another RF component. For example, an aggressor 2308, 2312 may transmit relatively high-power RF signals at frequencies near to the operating frequency of an RF receiver. The RF receiver may be unable to receive a relatively low-power RF signal of interest due to overwhelming interference. In some instances, sensitive RF components may be damaged by high-power interfering RF signals.

In the illustrated example 2300, a first device 2302 includes an aggressor (Aggr_1 2308) that may transmit a first interfering signal 2322 that affects the operation of a victim component (Victim_2 2314) in a second device 2304. Aggr_1 2308 may transmit a second interfering signal 2320 that affects the operation of another victim component (Victim_4 2314) in a third device 2306. The interfering signals 2320, 2322 may derive the same transmission or different transmissions. The second device 2304 includes an aggressor (Aggr_2 2312) that may transmit an interfering signal 2324 that affects the operation of a victim component (Victim_1 2310) in the first device 2302.

In any device 2302, 2304, 2306 there can be more than one concurrently victimized components. In some examples, there can be 5 or more aggressors when advanced RATs are involved, including 5G New Radio. In any device 2302, 2304, 2306 there can be a victim 2310, 2314, 2316, 2318, an aggressor 2308, 2312 or some combination thereof. The common memory map 2012, 2014, 2016, 2018 disclosed herein can enable a device 2302, 2304, 2306 with multiple aggressors 2308, 2312 to convey aggressor status using a single datagram transmitted to one or more client devices 2302, 2304, 2306. Client devices 2302, 2304, 2306 may also use the common memory map 2012, 2014, 2016, 2018 to announce that it has multiple systems active that need to convey coexistence messages concurrently in the system. The common memory map 2012, 2014, 2016, 2018 enables all client devices 2302, 2304, 2306 in the system to have a common interpretation of coexistence messages.

Figure 24:
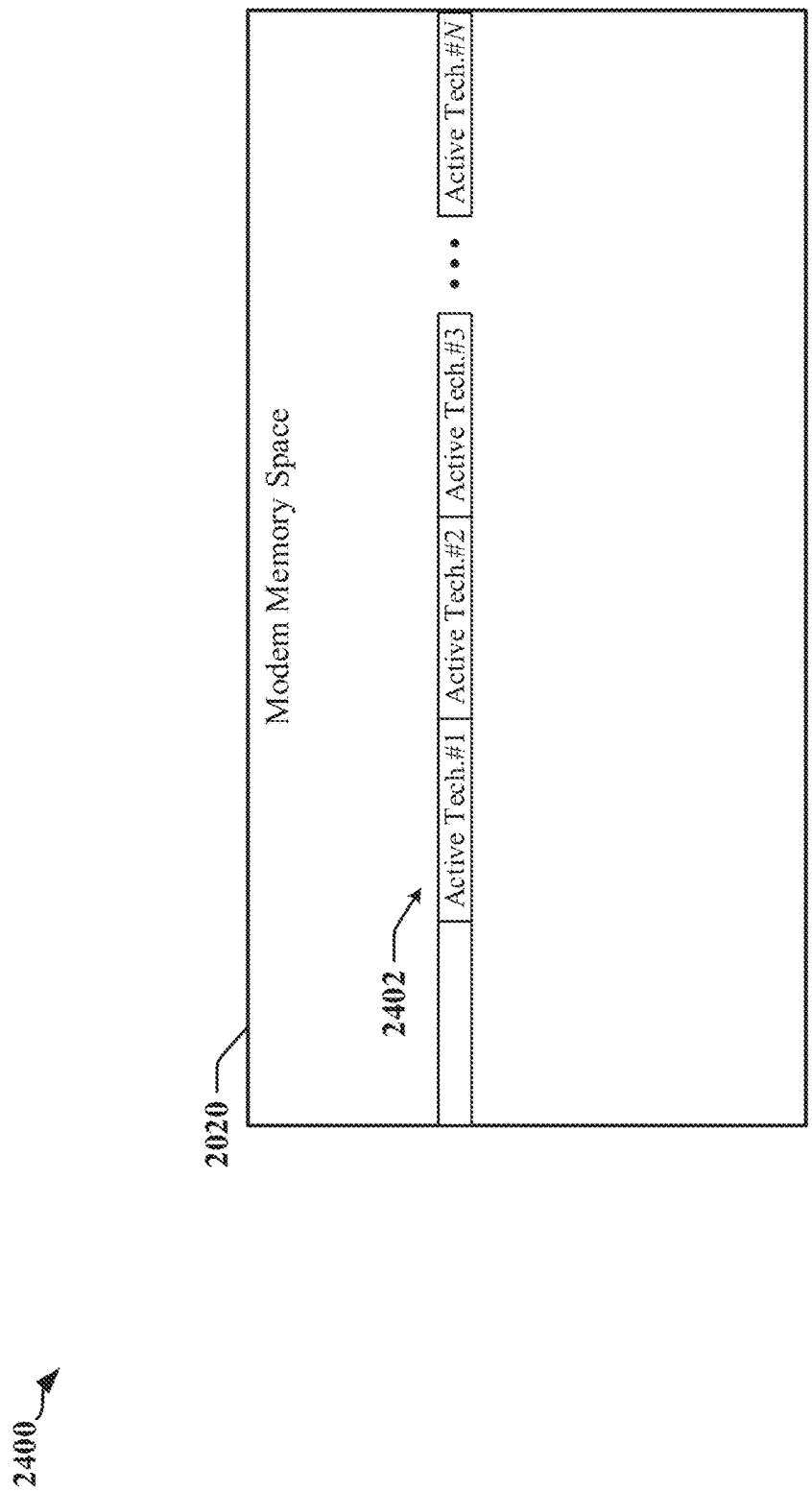
FIG. 24 illustrates an example of a configuration of a common memory map in accordance with certain aspects disclosed herein.

FIG. 24 illustrates an example of a configuration 2400 of a block 2020 (see FIG. 20) in the common memory map 2012, 2014, 2016, 2018. Here, the block 2020 is allocated for use of a modem 2004. In the illustrated configuration 2400, information elements 2402 are maintained for active technologies operated by the modem 2004. The common memory map 2012, 2014, 2016, 2018 may be configured by a processor of the system that incorporates or operates the modem 2004. In one example, the common memory map 2012, 2014, 2016, 2018 may be configured over a system bus, such as the communication link 1838 of FIG. 18. The common memory map 2012, 2014, 2016, 2018 may be reconfigured when technologies transition between active and inactive states. The configuration may be performed to provide proximately located information elements 2402 for active technologies within the common memory map 2012, 2014, 2016, 2018. Coexistence messages can be efficiently written and processed when information elements 2402 are proximately located. Datagrams that carry coexistence messages can be transmitted with reduced latency when information elements 2402 are proximately located in the common memory map 2012, 2014, 2016, 2018.

Figure 25:
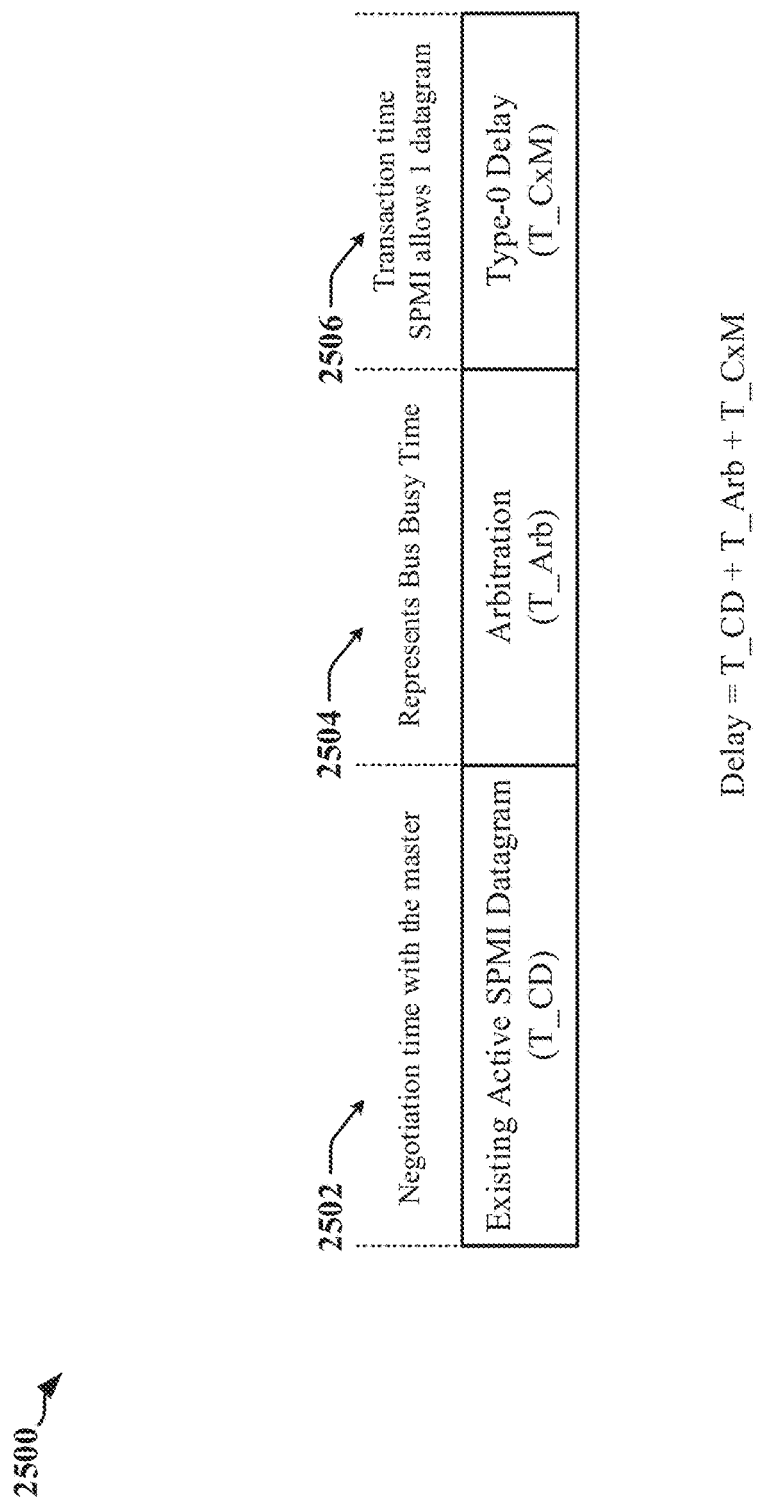
FIG. 25 illustrates latency-contributing components contributing to bus latency associated with transmission of an SPMI datagram.

FIG. 25 illustrates latency-contributing components 2500 contributing to bus latency associated with transmission of an SPMI datagram. The latency-contributing components 2500 include a first delay 2502 corresponding to the time required to complete an existing datagram transmission, a second delay 2504 corresponding to the time required to perform and win an arbitration process, and a third delay 2506 corresponding to the time required to transmit a low-latency datagram, which may be a Type-0 datagram adapted to carry coexistence messages in accordance with certain aspects disclosed herein.

According to SPMI protocols, a device may transmit a single datagram after winning an arbitration process. After winning arbitration, a device may not compete in a subsequent arbitration that follows immediately after transmission of the datagram. Accordingly, certain aspects disclosed herein enable the use of a single datagram to transmit coexistence messages derived from multiple sources.

Figure 26:
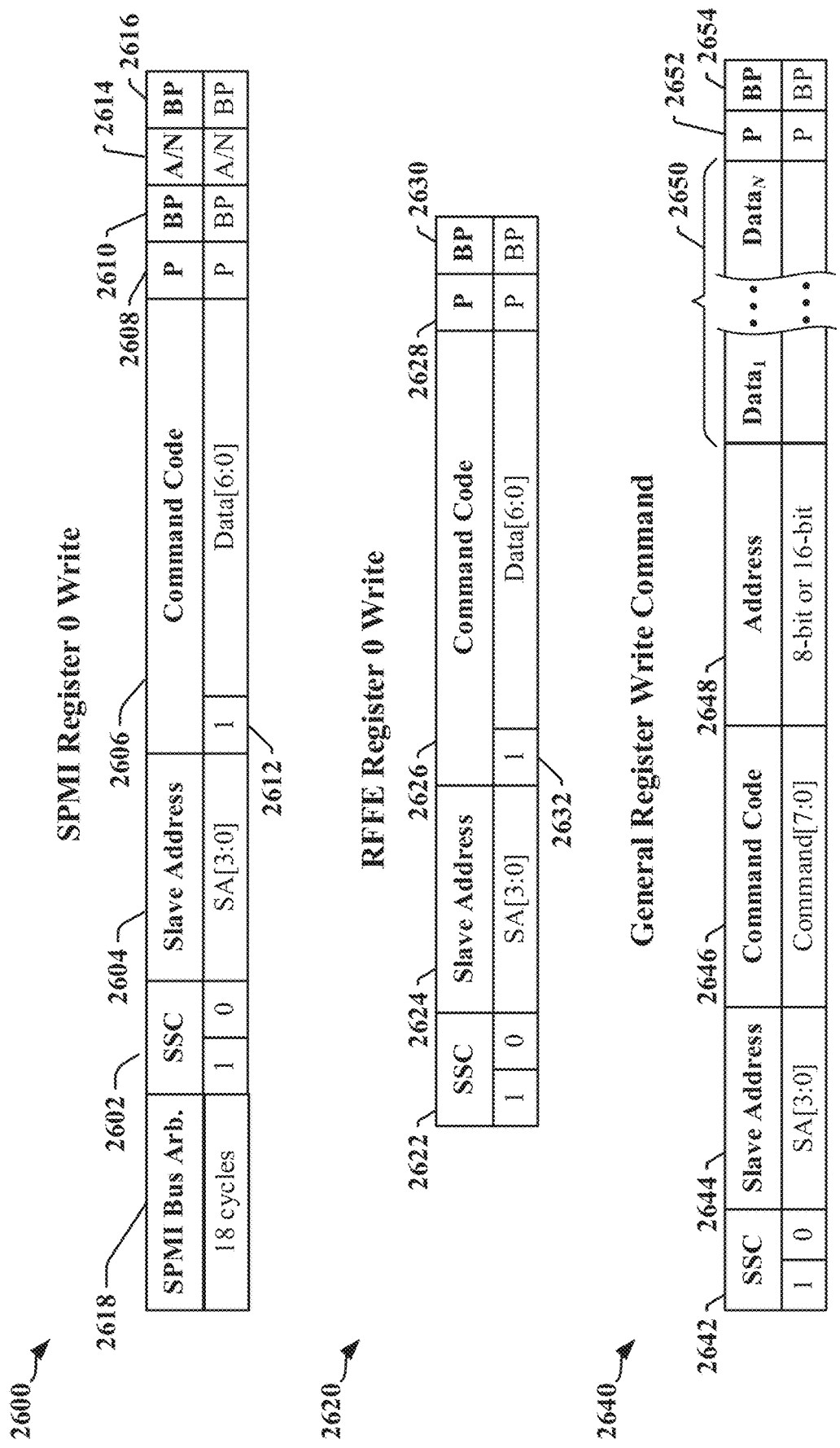
FIG. 26 illustrates datagram structures that may be compliant or compatible with SPMI and/or RFFE protocols.

FIG. 26 illustrates datagram structures 2600, 2620, 2640 that may be compliant or compatible with SPMI and/or RFFE protocols. The datagram structures 2600, 2620 represent Write commands that may be transmitted in the shortest datagrams defined by SPMI and RFFE protocols, respectively. In both protocols, the datagram structures 2600, 2620 commence with transmission of a two-bit sequence start condition (SSC 2602, 2622) followed by a four-bit slave address 2604, 2624 or other device identifier. The 8-bit command code 2606, 2626 is transmitted next. The 8-bit command code 2606, 2626 has a most significant bit (MSB 2612, 2632) set to 1. The command code 2606, 2626 is followed by a parity bit 2608, 2628 and bus park signaling 2610, 2630. In SPMI protocols, an acknowledge/not acknowledge bit 2614 is transmitted with second bus park signaling 2616. Other SPMI and RFFE include additional fields including, for example, register address fields and one or more data bytes.

The datagram structure 2640 represents a generalized Write command that may be transmitted in datagrams defined by SPMI and RFFE protocols. The datagram structure 2640 commences with transmission of a two-bit SSC 2642 followed by a four-bit slave address 2644 or another device identifier. The 8-bit command code 2646 is transmitted next. The command code 2626 may be followed by a parity bit (not shown) followed by an address field 2648, which may have an 8-bit length or a 16-bit length (for extended register writes commands). One or more data frames 2650 may be transmitted before a parity bit 2652 and bus park signaling 2654. Data frames may include 8-bit bytes with parity.

According to certain aspects disclosed herein, coexistence messages including WCI-2 messages can be adapted for transmission in one or more types of SPMI datagrams.

Figure 27:
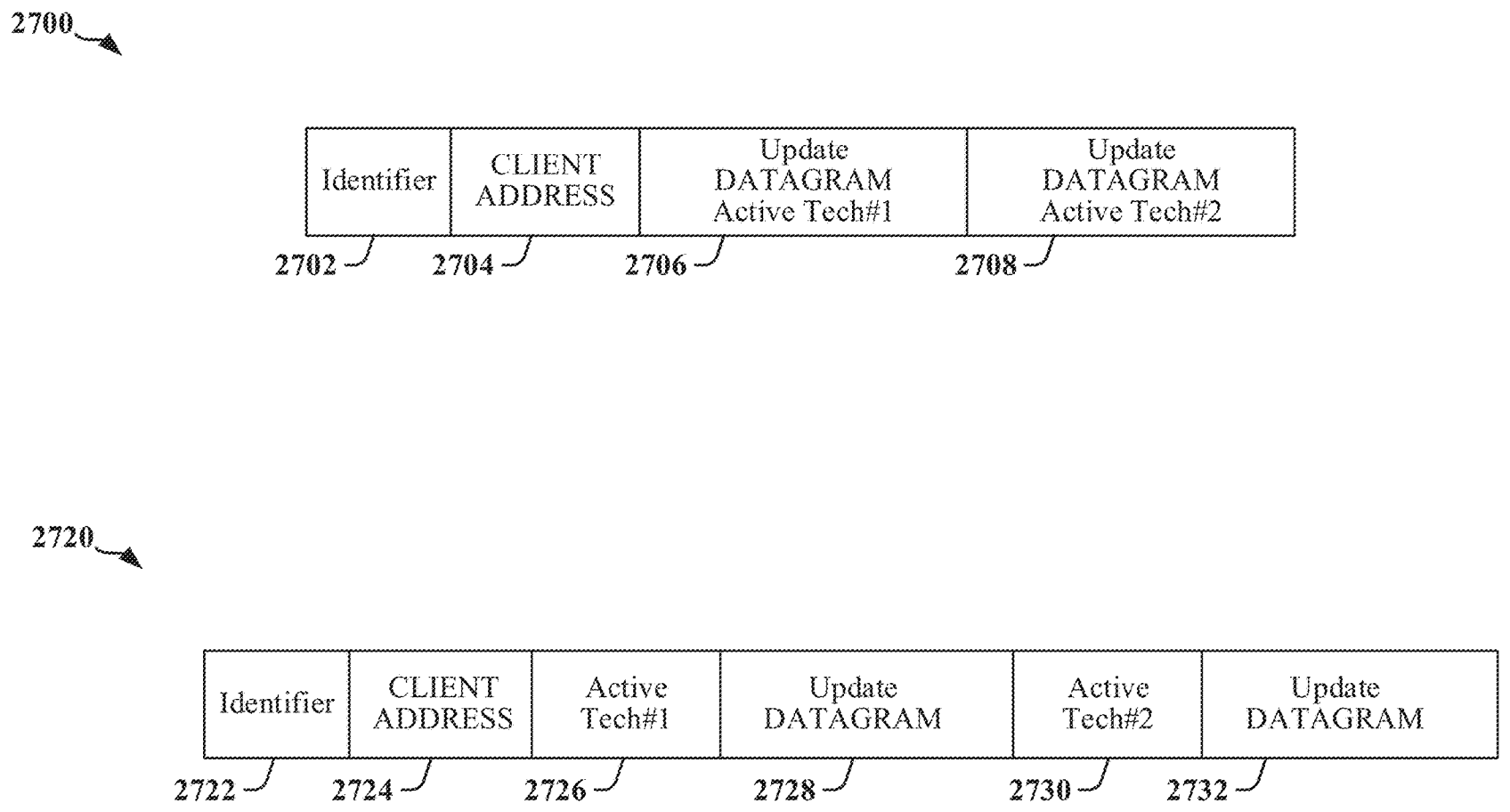

FIG. 27 provides generalized examples of transmissions 2700, 2720 that may be used to write coexistence information to proximately located information elements 2402 (see FIG. 24) in devices that maintain a common memory map 2012, 2014, 2016, 2018 as disclosed herein. Each information element 2402 may correspond to an active technology in an originating device 2004, 2006, 2008, 2010.

In the first transmission 2700, an identifier 2702 is transmitted to identify the originating device 2004, for example. The identifier 2702 may be used to identify the block 2020 mapped for the originating device 2004. An address 2704 may be transmitted to identify an initial write location in the block 2020. The address 2704 may be a relative address identifying a specific write location with reference to a starting address or ending address of the block 2020. One or more datagrams 2706, 2708, frames, bytes or words may be transmitted, where the datagrams 2706, 2708 are written to sequential locations in the block 2020.

The second transmission 2720 may be used when information elements 2402 are not proximately located, or where a desired order of writing coexistence information is desired. An identifier 2722 is transmitted to identify the originating device 2004 (for example). The identifier 2722 may be used to identify the block 2020 mapped for the originating device 2004. An address 2724 may be transmitted to identify an initial write location in the block 2020. The address 2724 may be a relative address identifying a specific write location with reference to a starting address or ending address of the block 2020. One or more datagrams 2728, 2732 frames, bytes or words may be transmitted, where the datagrams 2706, 2708 are preceded by fields 2726, 2730 that identify the active technology related to the following datagrams 2728, 2732.

The identifier 2702, 2722 may be derived from a unique slave identifier (USID) associated with the originating device 2004, 2006, 2008, 2010. In one example, the USID may be used as a multiplier to identify the starting location of the block 2020 associated with the originating device 2004, 2006, 2008, 2010. In some instances, the USID of the originating device 2004, 2006, 2008, 2010 may be transmitted as the identifier 2702, 2722 in the transmission 2700 or 2720.

In some implementations, a combination of the USID transmitted as the identifier 2702, 2722 and the address 2704, 2724 may be used to resolve issues associated with blindness regarding the originating device identity. According to certain aspects, a client device (e.g., device 2004, 2006, 2008 or 2010) may write to another active client device using a defined address range to identify a destination of the data to be written. The combination of the originator USID and destination address 2704, 2724 can be passed through the system as a tag to be used in determining how the received message is to be processed and the type of response expected.

In certain examples, the originator that is transmitting a datagram may be identified using a fixed index. The fixed index for the originator may be based on content of a "Message Type" field in the datagram. A common address field can be maintained for all Message Types. The fixed index for the originator can ensure that the message is received at a known register/memory location and that the message is deterministically processed.

The receiver can identify the originator and an appropriate, expected or desired response when a combination of originator USID and destination address is provided as a tag. In some implementations multiple indexes may be provided in memory for a given Message Type and, for example, coexistence information can be conveyed regarding different active components within the originating device that are of potential interest to one or more receivers. At a receiver, a response to an incoming message may be processed based on identification of the sender using some combination of destination address and USID.

In certain examples, the originator that is transmitting a datagram may be identified by including an ID of the originator with other critical information in the datagram. The other critical information may include a radio access technology (RAT) ID, Message Type, and the like.

In certain examples, a ping-pong buffer structure may be provided for fast data transfer. In one example, two sets of registers are provided such that a first set of registers can be written while data in a second set of registers is processed. After processing previous data, the second set of registers may receive new data while data in the first set of registers is processed.

According to certain aspects, a receiver may validate the combination of USID and destination address to detect potential mismatches, and the receiver may flag mismatches as error conditions.

Example of Constructs Used to Map WCI-2 Messages to SPMI Datagrams

For reference, the table 240 of WCI-2 Message Types illustrated in FIG. 2 may use 16-bit addressing by default, with Type-2 message lengths being limited to 8 bytes. In a mapping scheme provided in accordance with certain aspects disclosed herein, the format and content of Type 0, Type 1 and Type 2 messages may be maintained. Type 0 and Type 1 messages are widely used and may be sensitive to change. Type 0 messages retain an embedded 3 bits of the Type indicator field 222. Type 1 messages function as a ping message and Type 2 messages are efficient multi-byte messages.

In some implementations, the byte format per type message may be maintained and new information can be included by removing the Type indicator field 222 reserved bits defined by the WCI-2 protocol. The information conveyed by the Type indicator field 222 can be inferred through other means, including the address of the payload. The WCI-2 protocol is tuned to represent the state of a radio as it impacts coexistence with another active radio system. In some implementations, up to two messages can be sent per Type. Primary and Secondary messages can be sent in a ping pong manner per client aggressor (source of an interfering RF transmission). Type 3-Type 7 single byte commands may be sent over SPMI using the address field to index the Type message of the payload, thereby freeing up the full byte payload. In some instances, Type 5 messages are reserved for SPMI-VGI mapping to WCI-2. Additional flexibility can be obtained when the byte payload is fully programmable in Type 3, Type 4, Type 6 and Type 7 messages.

Example of SPMI Addressing Procedure

In one aspect, the common memory map 2012, 2014, 2016, 2018 can be reconfigured by an application processor. Changes are implemented on all devices 2004, 2006, 2008, 2010 in the system. The application processor may also configure or report any changes to addressing and indexing using the combined USID, destination address, RAT ID, etc. Changes may be reported per message Type. For example, a change may affect whether a modem should send all messages to all devices 2004, 2006, 2008, 2010 coupled to a serial bus, or to a single radio technology or device 2004, 2006, 2008, 2010.

In one example, it is assumed that a first coexistence engine reserved for a 2.4 GHz/5 GHz/BT radio is the primary and master device. It may be expected that information written by a core over SPMI and addressed to the address space configured for the 2.4 GHz/5 GHz/BT radio is to be directed to the first coexistence engine. Writes from other sources may be redirected to a second coexistence engine. In one example specifying real-time requirements for the WLAN 2.4/5 GHz/BT radio, all Type 0 messages for any other client device are routed to the central processor of the modem, and these rerouted messages may incur 20 μs delays or more.

In some implementations, presence of a ping-pong buffer is assumed. The ping-pong buffer provides at least two locations for a Modem to write a Type X message or command to any client. The ping-pong buffer accommodates processing delays and/or arbitration delays.

Ping Response

A modem adapted in accordance with certain aspects disclosed herein can send WCI-2 Type 0 messages for more than 1 aggressor. A Type 1 ping message may elicit a response that includes the latest stored Type 0 message for all active aggressors in the modem. In one example where two 4G LTE carriers are causing issues for a 2.4 GHz WLAN and 5 GHz WLAN radio, the modem may send back-to-back SPMI-based Type 0 responses to inform the WLAN radios of latest status of requests. The modem may arbitrate with the application processor for each SPMI-based Type 0 response to a ping message. In one example, the state of up to 16 aggressors (including 5G mm Wave, sub6, LTE) and the receiving chips may be configured such that they are aware of the number of potential aggressors and can handle worst case SPMI-based Type 0 commands.

Memory Map Illustration

FIG. 28 illustrates options 2800, 2820 for mapping coexistence messages to SPMI (or RFFE) datagrams in accordance with certain aspects disclosed herein. Under the first option 2800, the WCI-2 Type indicator is dropped, replaced with other information or ignored, except for Type 0 and Type 1 WCI-2 messages. The use of a common memory map

2012, 2014, 2016, 2018 can render the WCI-2 Type indicator redundant, since the combination of USID of the originating device 2004, 2006, 2008, 2010 and target address field provided in a datagram can provide the information such as the identity of an aggressor for which information is provided, an action and/or mitigation to be taken in response to the received coexistence message and a type of response to be transmitted in response to the datagram. Under the second option 2820, WCI-2 payloads are maintained intact, and the Type field is transmitted. The second option 2820 includes a ping-pong buffer mechanism that can provide primary and secondary register space in order to accommodate slower systems that may require time to respond, or systems that receive multiple incoming messages from a single source. A ping-pong buffer mechanism may be provided under the first option 2800.

Examples of Additional Addressing Options

In some instances, a receiver may require addressing information that includes a sender ID (SID), a RAT, and a message Type. This type of information is not included in all messages defined by the WCI-2 protocol.

Devices adapted in accordance with certain aspects disclosed herein may provide enhanced addressing information through the use of the common addressing scheme disclosed herein in which the sender can identify information including SID, RAT and Type. In some implementations, one or more protocols may be enhanced in order to include additional information. In some implementations, a combination of common addressing scheme and enhanced protocols may be implemented in order to include additional information. When a combination of common addressing scheme and enhanced protocols is used, some additional fields can be provided through the protocol, while other fields can be identified through the common addressing scheme.

The WCI-2 protocol may be adapted to carry additional field. Fields that have a size of 4 bits may be used to carry SID, RAT and Message Type. In one example, the RAT and SID can be combined into a single byte, with Message Type provided in a second byte. Other combinations of fields can be used when two bytes are available.

When a combination of common addressing scheme and enhanced protocols is used, the RAT and SID can be combined into a single byte and the addressing scheme may be used to differentiate the Message Type.

Certain aspects disclosed herein enable multiple clients to communicate in different groupings to exchange common limited messaging. Non-overlapping register space access can be guaranteed. Transmitter-blindness can be eliminated with regard to datagrams transmitted after bus arbitration. Optimizations obtained by packing more information into a single transaction can compensate for overheads associated with transmission over a serial bus. Different message types can be identified by their address, freeing up the 3-bit Type identifiers in the payload to convey more useful information. The TYPE index information need no longer be embedded.

The addressing scheme and data payload definitions for datagrams used to write to the common memory map 2012, 2014, 2016, 2018 may be defined by application needs, protocols used on the serial bus 2002 and other design requirements.

Figure 29:
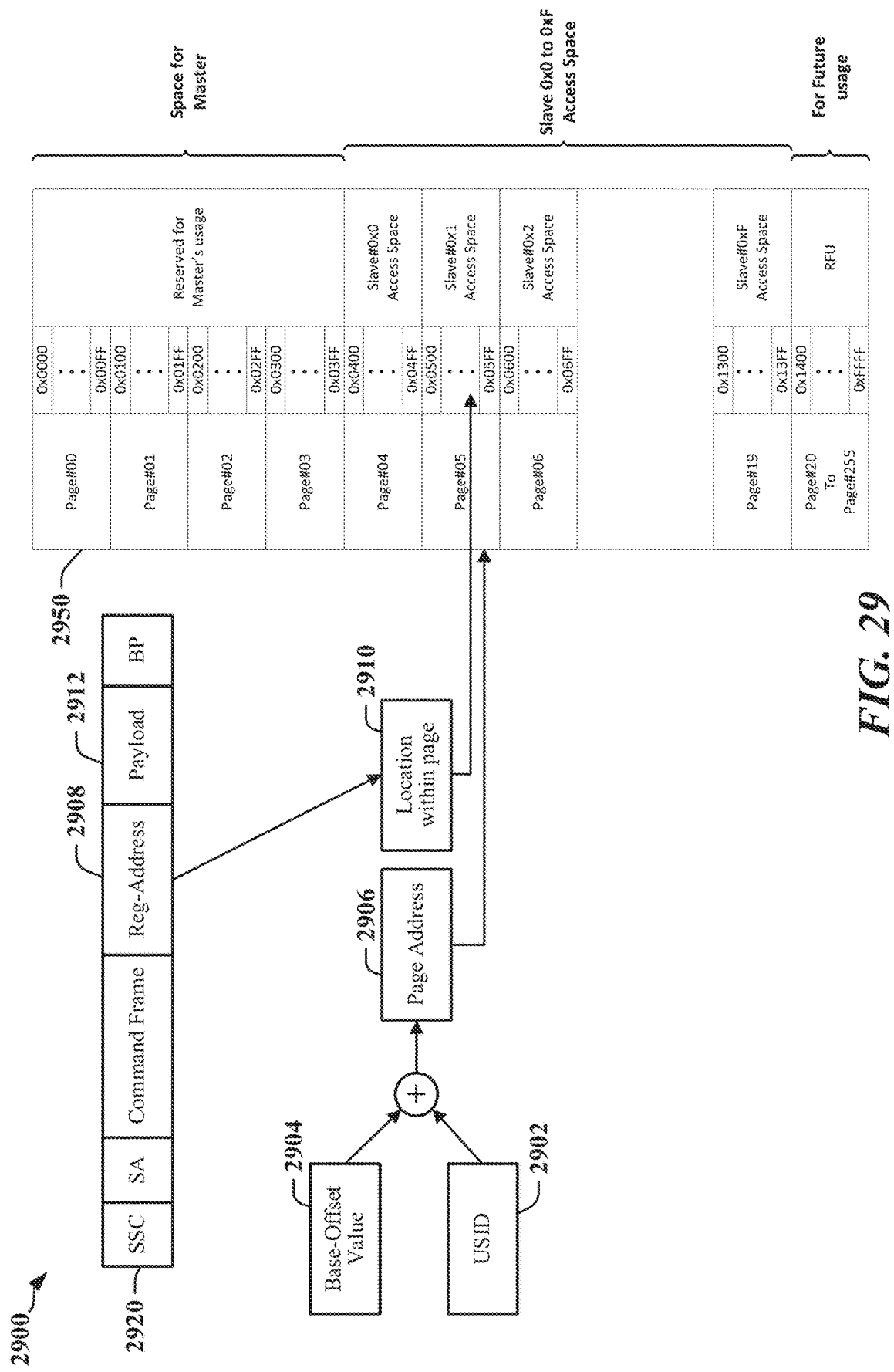
FIG. 29 illustrates an example of an addressing architecture that can be used with a common memory map configured according to certain aspects disclosed herein.

FIG. 29 is a diagram 2900 illustrating an example of an addressing architecture that can be used with a common memory map 2012, 2014, 2016, 2018 configured according to certain aspects disclosed herein. According to certain aspects, a device 2004, 2006, 2008, 2010 may have access of up to 64 KB of register address space 2950. The register address space 2950 may be divided into pages (e.g., 0 to 255 pages) and address locations (locations 0x00 to 0xFF in hexadecimal) within each page. The 64 KB space allows for 16-bit addressing (e.g., 8-bit MSB and 8-bit LSB). Therefore, for an address containing 16 bits, an 8-bit MSB yields a page number (0 to 255 pages) and an 8-bit LSB yields an address location (0x00 to 0xFF) within the page number.

In an aspect, during an arbitration phase on the SPMI bus, an originating device 2004, 2006, 2008, 2010 sends a 4-bit address to identify itself to a bus master and/or other slaves on the bus. All devices on the bus typically do not capture the 4-bit address (ID) of the originating device 2004, 2006, 2008, 2010 winning the arbitration. Hence, the bus master and the other slaves on the bus do not necessarily know the identity of the originating device 2004, 2006, 2008, 2010 winning the arbitration. The winning originating device 2004, 2006, 2008, 2010 may transmit its USID 2902 in the datagram transmitted after the arbitration.

The USID 2902 may be used to create an auto-offset to map different originating devices 2004, 2006, 2008, 2010 to different address regions of a receiving device's register address space 2950. For example, the USID 2902 may be concatenated with a base-offset value 2904 to generate an 8-bit MSB sequence equivalent to a page address 2906 in the receiving device's register address space 2950. The base-offset value 2904 may be any constant 4-bit sequence that is pre-configured or set by the receiving device 2004, 2006, 2008, 2010. Moreover, a register address 2908 contained in a datagram 2920 sent by the originating device 2004, 2006, 2008, 2010 after winning arbitration may be used as an 8-bit LSB sequence equivalent to an address location 2910 within the page address 2906. Accordingly, by using the USID 2902 of the originating device 2004, 2006, 2008, 2010 to generate a specific page address 2906, a specific address region in the receiving device's register address space 2950 is assigned to the originating device 2004, 2006, 2008, 2010. Hence, when the datagram 2920 is received by the receiving device 2004, 2006, 2008, 2010, a payload 2912 may be written to the address region specific to the originating device 2004, 2006, 2008, 2010 without having to overwrite any other address region containing data for another device 2004, 2006, 2008, 2010.

Examples of Processing Circuits and Methods

Figure 30:
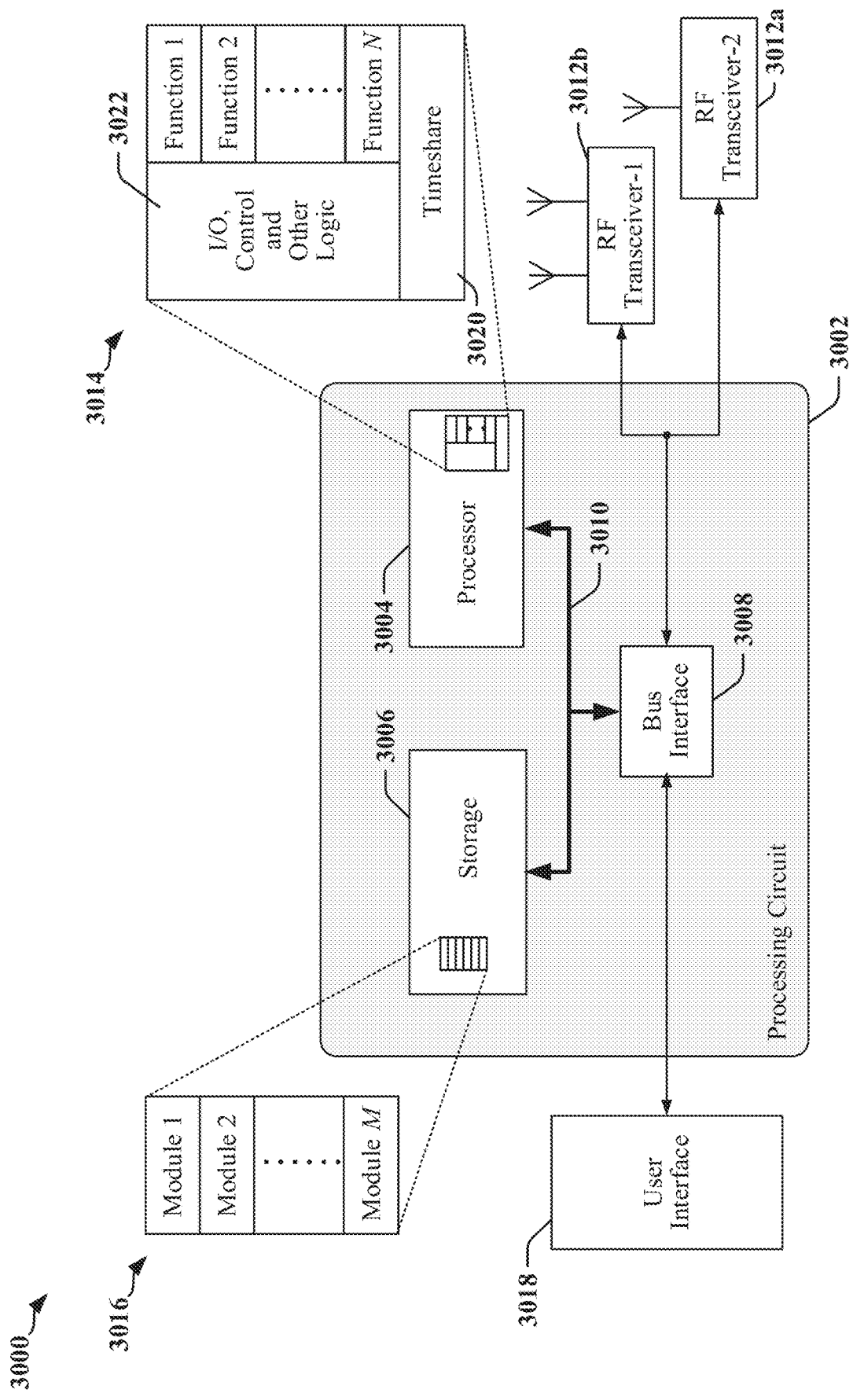
FIG. 30 illustrates one example of an apparatus employing a processing circuit that may be adapted according to certain aspects disclosed herein.

FIG. 30 is a diagram illustrating an example of a hardware implementation for an apparatus 3000 employing a processing circuit 3002. The processing circuit 3002 may include or configure the operation of a finite state machine 1110 (see FIG. 11). In some examples, the apparatus 3000 may perform one or more functions disclosed herein. In accordance with various aspects of the disclosure, an element, or any portion of an element, or any combination of elements as disclosed herein may be implemented using a processing circuit 3002. The processing circuit 3002 may include one or more processors 3004 that are controlled by some combination of hardware and software modules. Examples of processors 3004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 3004 may include specialized processors that perform specific functions, and that may be configured, augmented or controlled by one of the software modules 3016. The one or more processors 3004 may be configured through a combination of software modules 3016 loaded during initialization, and further configured by loading or unloading one or more software modules 3016 during operation.

In the illustrated example, the processing circuit 3002 may be implemented with a bus architecture, represented generally by the bus 3010. The bus 3010 may include any number of interconnecting buses and bridges depending on the specific application of the processing circuit 3002 and the overall design constraints. The bus 3010 links together various circuits including the one or more processors 3004, and storage 3006. Storage 3006 may include memory devices and mass storage devices and may be referred to herein as computer-readable media and/or processor-readable media.

The bus 3010 may also link various other circuits such as timing sources, timers, peripherals, voltage regulators, and power management circuits. A bus interface 3008 may provide an interface between the bus 3010 and one or more RF transceivers 3012*a*, 3012*b*. An RF transceiver 3012*a*, 3012*b* may be provided for each networking technology supported by the processing circuit. In some instances, multiple networking technologies may share some or all of the circuitry or processing modules found in an RF transceiver 3012*a*, 3012*b*. Each RF transceiver 3012*a*, 3012*b* provides a means for communicating with various other apparatus over a transmission medium. In one example, each RF transceiver 3012*a*, 3012*b* may be used to connect the apparatus 3000 to a radio access network. Depending upon the nature of the apparatus 3000, a user interface 3018 (e.g., keypad, display, speaker, microphone, joystick) may also be provided, and may be communicatively coupled to the bus 3010 directly or through the bus interface 3008.

A processor 3004 may be responsible for managing the bus 3010 and for general processing that may include the execution of software stored in a computer-readable medium that may include the storage 3006. In this respect, the processing circuit 3002, including the processor 3004, may be used to implement any of the methods, functions and techniques disclosed herein. The storage 3006 may be used for storing data that is manipulated by the processor 3004 when executing software, and the software may be configured to implement any one of the methods disclosed herein.

One or more processors 3004 in the processing circuit 3002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 3006 or in an external computer-readable medium. The external computer-readable medium and/or storage 3006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 3006 may also include, by way of example, a carrier wave, a transmission line, and any other suitable medium for transmitting software and/or instructions that may be accessed and read by a computer. Computer-readable medium and/or the storage 3006 may reside in the processing circuit 3002, in the processor 3004, external to the processing circuit 3002, or be distributed across multiple entities including the processing circuit 3002. The computer-readable medium and/or storage 3006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 3006 may maintain software maintained and/or organized in loadable code segments, modules, applications, programs, etc., which may be referred to herein as software modules 3016. Each of the software modules 3016 may include instructions and data that, when installed or loaded on the processing circuit 3002 and executed by the one or more processors 3004, contribute to a run-time image 3014 that controls the operation of the one or more processors 3004. When executed, certain instructions may cause the processing circuit 3002 to perform functions in accordance with certain methods, algorithms and processes described herein.

Some of the software modules 3016 may be loaded during initialization of the processing circuit 3002, and these software modules 3016 may configure the processing circuit 3002 to enable performance of the various functions disclosed herein. For example, some software modules 3016 may configure internal devices and/or logic circuits 3022 of the processor 3004 and may manage access to external devices such as an RF transceiver 3012*a*, 3012*b*, the bus interface 3008, the user interface 3018, timers, mathematical coprocessors, and so on. The software modules 3016 may include a control program and/or an operating system that interacts with interrupt handlers and device drivers, and that controls access to various resources provided by the processing circuit 3002. The resources may include memory, processing time, access to the RF transceiver 3012*a*, 3012*b*, the user interface 3018, and so on.

One or more processors 3004 of the processing circuit 3002 may be multifunctional, whereby some of the software modules 3016 are loaded and configured to perform different functions or different instances of the same function. The one or more processors 3004 may additionally be adapted to manage background tasks initiated in response to inputs from the user interface 3018, the transceiver 3012*a*, 3012*b*, and device drivers, for example. To support the performance of multiple functions, the one or more processors 3004 may be configured to provide a multitasking environment, whereby each of a plurality of functions is implemented as a set of tasks serviced by the one or more processors 3004 as needed or desired. In one example, the multitasking environment may be implemented using a timesharing program 3020 that passes control of a processor 3004 between different tasks, whereby each task returns control of the one or more processors 3004 to the timesharing program 3020 upon completion of any outstanding operations and/or in response to an input such as an interrupt. When a task has control of the one or more processors 3004, the processing circuit is effectively specialized for the purposes addressed by the function associated with the controlling task. The timesharing program 3020 may include an operating system, a main loop that transfers control on a round-robin basis, a function that allocates control of the one or more processors 3004 in accordance with a prioritization of the functions, and/or an interrupt driven main loop that responds to external events by providing control of the one or more processors 3004 to a handling function.

Figure 31:
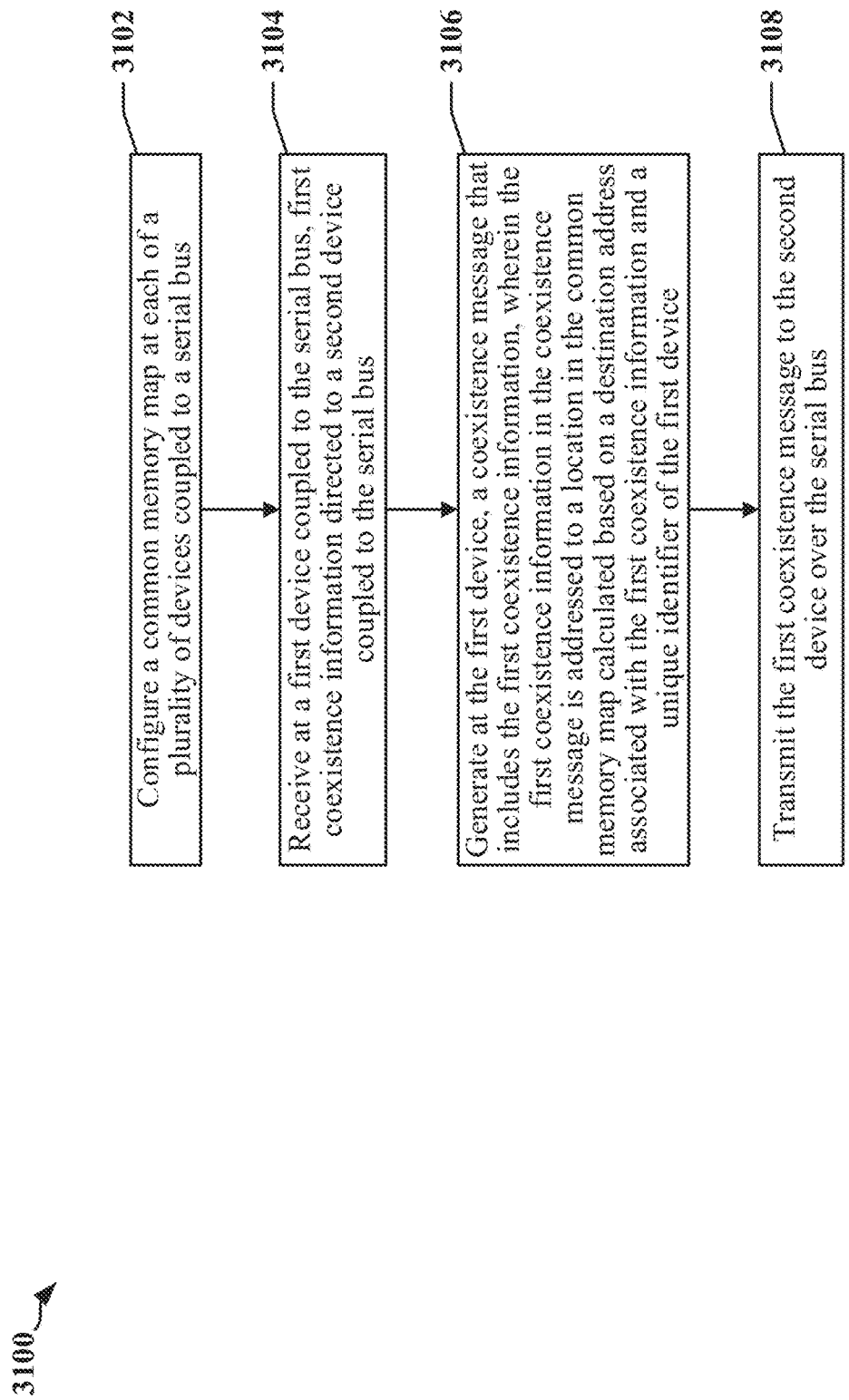
FIG. 31 is a flowchart illustrating certain operations of device adapted in accordance with certain aspects disclosed herein.

FIG. 31 is a flowchart 3100 of a method that may be performed at a device coupled to a serial bus. The device may be a modem.

At block 3102, the device may configure a common memory map at each of a plurality of devices coupled to a serial bus. Configuring the common memory may include configuring a segment of the common memory map for each of the plurality of devices. The combined destination address and the unique identifier of the first device may be provided as a tag for the coexistence message during processing at the second device. At block 3104, the device may receive at a first device coupled to the serial bus, coexistence information directed to a second device coupled to the serial bus.

At block 3106, the device may generate at the first device, a coexistence message that includes the first coexistence information. The first coexistence information in the coexistence message may be addressed to a location in the common memory map calculated based on a destination address associated with the first coexistence information and a unique identifier of the first device. The unique identifier of the first device is transmitted as a type indicator of the coexistence message. The coexistence message may be generated by including the type indicator in the coexistence message. The coexistence message may be addressed to a location in the common memory map calculated based on a destination address provided in the message and unique identifier of the first device. At block 3108, the device may transmit the coexistence message to the second device over the serial bus.

In various examples, an identification of a radio access technology associated with the first coexistence information may be transmitted in the coexistence message. In some instances, the unique identifier, an identification of a radio access technology associated with the first coexistence information and a message type indicator may be combined in a single byte of the coexistence message. In some instances, the unique identifier, an identification of a radio access technology associated with the first coexistence information and a type indicator of the coexistence message may be combined in two or more bytes of the coexistence message.

In some implementations, the device may receive second coexistence information directed to the second device. The first coexistence information and the second coexistence information may relate to different sources of coexistence information. The device may transmit the first coexistence information and the second coexistence information in the coexistence message in response to a ping message.

Figure 32:
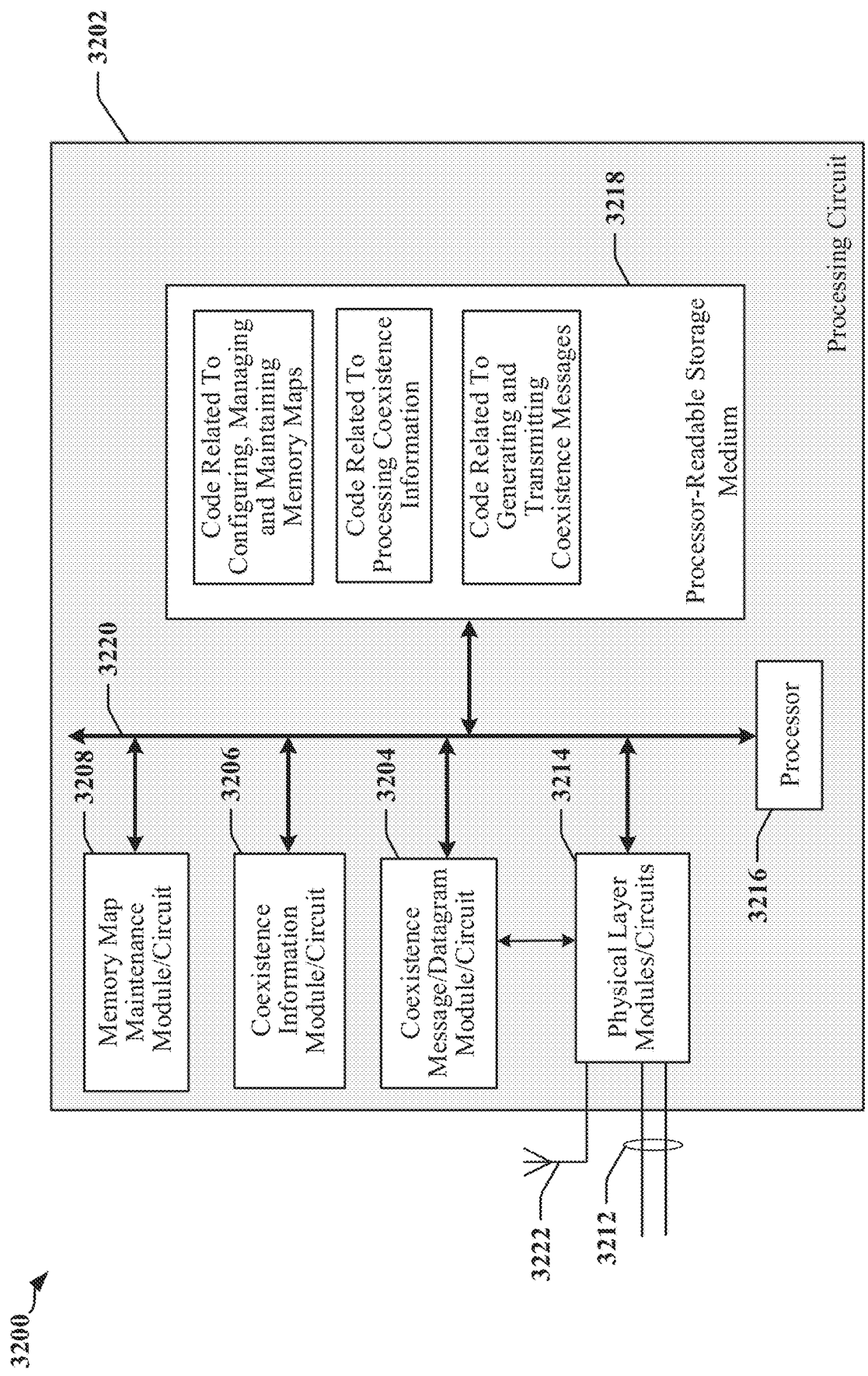
FIG. 32 illustrates an example of a hardware implementation for an apparatus adapted in accordance with certain aspects disclosed herein.

FIG. 32 is a diagram illustrating a simplified example of a hardware implementation for an apparatus 3200 employing a processing circuit 3202. The apparatus may implement a bridging circuit in accordance with certain aspects disclosed herein. The processing circuit typically has a controller or processor 3216 that may include one or more microprocessors, microcontrollers, digital signal processors, sequencers and/or state machines. The processing circuit 3202 may be implemented with a bus architecture, represented generally by the bus 3220. The bus 3220 may include any number of interconnecting buses and bridges depending on the specific application of the processing circuit 3202 and the overall design constraints. The bus 3220 links together various circuits including one or more processors and/or hardware modules, represented by the controller or processor 3216, the modules or circuits 3204, 3206 and 3208, and the processor-readable storage medium 3218. One or more physical layer circuits and/or modules 3214 may be provided to support communications over a communication link implemented using a serial bus 3212, through an antenna 3222 (to a radio access network for example), and so on. The bus 3220 may also link various other circuits such as timing sources, peripherals, voltage regulators, and power management circuits, which are well known in the art, and therefore, will not be described any further.

The processor 3216 is responsible for general processing, including the execution of software, code and/or instructions stored on the processor-readable storage medium 3218. The processor-readable storage medium 3218 may include a non-transitory storage medium. The software, when executed by the processor 3216, causes the processing circuit 3202 to perform the various functions described supra for any particular apparatus. The processor-readable storage medium may be used for storing data that is manipulated by the processor 3216 when executing software. The processing circuit 3202 further includes at least one of the modules 3204, 3206 and 3208. The modules 3204, 3206 and 3208 may be software modules running in the processor 3216, resident/stored in the processor-readable storage medium 3218, one or more hardware modules coupled to the processor 3216, or some combination thereof. The modules 3204, 3206 and 3208 may include microcontroller instructions, state machine configuration parameters, or some combination thereof.

In one configuration, the apparatus 3200 includes modules and/or circuits 3208 configured to manage a common memory map used buy a plurality of devices, modules and/or circuits 3206 configured to generate and/or receive coexistence information related to aggressors and/or victims, and modules and/or circuits 3204 configured to generate, transmit, receive and/or decode datagrams that include coexistence messages exchanged over the serial bus.

In one example, a data communication apparatus 3200 includes a bus interface circuit coupled to the serial bus 3212, a radio frequency component that generates an interfering signal when active, and a processor 3216. The bus interface circuit may include or be implemented using the physical layer circuits and/or modules 3214. The processor 3216 may be configured to maintain a memory map that matches a corresponding memory map in a victim device coupled to the serial bus, receive first coexistence information from the radio frequency component, generate a coexistence message that includes the first coexistence information, and transmit the coexistence message to the victim device through the bus interface circuit. The first coexistence information may be directed to the victim device. The first coexistence information in the coexistence message may be addressed to a location in the common memory map calculated based on a destination address associated with the first coexistence information and a unique identifier of the apparatus.

In some implementations, the processor 3216 may configure a segment of the common memory map for each of a plurality of devices. The processor 3216 may be further configured to combine the destination address and the unique identifier to provide a tag for the coexistence message to be used by the victim device for processing the coexistence message. The processor 3216 may be further configured to transmit a type indicator associated with the first coexistence information in the coexistence message. The processor 3216 may be further configured to transmit an identification of a radio access technology associated with the first coexistence information in the coexistence message. The processor 3216 may be further configured to combine the unique identifier of the first device, an identification of a radio access technology associated with the first coexistence information and a message type indicator in one, two or more bytes of the coexistence message.

The apparatus 3200 may include or be coupled to a source of second coexistence information addressed to the second device. The processor 3216 may be further configured to transmit the first coexistence information and the second coexistence information in the coexistence message in response to a ping message.

The common memory map may apply to a portion of the processor-readable storage medium 3218 and/or a register space in the apparatus 3200. The processor-readable storage medium 3218 may have instructions stored thereon which, when executed by the processor 3216, may cause the processing circuit 3202 to configure a common memory map at each of a plurality of devices coupled to a serial bus, receive first coexistence information directed to a first device coupled to the serial bus, generate a coexistence message that includes the first coexistence information, and transmit the coexistence message to the first device over the serial bus. The first coexistence information in the coexistence message may be addressed to a location in the common memory map calculated based on a destination address associated with the first coexistence information and a unique identifier associated with the processing circuit 3202.

In some examples, the instructions further cause the processing circuit 3202 to configure a segment of the common memory map for each of the plurality of devices. The instructions may further cause the processing circuit 3202 to combine the destination address and the unique identifier to provide a tag for the coexistence message to be used by the first device for processing the coexistence message. The instructions may further cause the processing circuit 3202 to transmit a type indicator associated with the first coexistence information in the coexistence message. The instructions may further cause the processing circuit 3202 to transmit an identification of a radio access technology associated with the first coexistence information in the coexistence message. The instructions may further cause the processing circuit 3202 to combine the unique identifier, an identification of a radio access technology associated with the first coexistence information and a message type indicator in a single byte of the coexistence message. The instructions may further cause the processing circuit 3202 to combine the unique identifier, an identification of a radio access technology associated with the first coexistence information and a type indicator of the coexistence message in two or more bytes of the coexistence message.

In some implementations, the instructions may further cause the processing circuit 3202 to receive second coexistence information directed to the second device. The first coexistence information and the second coexistence information may relate to different sources of coexistence information. The instructions may further cause the processing circuit 3202 to transmit the first coexistence information and the second coexistence information in the coexistence message in response to a ping message.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A data communication method, comprising:
   configuring a common memory map at each of a plurality of devices coupled to a serial bus;
   receiving at a first device coupled to the serial bus, first coexistence information directed to a second device coupled to the serial bus;
   generating at the first device, a coexistence message that includes the first coexistence information, wherein the first coexistence information in the coexistence message is addressed to a location in the common memory map calculated based on a destination address associated with the first coexistence information and a unique identifier of the first device; and
   transmitting the coexistence message to the second device over the serial bus, wherein transmitting the coexistence message comprises: transmitting a type indicator and an identification of a radio access technology associated with the first coexistence information in the coexistence message.

2. The method of claim 1, wherein configuring the common memory map comprises:
   configuring a segment of the common memory map for each of the plurality of devices such that each of the plurality of devices has a block of registers or memory locations reserved in each of the plurality of devices.

3. The method of claim 1, further comprising:
   combining the destination address and the unique identifier to provide a tag for the coexistence message to be used by the second device for processing the coexistence message.

4. The method of claim 1, wherein transmitting the coexistence message comprises:
   using a broadcast command configured to cause the coexistence message to be written to a block of registers or memory locations defined by the common memory map in the second device.

5. The method of claim 1, further comprising:
   combining in a single byte of the coexistence message, the unique identifier, the identification of a radio access technology associated with the first coexistence information and the type indicator.

6. The method of claim 1, further comprising:
   combining in two bytes of the coexistence message, the unique identifier, the identification of a radio access technology associated with the first coexistence information and the type indicator.

7. The method of claim 1, further comprising:
   receiving at the first device, second coexistence information directed to the second device, wherein the first coexistence information and the second coexistence information relate to different sources of coexistence information.

8. The method of claim 7, further comprising:

transmitting the first coexistence information and the second coexistence information in the coexistence message in response to a ping message.

9. A data communication apparatus comprising:

a bus interface circuit coupled to a serial bus;

a radio frequency component that generates an interfering signal when active; and a processing circuit configured to:

maintain a common memory map that matches a corresponding memory map in a victim device coupled to the serial bus;

receive first coexistence information from the radio frequency component, the first coexistence information being directed to the victim device;

generate a coexistence message that includes the first coexistence information, wherein the first coexistence information in the coexistence message is addressed to a location in the common memory map calculated based or a destination address associated with the first coexistence information and a unique identifier of the data communication apparatus; and transmit the coexistence message to the victim device through the bus interface circuit, wherein the processing circuit is further configured to:

transmit a type indicator and an identification of a radio access technology associated with the first coexistence information in the coexistence message.

10. The data communication apparatus of claim 9, wherein the processing circuit is further configured to:

configure a segment of the common memory map for each of a plurality of devices such that each of the plurality of devices has a block of registers or memory locations reserved in each of the plurality of devices.

11. The data communication apparatus of claim 9, wherein the processing circuit is further configured to:

combine the destination address and the unique identifier to provide a tag for the coexistence message to be used by the victim device for processing the coexistence message.

12. The data communication apparatus of claim 9, wherein the processing circuit is further configured to:

use a broadcast command configured to cause the coexistence message to be written to a block of registers or memory locations defined by the common memory map in the victim device.

13. The data communication apparatus of claim 9, wherein the processing circuit is further configured to:

combine in a single byte of the coexistence message, the unique identifier of the data communication apparatus, the identification of a radio access technology associated with the first coexistence information and the type indicator.

14. The data communication apparatus of claim 9, wherein the processing circuit is further configured to:

combine in two bytes of the coexistence message, the unique identifier of the data communication apparatus, the identification of a radio access technology associated with the first coexistence information and the type indicator.

15. The data communication apparatus of claim 9, further comprising:

a source of second coexistence information addressed to the victim device, wherein the processing circuit is further configured to transmit the first coexistence information and the second coexistence information in the coexistence message in response to a ping message.

16. A non-transitory processor-readable storage medium having instructions stored thereon which, when executed by at least one processor or state machine of a processing circuit, cause the processing circuit to:

configure a common memory map at each of a plurality of devices coupled to a serial bus;

receive first coexistence information directed to a first device coupled to the serial bus;

generate a coexistence message that includes the first coexistence information, wherein the first coexistence information in the coexistence message is addressed to a location in the common memory map calculated based on a destination address associated with the first coexistence information and a unique identifier associated with the processing circuit; and transmit the coexistence message to the first device over the serial bus, wherein the instructions further cause the processing circuit to:

transmit a type indicator and an identification of a radio access technology associated with the first coexistence information in the coexistence message.

17. The storage medium of claim 16, wherein the instructions further cause the processing circuit to:

configure a segment of the common memory map for each of the plurality of devices such that each of the plurality of devices has a block of registers or memory locations reserved in each of the plurality of devices.

18. The storage medium of claim 16, wherein the instructions further cause the processing circuit to:

combine the destination address and the unique identifier to provide a tag for the coexistence message to be used by the first device for processing the coexistence message.

19. The storage medium of claim 16, wherein the instructions further cause the processing circuit to:

use a broadcast command configured to cause the coexistence message to be written to a block of registers or memory locations defined by the common memory map in the first device.

20. The storage medium of claim 16, wherein the instructions further cause the processing circuit to:

combine in a single byte of the coexistence message, the unique identifier, the identification of a radio access technology associated with the first coexistence information and the type indicator.

21. The storage medium of claim 16, wherein the instructions further cause the processing circuit to:

combine in two bytes of the coexistence message, the unique identifier, the identification of a radio access technology associated with the first coexistence information and the type indicator.

22. The storage medium of claim 16, wherein the instructions further cause the processing circuit to:

receive second coexistence information directed to the first device, wherein the first coexistence information and the second coexistence information relate to different sources of coexistence information.

23. The storage medium of claim 22, wherein the instructions further cause the processing circuit to:
transmit the first coexistence information and the second coexistence information in the coexistence message in response to a ping message.

24. A data communication apparatus, comprising:
means for configuring a common memory map at each of a plurality of devices coupled to a serial bus;
means for receiving coexistence information, including first coexistence information addressed to a first device coupled to the serial bus;
means for generating a coexistence message representative of the first coexistence information, wherein the coexistence message includes information addressed to a location in the common memory map calculated based on a destination address provided in the coexistence message and a unique identifier of the data communication apparatus; and
means for transmitting the coexistence message to the first device over the serial bus, wherein transmitting the coexistence message comprises: transmitting a type indicator and an identification of a radio access technology associated with the first coexistence information in the coexistence message.

25. The data communication apparatus of claim 24, wherein the means for generating the coexistence message is configured to:
combine in a single byte of the coexistence message, the unique identifier, the identification of a radio access technology associated with the first coexistence information and the type indicator.

26. The data communication apparatus of claim 24, wherein the means for receiving the coexistence information is configured to receive second coexistence information from another source of coexistence information, the second coexistence information being addressed to the first device.

27. The data communication apparatus of claim 26, wherein the means for transmitting is configured to transmit the first coexistence information and the second coexistence information in the coexistence message in response to a ping message.

* * * * *